(12) United States Patent
Fukuyasu et al.

(10) Patent No.: US 11,006,135 B2
(45) Date of Patent: May 11, 2021

(54) IMAGE PROCESSING APPARATUS AND IMAGE PROCESSING METHOD

(71) Applicant: SONY CORPORATION, Tokyo (JP)

(72) Inventors: Tetsuya Fukuyasu, Kanagawa (JP); Kendai Furukawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 16/319,909

(22) PCT Filed: Jul. 21, 2017

(86) PCT No.: PCT/JP2017/026411
§ 371 (c)(1),
(2) Date: Jan. 23, 2019

(87) PCT Pub. No.: WO2018/025660
PCT Pub. Date: Feb. 8, 2018

(65) Prior Publication Data
US 2019/0268612 A1   Aug. 29, 2019

(30) Foreign Application Priority Data

Aug. 5, 2016   (JP) .............................. JP2016-154453

(51) Int. Cl.
*H04N 19/30* (2014.01)
*H04N 19/597* (2014.01)
(Continued)

(52) U.S. Cl.
CPC ............... *H04N 19/30* (2014.11); *G09G 5/14* (2013.01); *H04N 13/00* (2013.01);
(Continued)

(58) Field of Classification Search
CPC ...... H04N 19/30; H04N 19/597; H04N 19/70; H04N 19/176; H04N 19/44; H04N 19/119;
(Continued)

(56) References Cited

U.S. PATENT DOCUMENTS 6,384,846 B1    5/2002 Hiroi
6,859,557 B1 *  2/2005 Uyttendaele ....... H04N 21/4143
                                                  348/E5.002
(Continued)

FOREIGN PATENT DOCUMENTS

AU    2003227452 A1   12/2003
CN       1656801 A     8/2005
(Continued)

OTHER PUBLICATIONS

"Scalable Omnidirectional Video Coding for Real-Time Virtual Reality Applications"; Deyang Liu, IEEE Access (vol. 6, pp. 56323-56332) (Year: 2018).*
(Continued)

*Primary Examiner* — Michael S Osinski
(74) *Attorney, Agent, or Firm* — Chip Law Group

(57) ABSTRACT

The present disclosure relates to an image processing apparatus and an image processing method that make it possible to suppress deterioration of picture quality of an image within a viewing range of a viewer. An image processing apparatus includes an image processing section that performs, based on priorities between a plurality of encoded streams obtained by encoding a plurality of projection images that are obtained by projecting an omnidirectional image to a plurality of faces or a plurality of viewpoint images from different viewpoints, decoding of the encoded streams and generation or selection of an image to be used for generation of a display image, and a drawing section that
(Continued)

generates the display image based on the generated or selected image.

10 Claims, 59 Drawing Sheets

(51) Int. Cl.
  *G09G 5/14* (2006.01)
  *H04N 13/00* (2018.01)
  *H04N 21/462* (2011.01)
  *H04N 21/4728* (2011.01)
(52) U.S. Cl.
  CPC ......... *H04N 19/597* (2014.11); *H04N 21/462* (2013.01); *H04N 21/4728* (2013.01)
(58) Field of Classification Search
  CPC .... H04N 19/167; H04N 19/17; H04N 19/174; H04N 19/59; H04N 19/00; H04N 19/105; H04N 19/132; H04N 19/162; H04N 19/23; H04N 19/33; H04N 19/503; H04N 13/00; H04N 13/111; H04N 21/462; H04N 21/4728; H04N 21/21805; H04N 21/816; H04N 21/23439; H04N 21/234327; H04N 5/23238; H04N 5/2628; G09G 5/14; G06T 15/205; G06T 9/001; G06T 19/006; G06T 3/0062; G06T 3/0087
  See application file for complete search history.

(56) References Cited

U.S. PATENT DOCUMENTS

| | | | |
|---|---|---|---|
| 9,030,524 B2 * | 5/2015 | Shimizu | H04N 5/23238 348/38 |
| 10,021,301 B2 * | 7/2018 | Fink | H04N 5/2628 |
| 10,176,622 B1 * | 1/2019 | Waggoner | G06T 15/10 |
| 10,666,979 B2 * | 5/2020 | Izumi | H04N 19/167 |
| 2004/0086186 A1 | 5/2004 | Kyusojin et al. | |
| 2005/0226252 A1 | 10/2005 | Tomita | |
| 2007/0172133 A1 * | 7/2007 | Kim | H04N 19/463 382/232 |
| 2008/0025390 A1 * | 1/2008 | Shi | H04N 19/139 375/240.02 |
| 2012/0141016 A1 * | 6/2012 | Wildeboer | H04N 13/271 382/154 |
| 2012/0201520 A1 | 8/2012 | Takao | |
| 2016/0012855 A1 * | 1/2016 | Krishnan | G11B 27/105 386/241 |
| 2016/0073117 A1 * | 3/2016 | Grasmug | H04N 19/27 375/240.26 |
| 2016/0352791 A1 * | 12/2016 | Adams | H04N 21/8547 |
| 2017/0187955 A1 * | 6/2017 | Fink | H04L 12/10 |
| 2017/0187956 A1 * | 6/2017 | Fink | H04N 5/23238 |
| 2017/0223300 A1 * | 8/2017 | Jang | H04N 5/44 |
| 2017/0339440 A1 * | 11/2017 | Galpin | G10L 19/008 |
| 2017/0347026 A1 * | 11/2017 | Hannuksela | H04L 65/80 |
| 2017/0374375 A1 * | 12/2017 | Makar | H04N 19/597 |
| 2018/0146225 A1 * | 5/2018 | Hannuksela | H04N 21/23434 |
| 2018/0359487 A1 * | 12/2018 | Bang | H04N 19/40 |
| 2018/0374192 A1 * | 12/2018 | Kunkel | G06T 15/205 |
| 2019/0082184 A1 * | 3/2019 | Hannuksela | H04N 19/70 |
| 2019/0104330 A1 * | 4/2019 | Dore | G06T 3/0043 |
| 2019/0141323 A1 * | 5/2019 | Yang | H04N 19/80 |
| 2019/0158825 A1 * | 5/2019 | Ma | H04N 19/176 |
| 2019/0297339 A1 * | 9/2019 | Hannuksela | H04N 19/176 |
| 2019/0356906 A1 * | 11/2019 | Handa | G06T 15/205 |

FOREIGN PATENT DOCUMENTS

| | | |
|---|---|---|
| EP | 1507412 A1 | 2/2005 |
| JP | 2001-298652 A | 10/2001 |
| JP | 2002-312778 A | 10/2002 |
| JP | 2002-532998 A | 10/2002 |
| JP | 2003-338840 A | 11/2003 |
| JP | 2004-072694 A | 3/2004 |
| JP | 2006-014174 A | 1/2006 |
| JP | 2012-165181 A | 8/2012 |
| KR | 10-0971051 B1 | 7/2010 |
| WO | 00/36584 A1 | 6/2000 |
| WO | 03/098930 A1 | 11/2003 |

OTHER PUBLICATIONS

International Search Report and Written Opinion of PCT Application No. PCT/JP2017/026411, dated Sep. 26, 2017, 16 pages of ISRWO.

Yamamoto, et al., "QoE Assessment of Simultaneous Transmission Methods of Multi-View Video and Audio IP Transmission", IEICE Technical Report, vol. 112, Issue 10, Apr. 19-20, 2012, 81-86 pages.

* cited by examiner

FIG. 9

| FILE NAME | AZIMUTH ANGLE | ELEVATION ANGLE | ROTATION ANGLE | SIGHT LINE VECTOR (X, Y, Z) | | | VIEWPOINT POSITION INFORMATION (X, Y, Z) | | | TRANSVERSE ANGLE OF VIEW | VERTICAL ANGLE OF VIEW | TRANSVERSE PIXEL NUMBER | VERTICAL PIXEL NUMBER |
|---|---|---|---|---|---|---|---|---|---|---|---|---|---|
| posZ | 0° | 0° | 0° | 0 | 0 | +1 | 0 | 0 | 0 | 100° | 100° | 1024 | 1024 |
| negZ | −180° | 0° | 0° | 0 | 0 | −1 | 0 | 0 | 0 | 100° | 100° | 1024 | 1024 |
| posX | +90° | 0° | 0° | +1 | 0 | 0 | 0 | 0 | 0 | 100° | 100° | 1024 | 1024 |
| negX | −90° | 0° | 0° | −1 | 0 | 0 | 0 | 0 | 0 | 100° | 100° | 1024 | 1024 |
| posY | 0° | +90° | 0° | 0 | +1 | 0 | 0 | 0 | 0 | 100° | 100° | 1024 | 1024 |
| negY | 0° | −90° | 0° | 0 | −1 | 0 | 0 | 0 | 0 | 100° | 100° | 1024 | 1024 |

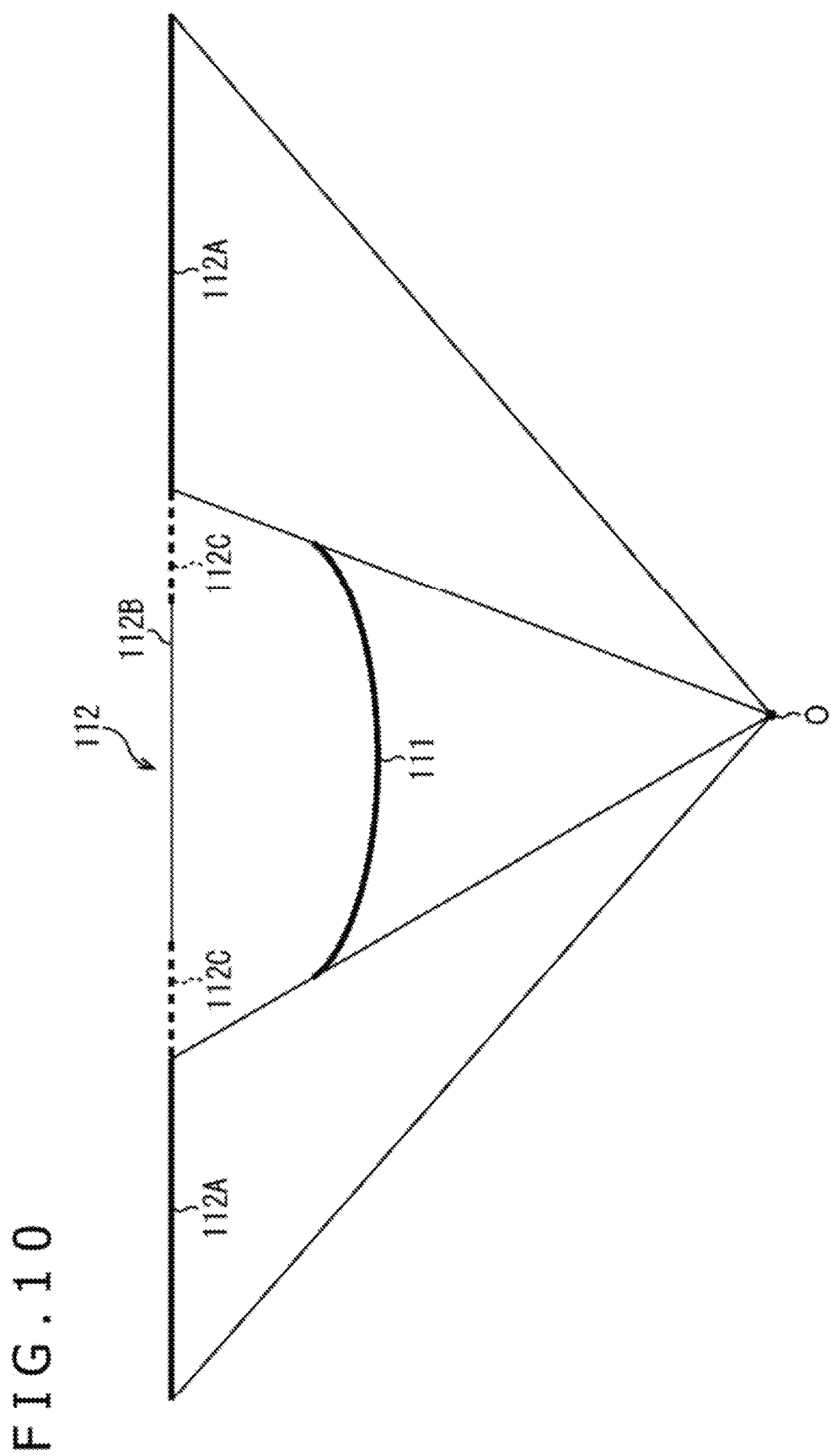

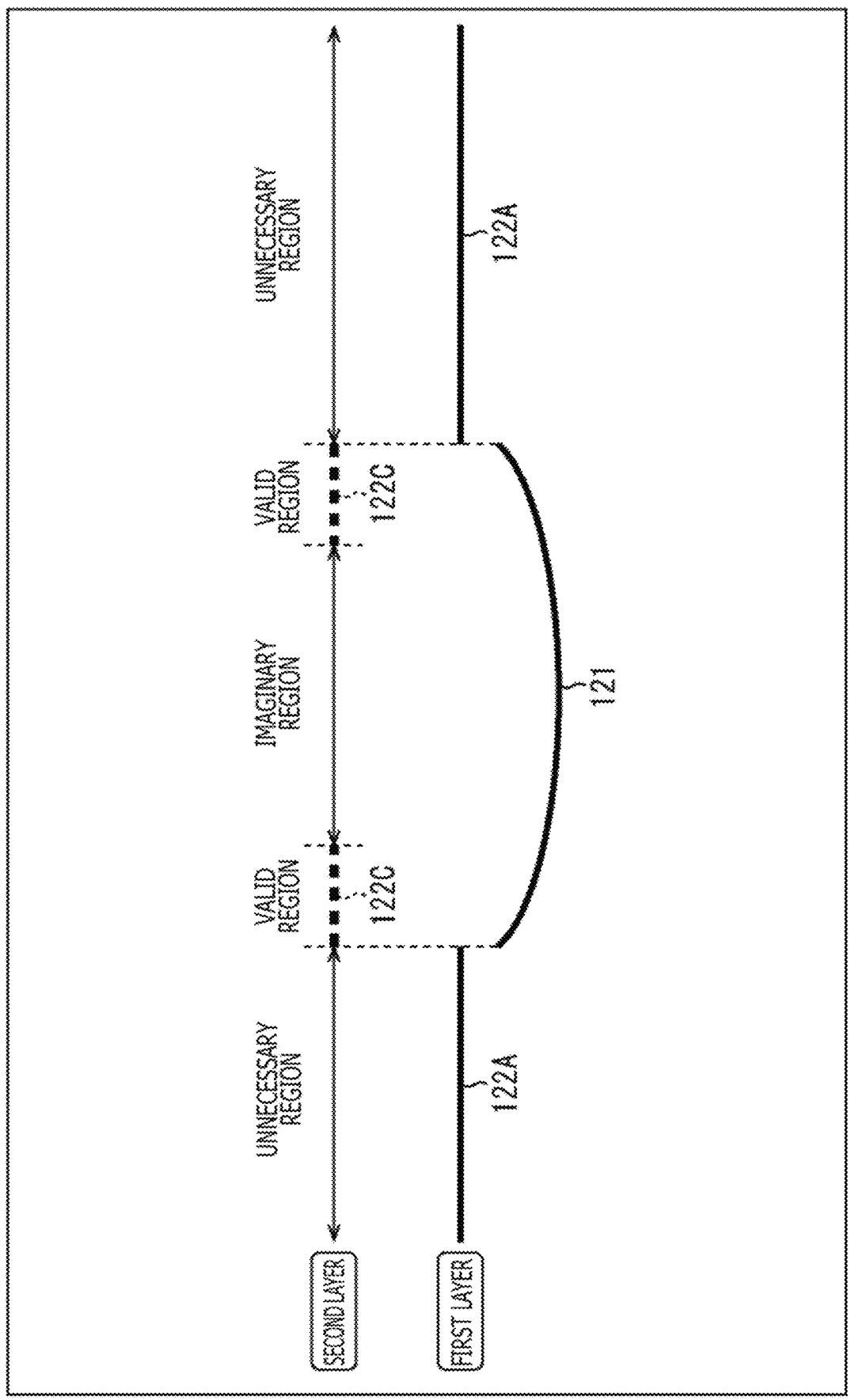

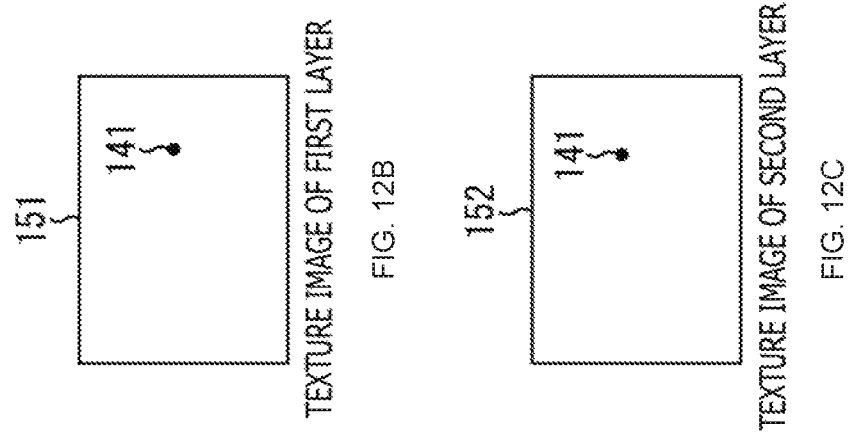

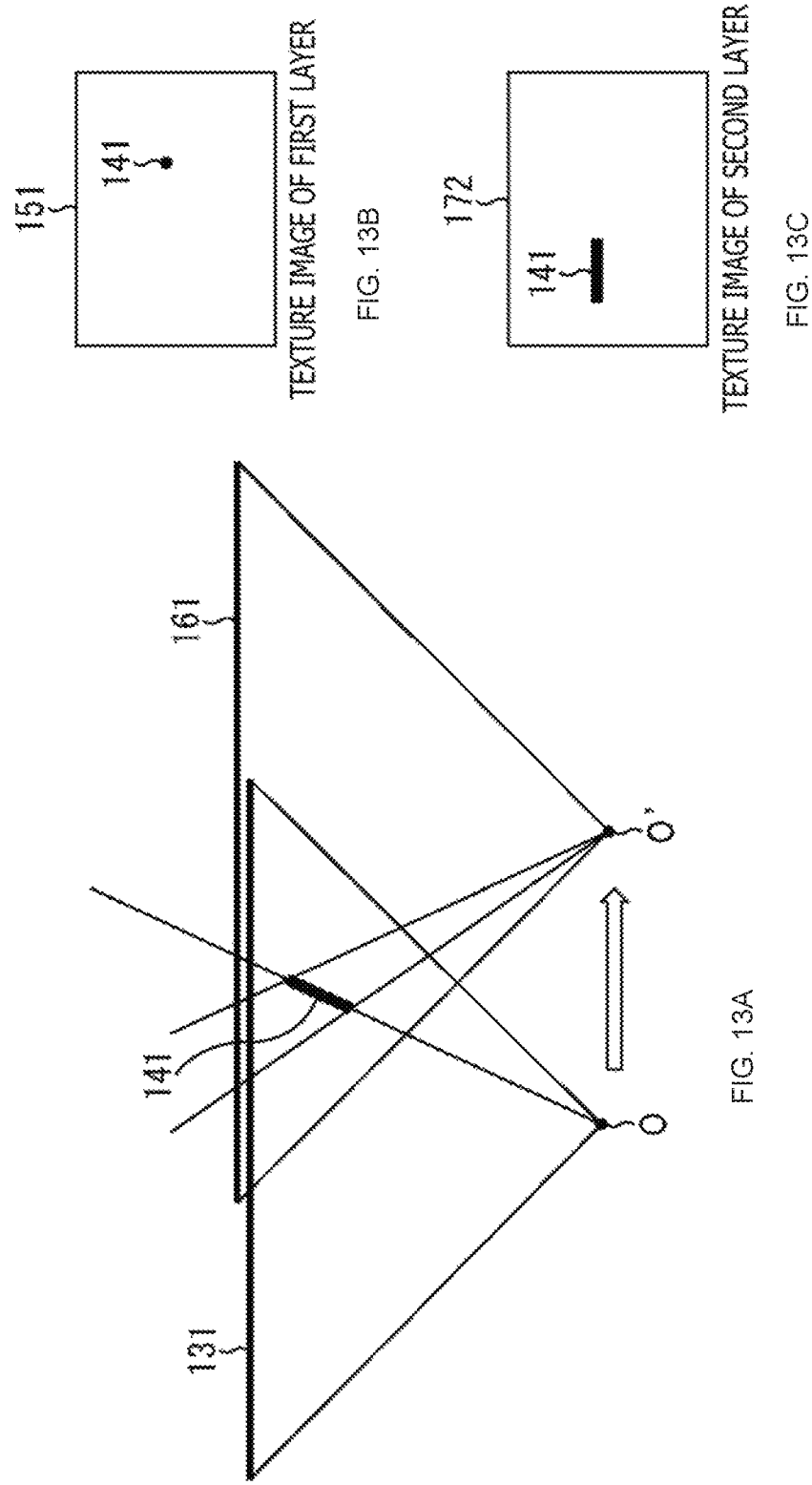

FIG. 15

| FILE NAME | AZIMUTH ANGLE | ELEVATION ANGLE | ROTATION ANGLE | SIGHT LINE VECTOR (X, Y, Z) | | | VIEWPOINT POSITION INFORMATION (X, Y, Z) | | | TRANSVERSE ANGLE OF VIEW | VERTICAL ANGLE OF VIEW | TRANSVERSE PIXEL NUMBER | VERTICAL PIXEL NUMBER |
|---|---|---|---|---|---|---|---|---|---|---|---|---|---|
| posZ2 | 0° | 0° | 0° | 0 | 0 | +1 | 0 | 0 | 0 | 100° | 100° | 1024 | 1024 |
| negZ2 | −180° | 0° | 0° | 0 | 0 | −1 | 0 | 0 | 0 | 100° | 100° | 1024 | 1024 |
| posX2 | +90° | 0° | 0° | +1 | 0 | 0 | 0 | +a | 0 | 100° | 100° | 1024 | 1024 |
| negX2 | −90° | 0° | 0° | −1 | 0 | 0 | 0 | −a | 0 | 100° | 100° | 1024 | 1024 |
| posY2 | 0° | +90° | 0° | 0 | +1 | 0 | 0 | 0 | +a | 100° | 100° | 1024 | 1024 |
| negY2 | 0° | −90° | 0° | 0 | −1 | 0 | 0 | 0 | −a | 100° | 100° | 1024 | 1024 |

FIG. 17

| FILE NAME | AZIMUTH ANGLE | ELEVATION ANGLE | ROTATION ANGLE | SIGHT LINE VECTOR (X, Y, Z) | | | VIEWPOINT POSITION INFORMATION (X, Y, Z) | | | TRANSVERSE ANGLE OF VIEW | VERTICAL ANGLE OF VIEW | TRANSVERSE PIXEL NUMBER | VERTICAL PIXEL NUMBER |
|---|---|---|---|---|---|---|---|---|---|---|---|---|---|
| posZ2 | 0° | 0° | 0° | 0 | 0 | +1 | +a | −a | 0 | 100° | 100° | 1024 | 1024 |
| negZ2 | −180° | 0° | 0° | 0 | 0 | −1 | −a | +a | 0 | 100° | 100° | 1024 | 1024 |
| posX2 | +90° | 0° | 0° | +1 | 0 | 0 | 0 | +a | −a | 100° | 100° | 1024 | 1024 |
| negX2 | −90° | 0° | 0° | −1 | 0 | 0 | 0 | −a | +a | 100° | 100° | 1024 | 1024 |
| posY2 | 0° | +90° | 0° | 0 | +1 | 0 | −a | 0 | +a | 100° | 100° | 1024 | 1024 |
| negY2 | 0° | −90° | 0° | 0 | −1 | 0 | +a | 0 | −a | 100° | 100° | 1024 | 1024 |

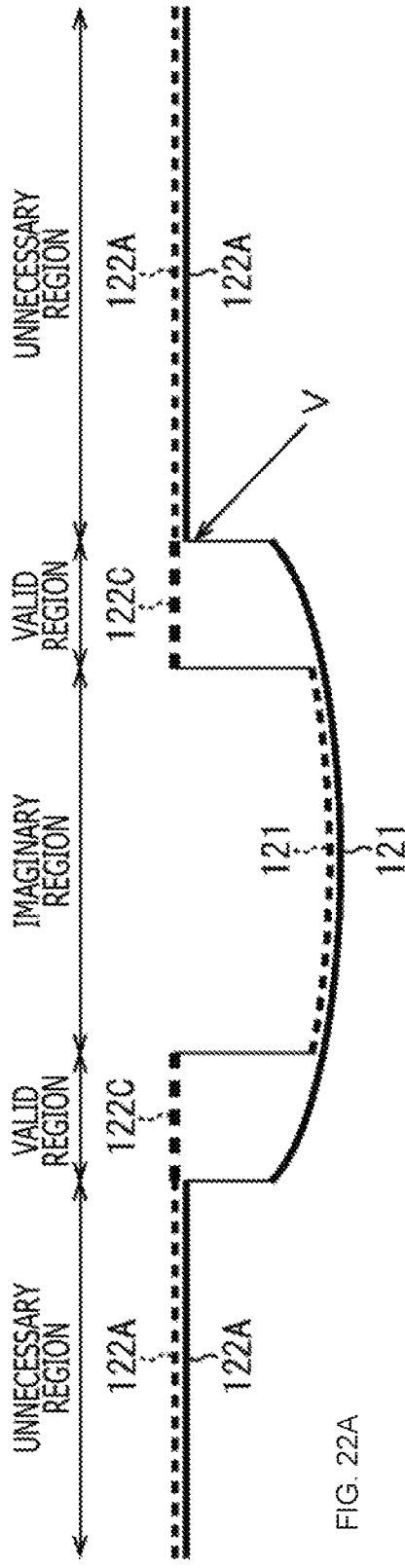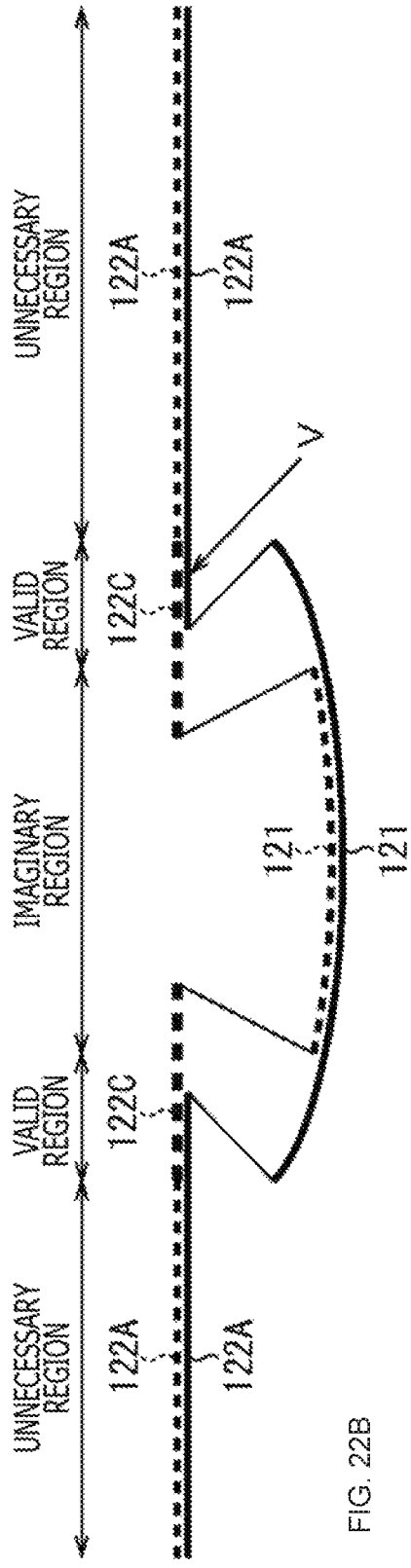

F I G. 3 7

| ADDITION FACTOR | REFERENCE VALUE | WEIGHT COEFFICIENT |
|---|---|---|
| RECOMMENDED VIEWING DIRECTION | 1 : SETTING PRESENT<br>0 : SETTING ABSENT | 10 |
| VISUAL FIELD OF VIEWER | 2 : CENTER OF VISUAL FIELD<br>1 : PERIPHERY OF VISUAL FIELD<br>0 : OUTSIDE OF VISUAL FIELD | 5 |
| LAYER | 2 : FIRST LAYER<br>1 : SECOND LAYER<br>0 : ANY OTHER LAYER | 4 |
| NOTICED OBJECT A (PERSON) | 1 : PRESENT<br>0 : ABSENT | 3 |
| NOTICED OBJECT B<br>(SOUND SOURCE WITH GREAT VOLUME) | 1 : PRESENT<br>0 : ABSENT | 2 |
| NOTICED OBJECT C<br>(VISUALLY PROMINENT IMAGING OBJECT) | 1 : PRESENT<br>0 : ABSENT | 1 |

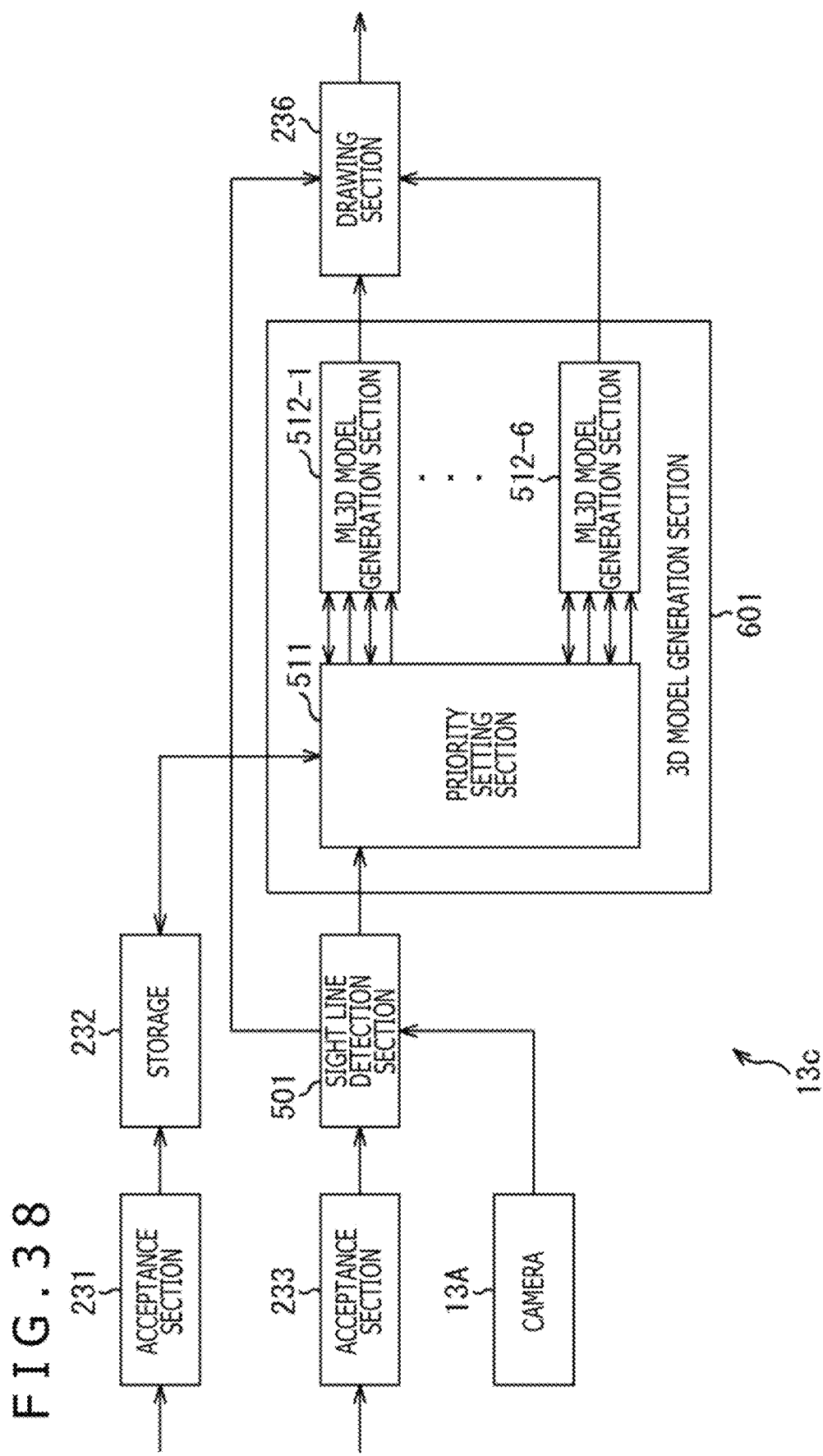

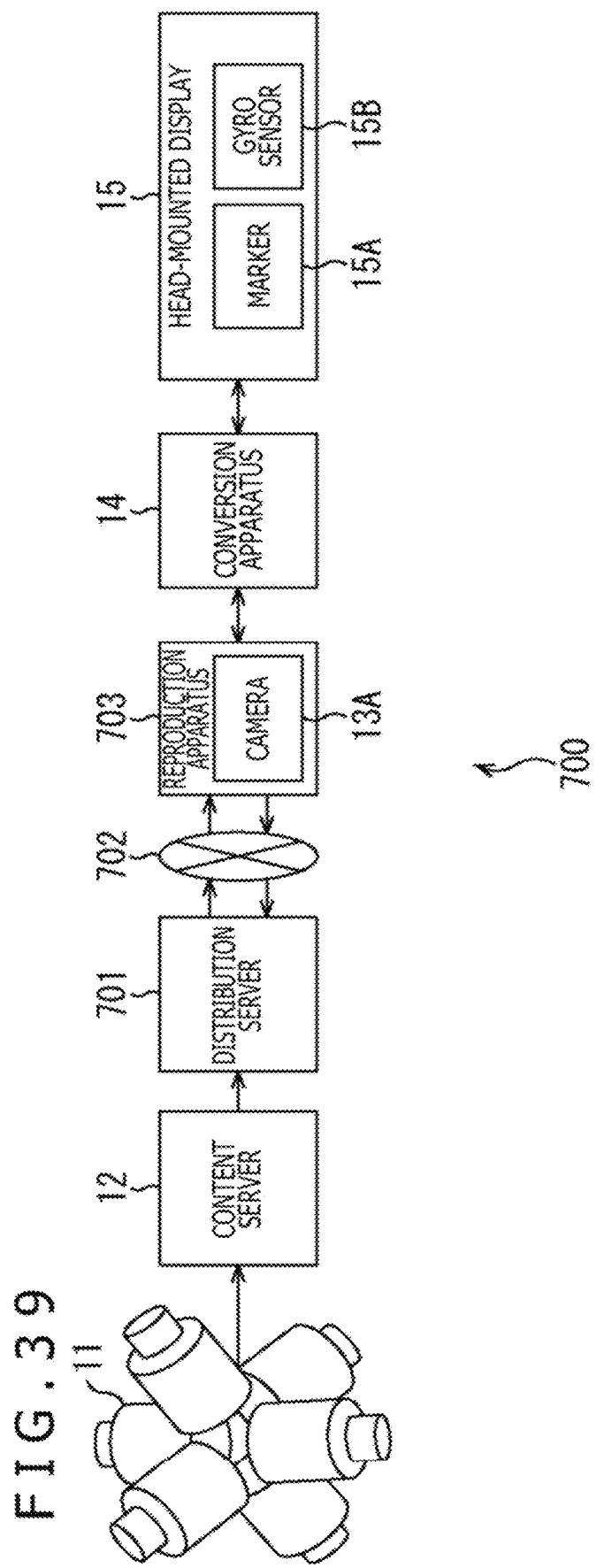

FIG.41

| ID | ROTATION | TRANSLATION |
|---|---|---|
| 1 | R1 | T1 |
| 2 | R2 | T2 |
| ⋮ | ⋮ | ⋮ |

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/026411 filed on Jul. 21, 2017, which claims priority benefit of Japanese Patent Application No. JP 2016-154453 filed in the Japan Patent Office on Aug. 5, 2016. Each of the above-referenced applications is hereby incorporated herein by reference in its entirety.

TECHNICAL FIELD

The present disclosure relates to an image processing apparatus and an image processing method, and particularly to an image processing apparatus and an image processing method that make it possible to suppress deterioration of the picture quality of an image within a viewing range of a viewer.

BACKGROUND ART

A recording apparatus is available which generates, from picked up images in all directions imaged by a multi camera, an omnidirectional image obtained by mapping images around 360 degrees in a horizontal direction and around 180 degrees in a vertical direction to a 2D image (planar image) and encodes and records the omnidirectional image (for example, refer to PTL 1).

In such a recording apparatus as just described, a method of mapping from a 3D image to a 2D image such as positive pyramid projection or cube mapping is used as a generation method of an omnidirectional image. In the case where positive pyramid projection is used as the generation method of an omnidirectional image, the omnidirectional image is an image by positive pyramid projection of a sphere when picked up images are mapped to the surface of the sphere. Meanwhile, in the case where cube mapping is used as the generation method of an omnidirectional image, the omnidirectional image is an image of a development of a cube when picked up images are mapped to the surface of the cube (cube).

On the other hand, a reproduction apparatus is available which decodes an encoded stream of an omnidirectional image recorded by a recording apparatus and uses an omnidirectional image obtained as a result of the decoding to cause an image within a viewing range of a viewer to be displayed. Such a reproduction apparatus as just described pastes an omnidirectional image as a texture to the surface of a 3D model such as a sphere or a cube and causes displaying of an image within a viewing range of a viewer when the texture on the surface of the 3D model in a direction of a sight line vector of the viewer is viewed from one point in the inside of the 3D model. Consequently, picked up images within the viewing range of the viewer are reproduced.

This reproduction method is called, in the fields of CG (Computer Graphics), environmental light model. Further, an environmental light model in which images generated by positive pyramid projection are pasted to the surface of a sphere is called Sphere Model, and an environmental light mode in which images generated by cube mapping are pasted to the surface of a cube is called Cube Model.

A picked up image within a viewing range of a viewer can be reproduced using only a region of an omnidirectional image corresponding to a sight line vector of the viewer. For example, in the case where the visual field angle in the horizontal direction is 90 degrees, in regard to the horizontal direction, only one fourth of the omnidirectional image in which images in all directions around 360 degrees in the horizontal direction are mapped is used for reproduction of a picked up image in the viewing range of the viewer. This similarly applies also to the vertical direction.

Accordingly, it is wasteful to decode an encoded stream of an entire omnidirectional image. However, since the sight line vector is determined by the viewer, it is not possible for a recording apparatus to encode only a region of the omnidirectional image corresponding to the sight line vector.

Further, in the case where the omnidirectional image is encoded by a general encoding method such as MPEG2 (Moving Picture Experts Group phase 2) or AVC (Advanced Video Coding)/H.264, encoding is performed using information of the overall screen image. Accordingly, it is difficult to decode, from an encoded stream in which an omnidirectional image is encoded as one image, only the encoded stream in a region corresponding to a sight line vector of a viewer.

Therefore, it is conceived to reduce the load of a decoding process by causing a recording apparatus to divide and encode an omnidirectional image and causing a reproduction apparatus to decode only an encoded stream of a divisional region corresponding to a sight line vector of a viewer (for example, PTL 2 and PTL 3)

CITATION LIST

Patent Literature

[PTL 1]
  Japanese Patent Laid-Open No. 2006-14174
[PTL 2]
  Japanese Patent Laid-Open No. 2001-298652
[PTL 3]
  Japanese Patent Laid-Open No. 2002-312778

SUMMARY

Technical Problem

However, in the technologies of PTL 2 and PTL 3, for example, in the case where the sight line vector of a viewer changes abruptly, there is the possibility that the decoding process of a divisional region corresponding to the sight line vector after the change may not be performed in time and non-display, freeze or delay in update of all or part of the image within the viewing range of the viewer may occur, resulting in deterioration of the picture quality.

If the number of divisional regions to be decoded is increased in order to prevent this, then the load of the decoding process increases after all. As a result, for example, by such factors of the processing capacitor of the reproduction apparatus and so forth, there is the possibility that the decoding process may be delayed and non-display, freeze or delay in update of all or part of the image within the viewing range of the viewer may occur, resulting in deterioration of the picture quality.

The present disclosure has been made in view of such a situation as described above and makes it possible to suppress deterioration of the picture quality of an image within a viewing range of a viewer.

Solution to Problem

An image processing apparatus of a first aspect of the present disclosure is an image processing apparatus, including: an image processing section configured to perform, based on priorities between a plurality of encoded streams obtained by encoding a plurality of projection images that are obtained by projecting an omnidirectional image to a plurality of faces or a plurality of viewpoint images from different viewpoints, decoding of the encoded streams and generation or selection of an image to be used for generation of a display image; and a drawing section configured to generate the display image based on the generated or selected image.

An image processing method of the first aspect of the present disclosure corresponds to the image processing apparatus of the first aspect of the present disclosure.

An image processing apparatus of a second aspect of the present disclosure is an image processing apparatus, including: an image acquisition section configured to acquire a plurality of projection images obtained by projecting an omnidirectional image to a plurality of faces or a plurality of viewpoint images from different viewpoints; and a transmission section configured to transmit part or all of the plurality of projection images or the plurality of viewpoint images based on priorities between the plurality of projection images or between the plurality of viewpoint images.

An image processing method of the second aspect of the present disclosure corresponds to the image processing apparatus of the second aspect of the present disclosure.

In the first aspect of the present disclosure, based on priorities between a plurality of encoded streams obtained by encoding a plurality of projection images that are obtained by projecting an omnidirectional image to a plurality of faces or a plurality of viewpoint images from different viewpoints, decoding of the encoded streams and generation or selection of an image to be used for generation of a display image are performed, and the display image is generated based on the generated or selected image.

In the second aspect of the present disclosure, a plurality of projection images obtained by projecting an omnidirectional image to a plurality of faces or a plurality of viewpoint images from different viewpoints are acquired, and part or all of the plurality of projection images or the plurality of viewpoint images are transmitted based on priorities between the plurality of projection images or between the plurality of viewpoint images.

It is to be noted that the image processing apparatus of the first aspect or the second aspect of the present disclosure can be implemented by causing a computer to execute a program.

Further, the program for being executed by a computer in order to implement the image processing apparatus of the first aspect or the second aspect of the present disclosure can be provided by transmission through a transmission medium or by recording the program on a recording medium.

Advantageous Effects of Invention

According to the first aspect of the present disclosure, an image can be generated. Further, according to the first aspect of the present disclosure, deterioration of the picture quality of an image within the viewing range of the viewer can be suppressed.

According to the second aspect of the present disclosure, an image can be transmitted. Further, according to the second aspect of the present disclosure, deterioration of the picture quality of an image within the viewing range of the viewer can be suppressed.

It is to be noted that the advantageous effects described here are not necessarily restrictive and may be some advantageous effects described in the present disclosure.

BRIEF DESCRIPTION OF DRAWINGS

FIG. 9 is a view depicting a configuration example of a table for viewpoint position information and face information of the first layer.

FIG. 10 is a view depicting a position in a depth direction of an imaging object corresponding to a predetermined face of the first layer.

FIG. 11 is a view depicting a configuration example of texture images of the first layer and a second layer.

FIGS. 12A, 12B, and 12C are views illustrating an example of texture images of the first layer and the second layer.

FIGS. 13A, 13B, and 13C are views illustrating another example of texture images of the first layer and the second layer.

FIGS. 14A and 114B are views depicting a first example of viewpoints of the second layer.

FIG. 15 is a view depicting a first configuration example of a table of viewpoint position information and face information of the second layer.

FIG. 17 is a view depicting a second configuration example of a table of viewpoint position information and face information of the second layer.

FIGS. 22A and 22B are views illustrating an example of connection information.

FIG. 37 is a view depicting an example of a score calculation table.

FIG. 38 is a block diagram depicting a configuration example of a third embodiment of the home server.

FIG. 39 is a block diagram depicting a configuration example of a second embodiment of the image displaying system.

FIG. 41 is a view depicting an example of a data configuration of imaging viewpoint metadata.

DESCRIPTION OF EMBODIMENTS

In the following, a mode for carrying out the present disclosure (hereinafter referred to as embodiment) is described. It is to be noted that the description is given in the following order.

1. First Embodiment: Image Displaying System
2. Second Embodiment: Home Server
3. Third Embodiment: Home Server
4. Fourth Embodiment: Image Displaying System
5. Fifth Embodiment: Image Displaying System
6. Modification Example
7. Application Example First Embodiment Configuration Example of First Embodiment of Image Displaying System FIG. 1 is a block diagram depicting a configuration example of a first embodiment of an image displaying system to which the present disclosure is applied.

Figure 1:
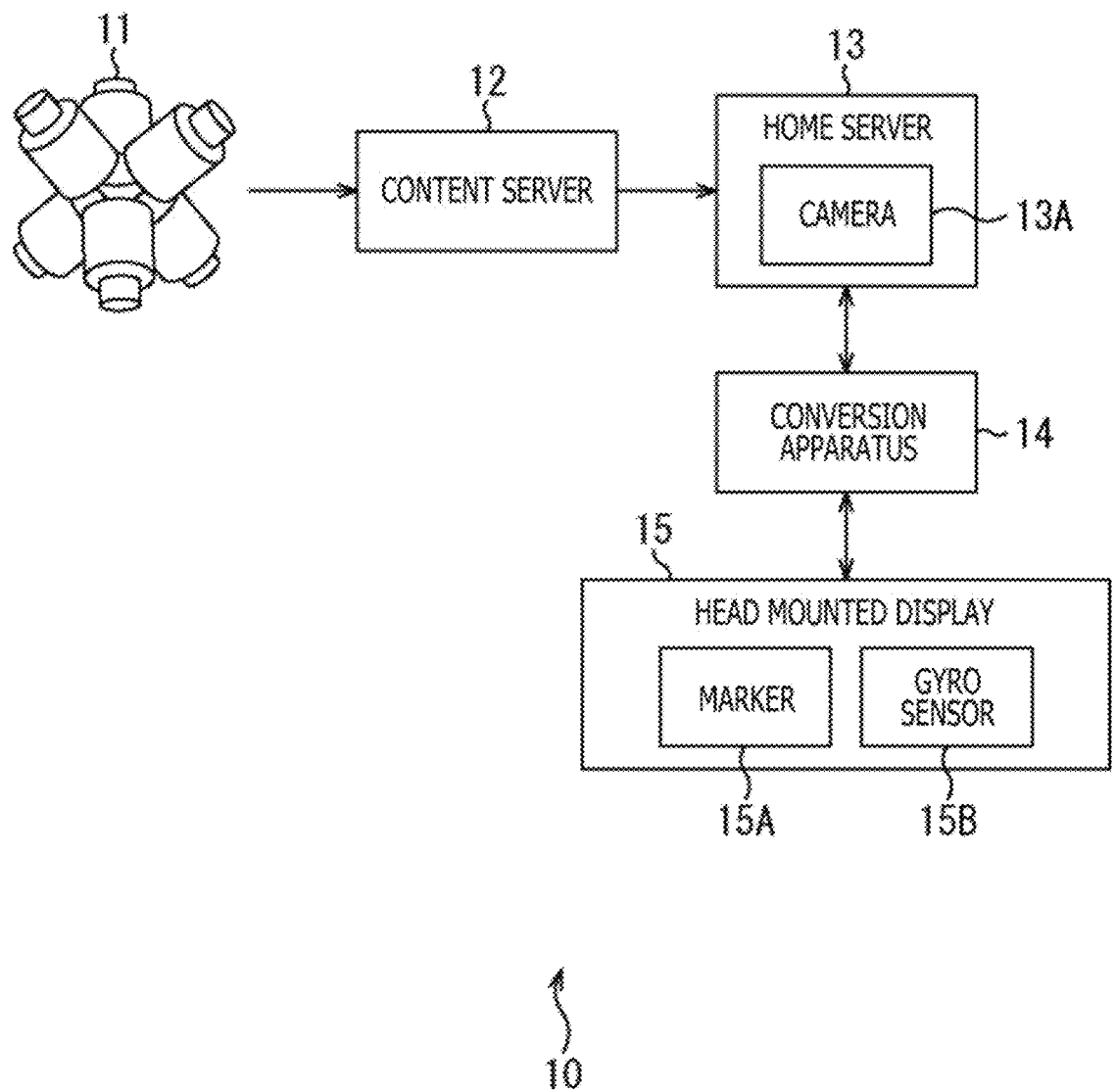
FIG. 1 is a block diagram depicting a configuration example of a first embodiment of an image displaying system.

The image displaying system 10 of FIG. 1 is configured from a multi camera 11, a content server 12, a home server 13, a conversion apparatus 14, and a head mounted display 15. The image displaying system 10 generates an omnidirectional image from picked up images that are YCbCr images (YUV images) picked up by the multi camera 11 and displays an image of a viewing range of a viewer from within the omnidirectional image.

In particular, the multi camera 11 of the image displaying system 10 is configured from a plurality of (in the example of FIG. 1, six) cameras disposed outward such that an imaging range thereof is 360 degrees around in a horizontal direction and 180 degrees around in a vertical direction. Each camera performs imaging to generate a picked up image in a unit of a frame. The multi camera 11 supplies the picked up images of the cameras to the content server 12.

The content server 12 generates a texture image and a depth image of an omnidirectional image of a predetermined viewpoint from picked up images of the cameras supplied from the multi camera 11. In the first embodiment, a depth image is an image, in which a pixel value is given by a reciprocal 1/r of a distance r of a straight line from the predetermined viewpoint to an imaging object on each pixel, the distance r being a value of 8 bits.

The content server 12 reduces the resolution of a texture image and a depth image of an omnidirectional image to generate a low resolution texture image and a low resolution depth image. The content server 12 compression encodes the low resolution texture image and the low resolution depth image by an encoding method such as AVC (Advanced Video Coding), HEVC (High Efficiency Video Coding)/H.265 or the like. The content server 12 stores an encoded stream of the low resolution texture image (hereinafter referred to as low resolution texture stream) and an encoded stream of the low resolution depth image (hereinafter referred to as low resolution depth stream) obtained as a result of the compression encoding.

It is to be noted that, in the following description, in the case where a low resolution texture stream and a low resolution depth stream need not be distinguished from each other, each of them is referred to as low resolution encoded stream.

Further, the content server 12 uses picked up images of the cameras to generate texture images and depth images corresponding to six faces configuring a cube centered at the viewpoint of the omnidirectional image in a hierarchized relationship. In particular, the content server 12 generates texture images and depth images of a first layer and a second layer of the six faces. It is to be noted that the viewpoint of the omnidirectional image and the center of the cube may be different from each other.

The content server 12 compression encodes a first layer image configured from a texture image and a depth image of the first layer of each face and a second layer image configured from a texture image and a depth image of the second layer of each face in accordance with an encoding method such as AVC, HEVC or the like for each face, each type of image and each layer. The content server 12 stores an encoded stream of a texture image of the first layer (hereinafter referred to as first layer texture stream), an encoded stream of a depth images of the first layer (hereinafter referred to as first layer depth stream), an encoded stream of a texture image of the second layer (hereinafter referred to as second layer texture stream) and an encoded stream of a depth image of the second layer (hereinafter referred to as second layer depth stream) of each face obtained as a result of the compression encoding. It is to be noted that the encoding method for the first layer images and the second layer images may be the MVC (Multiview Video Coding) method, 3D-HEVC method or the like.

It is to be noted that, in the following description, in the case where there is no necessity to individually distinguish a first layer texture stream, a first layer depth stream, a second layer texture stream and a second layer depth stream from each other, each of them is referred to as high resolution encoded stream.

Further, the content server 12 generates and stores information and so forth relating to the faces of the first layer and the second layer as metadata. The content server 12 transmits the low resolution texture stream and the low resolution depth stream, the first layer texture streams, first layer depth streams, second layer texture streams and second layer depth streams of the six faces and the metadata stored therein to the home server 13 through a network not depicted.

It is to be noted that also it is possible for the content server 12 to reconstruct (details are hereinafter described) a first layer texture stream, a first layer depth stream, a second layer texture stream and a second layer depth stream of the six faces. In this case, also it is possible for the content server 12 to transmit the first layer texture streams, first layer depth streams, second layer texture streams and second layer depth streams after the reconstruction and metadata corresponding to them to the home server 13. However, it is assumed that, in the following description, even in the case where reconstruction is performed, the first layer texture streams, first layer depth streams, second layer texture streams and second layer depth streams of the six faces before the reconstruction are transmitted to the content server 12.

The home server 13 (image processing apparatus) receives a low resolution texture stream and a low resolution depth stream, first layer texture streams, first layer depth streams, second layer texture streams and second layer depth streams of the six faces and metadata transmitted thereto from the content server 12.

Further, the home server 13 has a camera 13A built therein and images a marker 15A applied to the head mounted display 15 mounted on the head of a viewer. Then, the home server 13 detects a viewing position on the basis of the picked up image of the marker 15A. Furthermore, the home server 13 receives a detection result of a gyro sensor 15B of the head mounted display 15 from the head mounted display 15 through the conversion apparatus 14. The home server 13 determines a sight line direction of the viewer on the basis of the detection result of the gyro sensor 15B and determines a viewing range of the viewer on the basis of the viewing position and the sight line direction.

The home server 13 has three faces corresponding to the sight line direction of the viewer from the six faces of the first layer. Then, the home server 13 decodes the first layer texture streams, first layer depth streams, second layer texture streams and second layer depth streams corresponding to the selected three faces. Consequently, the home server 13 generates texture images and depth images of the first layer and the second layer corresponding to the selected three faces.

Further, the home server 13 decodes the low resolution texture stream and the low resolution depth stream to generate a low resolution texture image and a low resolution depth image. The home server 13 generates an image of the viewing range of the viewer as a display image using the texture images and the depth images of the first layer and the second layer corresponding to the selected three faces as well as the low resolution texture image and the low resolution depth image. The home server 13 transmits the display image to the conversion apparatus 14 through an HDMI (registered trademark) (High-Definition Multimedia Interface) cable not depicted.

The conversion apparatus 14 converts coordinates on the display image transmitted thereto from the home server 13 into coordinates in the head mounted display 15. The conversion apparatus 14 supplies the display image after the coordinate conversion to the head mounted display 15.

The head mounted display 15 has the marker 15A and the gyro sensor 15B and is mounted on the head of a viewer. The head mounted display 15 displays a display image supplied from the conversion apparatus 14. Further, the gyro sensor 15B built in the head mounted display 15 detects an inclination of the head mounted display 15 and transmits a result of the detection to the home server 13 through the conversion apparatus 14.

(Configuration Example of Content Server)

Figure 2:
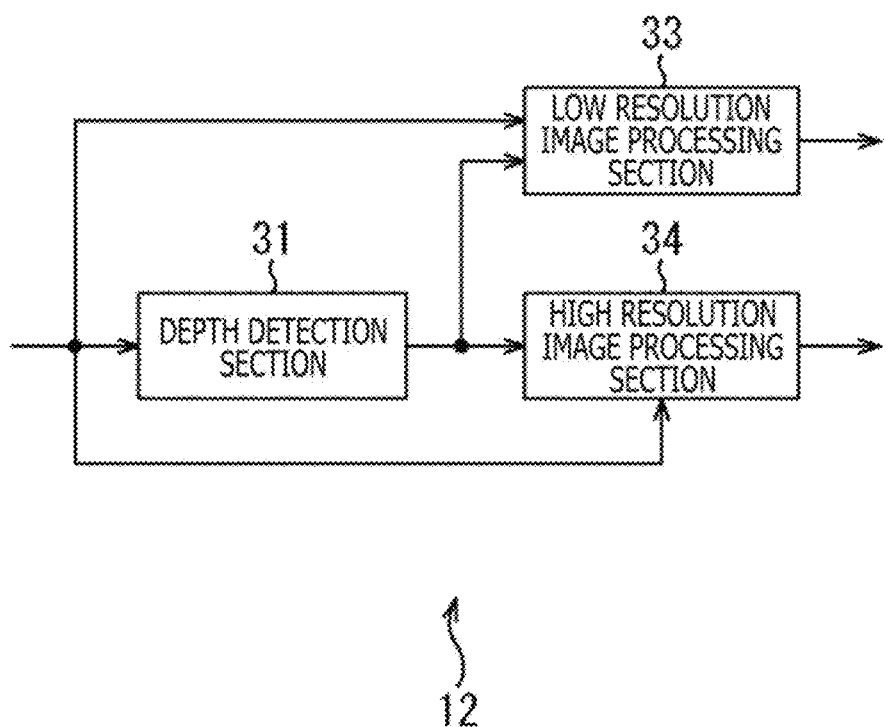
FIG. 2 is a block diagram depicting a configuration example of a content server.

FIG. 2 is a block diagram depicting a configuration example of the content server 12 of FIG. 1.

The content server 12 of FIG. 2 is configured from a depth detection section 31, a low resolution image processing section 33 and a high resolution image processing section 34.

The depth detection section 31 of the content server 12 detects, for each of pixels of picked up images of the cameras supplied from the multi camera 11 of FIG. 1, a reciprocal 1/z of a distance z in the depth direction between a depth plane perpendicular to the depth direction including an imaging object at the pixel and the camera. The depth detection section 31 supplies z images having pixel values set to the reciprocals 1/z of the pixels of the picked up images of the cameras obtained as a result of the low resolution image processing section 33 and the high resolution image processing section 34.

The low resolution image processing section 33 performs mapping (perspective projection) of picked up images of the cameras supplied from the multi camera 11 to a regular octahedron centered at the viewpoint set to a predetermined three-dimensional position in a three-dimensional coordinate system of the multi camera 11 (hereinafter referred to as camera coordinate system) to generate a texture image of an omnidirectional image. Further, the low resolution image processing section 33 performs mapping of z images of the cameras supplied thereto from the depth detection section 31 to the regular octahedron similarly to the picked up images to generate z images of the omnidirectional image.

The low resolution image processing section 33 converts the reciprocal 1/z of each of the pixels of the z image of the omnidirectional image into a reciprocal 1/r. Then, the low resolution image processing section 33 performs 8-bit quantization for the reciprocal 1/r in accordance with the following expression (1).

[Math. 1]

$$I_d(r) = \text{round}\left[255\left(\frac{1}{r} - \frac{1}{r_{max}}\right) \Big/ \left(\frac{1}{r_{min}} - \frac{1}{r_{max}}\right)\right] \quad (1)$$

It is to be noted that $I_d(r)$ is a value of the reciprocal 1/r of the distance r after the 8-bit quantization. $r_{max}$ and $r_{min}$ are a maximum value and a minimum value of the distance r in the omnidirectional image, respectively.

The low resolution image processing section 33 sets values of the reciprocals 1/r of the pixels of the omnidirectional image after the 8-bit quantization as pixel values to generate depth images of the omnidirectional image.

The low resolution image processing section 33 reduces the resolution of the texture images and the depth images of the omnidirectional image to generate low resolution texture images and low resolution depth images. The low resolution image processing section 33 compression encodes the low resolution texture images and the low resolution depth images and stores low resolution texture streams and low resolution depth streams obtained as a result of the compression encoding. The low resolution image processing section 33 transmits the low resolution texture streams and the low resolution depth streams stored therein to the home server 13 of FIG. 1.

The high resolution image processing section 34 uses the picked up images of the cameras supplied from the multi camera 11 to generate texture images of the first layer and the second layer corresponding to the six faces configuring a cube having the center same as that of the regular octahedron in the low resolution image processing section 33. The high resolution image processing section 34 uses the z images of the cameras supplied from the depth detection section 31 to generate depth images of the first layer and the second layer corresponding to the six faces similarly to the picked up images.

The high resolution image processing section 34 compression encodes the texture images and the depth images of the first layer and the second layer for each face, each kind of image and each layer. The content server 12 stores first layer texture streams, first layer depth streams, second layer texture streams and second layer depth streams obtained as a result of the compression encoding.

Further, the high resolution image processing section 34 generates and stores metadata. The content server 12 transmits the first layer texture streams, first layer depth streams, second layer texture streams and second layer depth streams of the six faces and the metadata stored therein to the home server 13 through a network not depicted.

(Configuration Example of High Resolution Image Processing Section)

Figure 3:
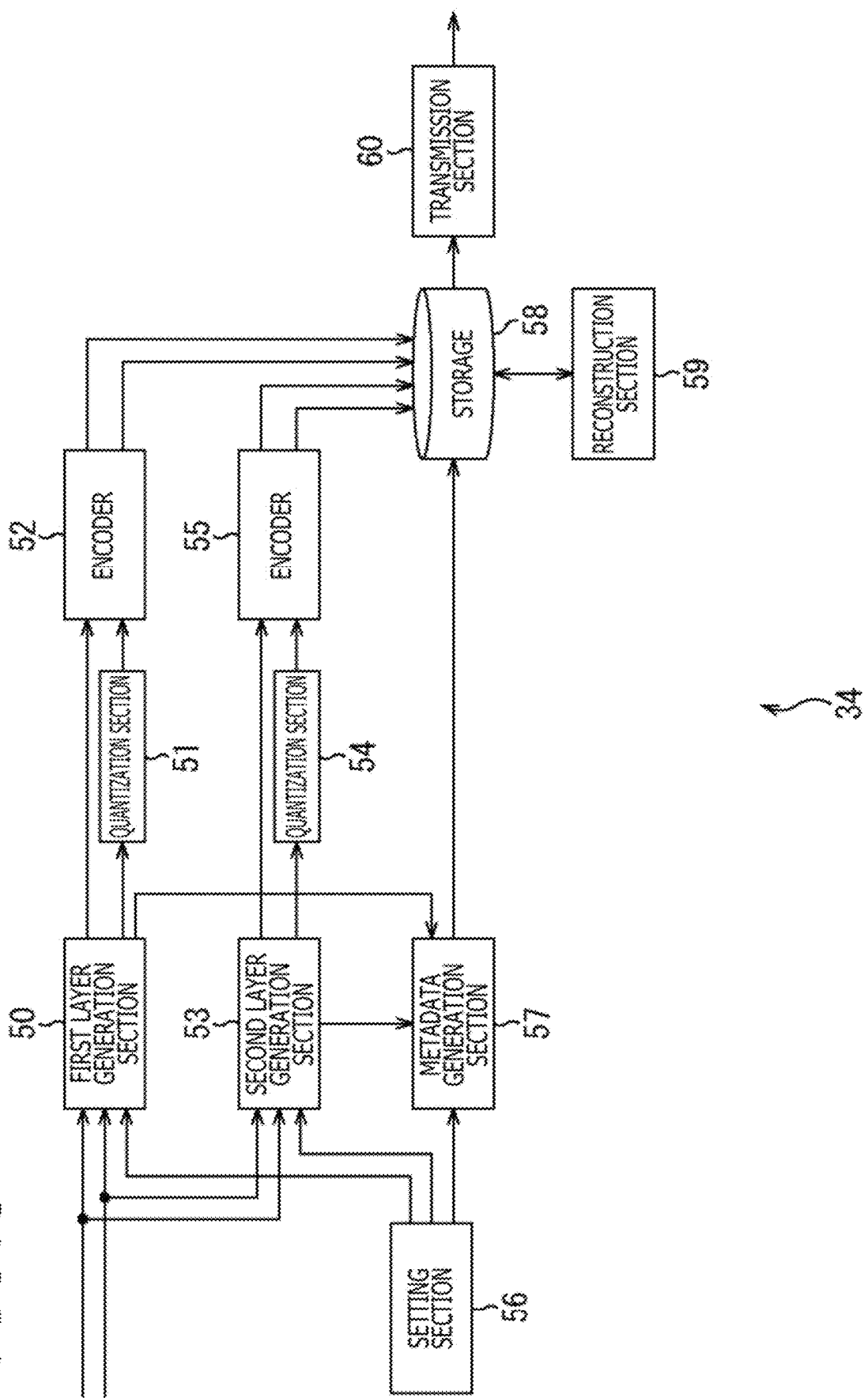
FIG. 3 is a block diagram depicting a configuration example of a high resolution image processing section.

FIG. 3 is a block diagram depicting a configuration example of the high resolution image processing section 34 of FIG. 2.

The high resolution image processing section 34 of FIG. 3 is configured from a first layer generation section 50, a quantization section 51, an encoder 52, a second layer generation section 53, another quantization section 54, another encoder 55, a setting section 56, a metadata generation section 57, a storage 58, a reconstruction section 59 and a transmission section 60.

To the first layer generation section 50, viewpoint position information indicative of the origin as a three-dimensional position of the viewpoint of the first layer in a three-dimensional coordinate system whose origin is given by the viewpoint of the omnidirectional image in the camera coordinate system (hereinafter referred to as 3D model coordinate system) is supplied from the setting section 56. Further, to the first layer generation section 50, face information indicative of three-dimensional positions and sizes in the 3D model coordinate system of six faces individually including the six faces configuring a cube centered at the origin of the 3D model coordinate system is supplied.

The first layer generation section 50 sets the origin indicated by the viewpoint position information to the viewpoint of the first layer (first viewpoint). The first layer generation section 50 performs, setting the viewpoint of the omnidirectional image in the camera coordinate system as the origin, mapping of the picked up images supplied from the multi camera 11 of FIG. 1 individually to the faces of the three-dimensional positions and the sizes indicated by the face information of the six faces from the viewpoint of the first layer. Consequently, the first layer generation section 50 generates texture images of the six faces of the first layer.

Further, the first layer generation section 50 performs a face recognition process in the texture image of each face of the first layer. Then, the first layer generation section 50 generates face detection information indicative of the presence or absence of the face of a person in a texture image of each face of the first layer and supplies the face detection information to the metadata generation section 57.

Further, the first layer generation section 50 performs, setting the viewpoint of the omnidirectional image in the camera coordinate system as the origin, mapping of the z images supplied from the depth detection section 31 of FIG. 2 individually to the faces of the three-dimensional positions and the sizes indicated by the face information of the six faces from the viewpoint of the first layer. Consequently, the first layer generation section 50 generates z images of the six faces of the first layer.

Since the viewpoints corresponding to the six faces of the first layer are same as each other, it can be regarded that the texture images of the six faces of the first layer are images obtained by mapping the omnidirectional image mapped to the 3D model centered at the viewpoint of the first layer to the six faces. Similarly, it can be regarded that the z images of the six faces of the first layer are images obtained by mapping the z images of the omnidirectional image mapped to the 3D model centered at the viewpoint of the first layer to the six faces. The first layer generation section 50 supplies the texture images of the six faces of the first layer to the encoder 52 and supplies the z images of the six faces of the first layer to the quantization section 51.

The quantization section 51 converts a reciprocal 1/z of each of the pixels of the z images of the six faces of the first layer supplied thereto from the first layer generation section 50 into a reciprocal 1/r. Then, the quantization section 51 performs 8-bit quantization for the reciprocals 1/r in accordance with the expression (1) given hereinabove. It is to be noted that $r_{max}$ and $r_{min}$ in the expression (1) are a maximum value and a minimum value of the distance r in all of the six faces, respectively. By setting $r_{max}$ and $r_{min}$ to a maximum value and a minimum value of the distance r in each face, respectively, the quantization step can be prevented from changing for each face in comparison with an alternative case in which a maximum value and a minimum value of the distance r of each face are used. The quantization section 51 generates depth images of the six faces of the first layer by setting the values after 8-bit quantization of the reciprocals 1/r of the pixels of the z images of the six faces of the first layer as pixel values and supplies the depth images to the encoder 52.

The encoder 52 compression encodes the texture images and the depth images of the six faces of the first layer for each face and for each kind of image to generate first layer texture streams and first layer depth streams. The encoder 52 supplies the first layer texture streams and the first layer depth streams to the storage 58.

To the second layer generation section 53, viewpoint position information of a viewpoint (second viewpoint), different from the viewpoint of the first layer, of each face of the second layer corresponding to each face of the first layer and face information of each face of the second layer corresponding to each face of the first layer are supplied from the setting section 56. The second layer generation section 53 sets, for each face of the second layer, a three-dimensional position indicated by the viewpoint position information corresponding to the face to a viewpoint of the second layer.

The second layer generation section 53 performs, for each face of the second layer, mapping of an occlusion region at the viewpoint of the first layer from within picked up images supplied from the multi camera 11 from the viewpoint of the second layer corresponding to the face to the face of the second layer. Consequently, the second layer generation section 53 generates texture images of the six faces of the second layer.

Further, the second layer generation section 53 performs a face recognition process in a texture image of each face of the second layer. Then, the second layer generation section 53 generates face detection information indicative of the presence or absence of the face of a person in the texture image of each of the faces of the second layer and supplies the face detection information to the metadata generation section 57.

Furthermore, the second layer generation section 53 performs, for each of the faces of the second layer, mapping of an occlusion region at the viewpoint of the first layer from within the z images supplied from the depth detection section 31 to the face of the second layer from the viewpoint of the second layer corresponding to the face of the second layer.

Consequently, the second layer generation section 53 generates z images of the six faces of the second layer.

In particular, since the positions of the cameras of the multi camera 11 are different from each other, when one three-dimensional position in the camera coordinate system is set as a viewpoint, the picked up image includes an occlusion region at the viewpoint. However, since a texture image of the first layer is generated by mapping an omnidirectional image at one viewpoint, the texture image of the first layer does not include a picked up image of the occlusion region at the viewpoint. Therefore, the second layer generation section 53 places the picked up image in the occlusion region as a texture image of the second layer. This similarly applies also to the z images. The second layer generation section 53 supplies the texture images of the six faces of the second layer to the encoder 55 and supplies the z images of the six faces of the second layer to the quantization section 54.

The quantization section 54 converts a reciprocal 1/z of each of the pixels of the z images of the six faces of the second layer supplied thereto from the second layer generation section 53 into a reciprocal 1/r. Then, the quantization section 54 performs 8-bit quantization for the reciprocals 1/r in accordance with the expression (1) given hereinabove similarly to the quantization section 51. The quantization section 54 generates depth images of the six faces of the second layer by setting the values after 8-bit quantization of the reciprocals 1/r of the pixels of the z images of the six faces of the second layer as pixel values and supplies the depth images to the encoder 55.

The encoder 55 compression encodes the texture images and the depth images of the six faces of the second layer for each face and for each kind of image to generate second layer texture streams and second layer depth streams. The encoder 55 supplies the second layer texture streams and the second layer depth streams to the storage 58.

The setting section 56 sets the origin of the 3D model coordinate system as the viewpoint of the first layer. The setting section 56 sets the six faces individually including the six rectangular faces configuring the cube centered at the viewpoint of the first layer as faces of the first layer. Further, the setting section 56 sets, for each face of the first layer, a viewpoint and a rectangular face of the second layer.

The setting section 56 supplies the viewpoint position information of one viewpoint and the face information of the six faces of the first layer to the first layer generation section 50 and the metadata generation section 57. Further, the setting section 56 supplies the viewpoint position information of the six viewpoints and the face information of the six faces of the second layer corresponding to the six faces of the first layer to the second layer generation section 53 and the metadata generation section 57.

The setting section 56 sets a recommended viewing direction that is a direction in which viewing is recommended to the viewer as occasion demands. The recommended viewing direction is set, for example, by a provider of the omnidirectional image or the like, and, for example, in an omnidirectional image when a situation of a concert is imaged, the direction of an image on the stage side is set as the recommended viewing direction. The setting section 56 supplies recommended viewing direction information indicative of the recommended viewing direction to the metadata generation section 57.

The metadata generation section 57 generates face metadata on the basis of face detection information supplied from the first layer generation section 50 and the second layer generation section 53. The face metadata indicates a frame or a period in which the face of a person appears, for example, in the first layer texture streams and the second layer texture streams of the faces.

The metadata generation section 57 generates a table including the viewpoint position information and the face information of the first layer and the viewpoint position information and the face information of the second layer supplied thereto from the setting section 56, the recommended viewing direction information supplied from the setting section 56 and the metadata including the face metadata and supplies them to the storage 58.

The storage 58 stores the first layer texture streams and the first layer depth streams supplied from the encoder 52 and the second layer texture streams and the second layer depth streams supplied from the encoder 55. Further, the storage 58 stores the metadata supplied from the metadata generation section 57.

Further, the storage 58 stores the first layer texture streams, first layer depth streams, second layer texture streams and second layer depth streams and the metadata after reconstruction supplied from the reconstruction section 59.

The reconstruction section 59 reads out and reconstructs the first layer texture streams, first layer depth streams, second layer texture streams and second layer depth streams stored in the storage 58 as occasion demands.

In particular, the reconstruction section 59 uses the first layer texture streams before the reconstruction to change the number or the angle of view of the faces corresponding to the first layer texture streams and uses the first layer depth streams before the reconstruction to change the number or the angle of view of the faces corresponding to the first layer depth streams. For example, the reconstruction section 59 changes the faces of the first layer from six faces individually including six faces configuring a cube into 18 faces including, in addition to the six faces, 12 faces in which normals individually passing the centers of the six faces are lines that pass the midpoints of the 12 sides of the cube and the viewpoint.

As an alternative, the reconstruction section 59 uses the first layer texture streams before the reconstruction to change the distance between (density of) the faces corresponding to the first layer texture streams and uses the first layer depth streams before the reconstruction to change the distance between the faces corresponding to the first layer depth streams. For example, the reconstruction section 59 changes the faces of the first layer from six faces individually including six faces configuring a cube in which the distance between normals passing the center is 90 degrees into 18 faces the centers of which normal lines thereto having a distance of 45 degrees pass.

As the distance between the faces of the first layer decreases, the total data capacity increases because the number of faces increases, and the home server 13 can generate a display image using texture images and depth images corresponding to a plane of the first layer that is closer to the viewing range of the viewer. As a result, high resolution regions generated using texture images and depth images of the first layer or the second layer in the display image increase and the picture quality of the display image is improved.

It is to be noted that the reconstruction section 59 may use first layer texture streams before the reconstruction to change the position of faces corresponding to the first layer texture streams and use first layer depth streams before the reconstruction to change the position of faces corresponding to the first layer depth streams to perform reconstruction. In this case, the reconstruction section 59 performs reconstruction by rotating the cube corresponding to the six faces of the first layer such that, for example, when a main imaging object exists on the boundary of a face of the first layer, the main imaging object exists at a position other than the boundary of the first layer (for example, at the center).

Further, the reconstruction section 59 may use the first layer texture streams before reconstruction to change the inclination of the faces corresponding to the first layer texture streams and may use the first layer depth streams before reconstruction to change the inclination of the faces corresponding to the first layer depth streams to perform reconstruction. In this case, the reconstruction section 59 performs reconstruction, for example, by rotating, when a main imaging object in a texture image of the first layer is inclined, the cube corresponding to the six faces of the first layer such that the inclination disappears.

The reconstruction section 59 sets the viewpoints and the faces of the second layer after reproduction with respect to the faces of the first layer changed in such a manner as described above. Then, the reconstruction section 59 uses the second layer texture streams before reconstruction to change the viewpoints and the faces of the second layer texture streams to viewpoints and faces of the second layer after set reconstruction. Further, the reconstruction section 59 changes the second layer depth streams before reconstruction to change the viewpoints and the faces corresponding to the second layer depth streams to viewpoints and faces of the second layer after set reconstruction.

The reconstruction section 59 supplies the first layer texture streams, first layer depth streams, second layer texture streams and second layer depth streams after the reconstruction to the storage 58. Further, the reconstruction section 59 generates a table that includes the viewpoint position information and the face information of the first layer and the viewpoint position information and the face information of the second layer after the reconstruction, the recommended viewing direction information and the face metadata as metadata and supplies the metadata to the storage 58.

The transmission section 60 reads out the first layer texture streams, first layer depth streams, second layer texture streams and second layer depth streams of the six faces and the metadata from the storage 58 and transmits them to the home server 13 of FIG. 1.

In this manner, the high resolution image processing section 34 depicted in FIG. 3 generates a first layer image and a second layer image by perspective projection. Accordingly, the home server 13 can perform ordinary image processing for the first layer image and the second layer image. Further, the high resolution image processing section 34 can transmit the first layer texture streams, first layer depth streams, second layer texture streams and second layer depth streams by an ordinary transmission method for an encoded stream of an image.

(Description of Distance z and Distance r)

Figure 4B:
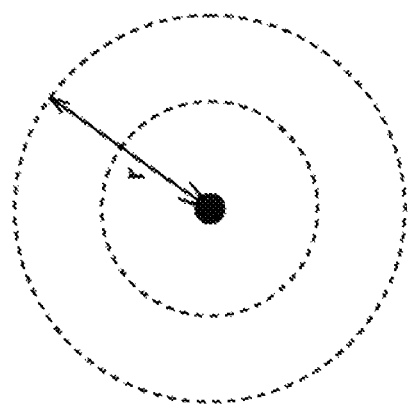
FIGS. 4A and 4B are views illustrating a distance z and a distance r.
Figure 4A:
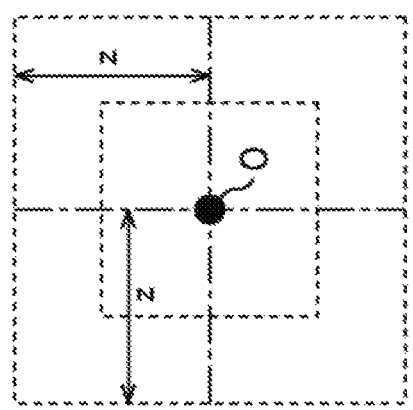

FIGS. 4A and 4B are views illustrating a distance z and a distance r.

It is to be noted that FIGS. 4A and 4B are views when a predetermined face of a cube corresponding to the first layer is viewed from above.

The distance z is a distance in the depth direction from a viewpoint to a depth plane perpendicular to the depth direction including an imaging object on each pixel. Further, the depth direction of each face of the first layer is a direction perpendicular to the face of the first layer. Accordingly, each face of the first layer and the depth plane are parallel to each other. Therefore, the shape of equal distance z faces that are depth planes whose distances z to the faces of the first layer are equal to each other is a cubic shape centered at the viewpoint O of the first layer. Accordingly, the shape of the equal distance z face as viewed from above a predetermined face of the cube corresponding to the first layer is a square as indicated by a broken line in A of FIG. 4A.

In contrast, the distance r is a linear distance from the viewpoint to an imaging object in each pixel. Further, the direction of a linear line from the viewpoint O of each face of the first layer to an imaging object is, irrespective of the face, a radial direction of a circle centered at the viewpoint O. Accordingly, the shape of the equal distance r face to which the distances r from the faces of the first layer are equal to each other is a spherical shape centered at the viewpoint O of the first layer. Therefore, the shape when the equal distance r face is viewed from above a predetermined face of the cube corresponding to the first layer is a circular shape as indicated by a broken line in FIG. 4B.

(Description of Advantageous Effect of Depth Image)

It is to be noted that, in the following description, three normal vectors orthogonal to each other from among six normal vectors that pass the viewpoint O of the first layer and the centers of the six faces that configure a cube 80 corresponding to the first layer are defined as positive directions of the X axis, Y axis and Z axis of a 3D model coordinate system, and three directions opposite to the three dimensions are defined as negative directions of the X axis, Y axis and Z axis of the 3D model coordinate system.

Figure 5:
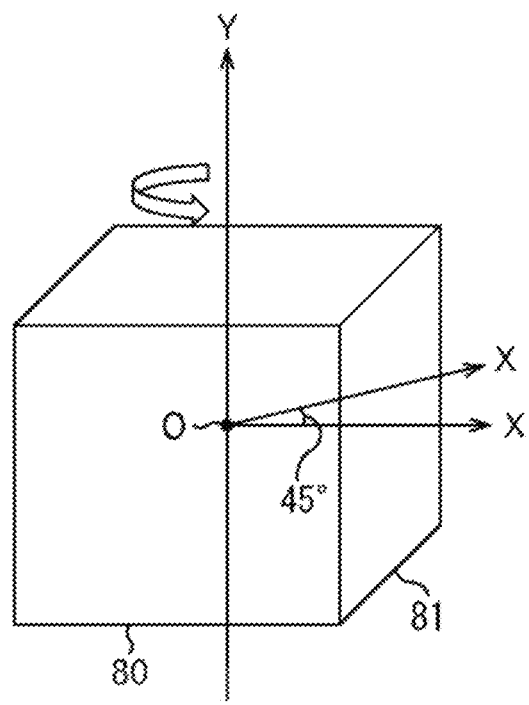
FIG. 5 is a view illustrating a change of an X axis of a 3D model coordinate system.
Figure 6:
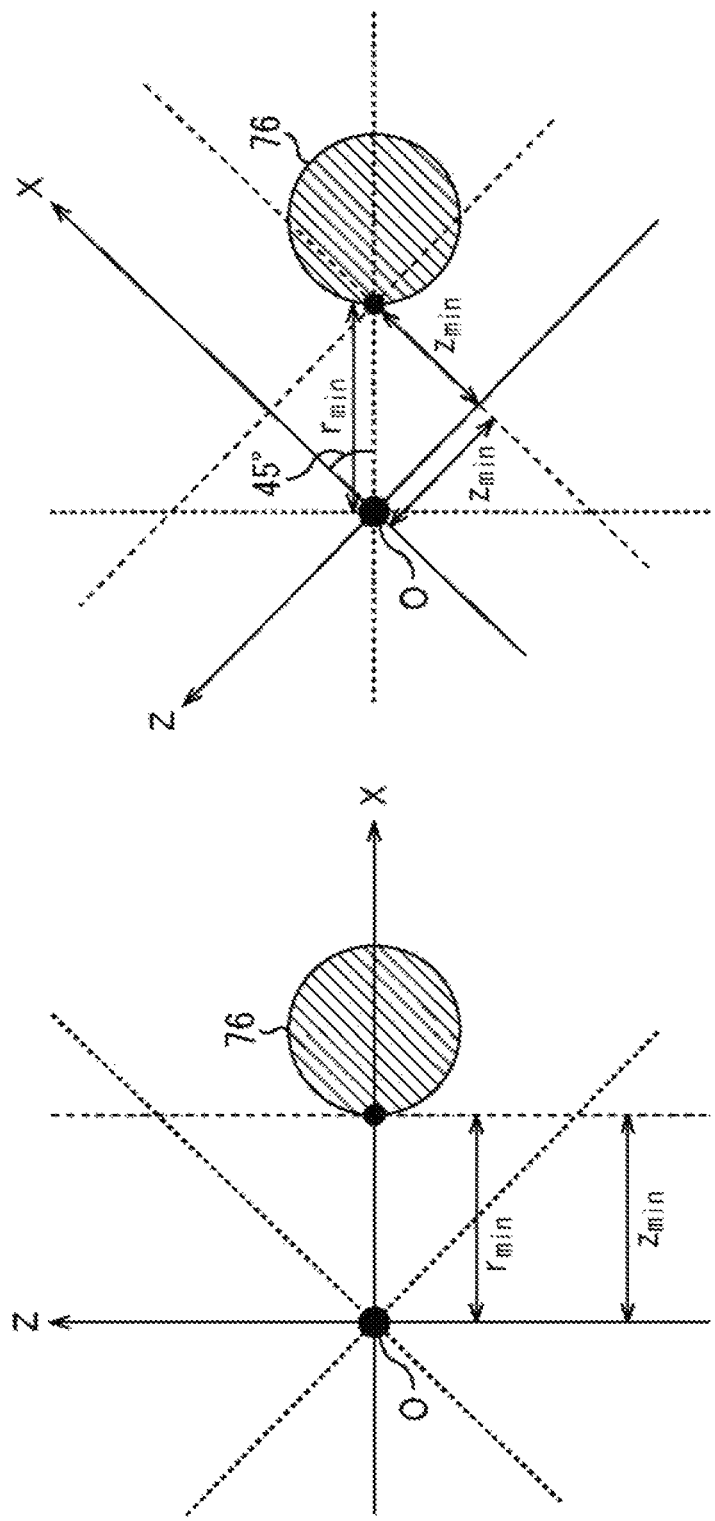
FIGS. 6A and 6B are views illustrating a change of a minimum value zmin and a minimum value rmin associated with a change of the X axis of the 3D model coordinate system.

FIG. 5 is a view depicting a change of the X axis of a 3D model coordinate system, and FIGS. 6A and 6B are views depicting a change of the minimum value zmin and the minimum value rmin associated with a change of the X axis of the 3D model coordinate system.

Note that it is assumed that, in the examples of FIGS. 5, 6A, and 6B, the angle of view of each face of the first layer is 90 degrees.

As depicted in FIG. 5, in the case where the cube 80 corresponding to the first layer is rotated by 45 degrees around the Y axis on the XZ plane to vary the positions of the faces of the first layer, the X axis is rotated by 45 degrees on the XZ plane. Consequently, the depth direction of the face 81 of the first layer whose normal vector is the positive direction of the X axis is rotated by 45 degrees on the XZ plane.

Accordingly, as depicted in FIGS. 6A and 6B, when a sphere 76 centered at a position whose X coordinate is a positive value and whose Z coordinate is 0 exists as an imaging object within the angle of view of the face 81, the minimum value zmin of the face 81 before the rotation is, as depicted in FIG. 6A, a minimum value of the distance in the positive direction of the X axis of FIG. 6A between the viewpoint O and the sphere 76. However, the minimum value zmin of the face 81 after the rotation is, as depicted in FIG. 6B, a minimum value of the distance in the positive direction of the X axis of FIG. 6B between the viewpoint O and the sphere 76 in the angle of view (upper half of the sphere 76 in FIG. 6B).

Further, in the case of the example of FIGS. 6A and 6B, since the maximum value zmax of the face 81 before rotation is infinite, also the maximum value zmax of the face 81 after rotation is infinite. However, in the case where the maximum value zmax is not infinite, the maximum value zmax of the face 81 changes before and after rotation by a reason similar to that of the minimum value zmin. Also in regard to the other faces of the first layer, the minimum value zmin and the maximum value zmax change.

Further, although description is omitted, also in the case where the angle of view or number of or the distance between the faces of the first layer is varied, the minimum value $z_{min}$ and the maximum value $z_{max}$ of all of the faces of the first layer change.

Accordingly, if the reciprocal 1/z of the distance z is used as the y value (luminance value) of each pixel of the depth images of the first layer, then, upon reconstruction by the reconstruction section 59, it is necessary to re-calculate the minimum value $z_{min}$ and the maximum value $z_{max}$ of each face and redetermine the minimum value $z_{min}$ and the maximum value $z_{max}$ of all faces. As a result, it is necessary to redo 8-bit quantization of the depth images.

In contrast, the direction of a straight line from the viewpoint O to an imaging object is same independently of the position of the face of the first layer. Accordingly, even in the case where the cube 80 is rotated by 45 degrees around the Y axis on the XZ plane as depicted in FIG. 5, the minimum value $r_{min}$ and the maximum value $r_{max}$ are same.

In particular, even if the X axis of A of FIG. 6A is rotated by 45 degrees on the XZ plane as depicted in FIG. 6B, the direction of a straight line from the viewpoint O to an imaging object is a direction extending radially from the viewpoint O similarly to that before the rotation. Accordingly, the minimum value rmax of all faces of the first layer is a minimum value of the distance of a straight line from the viewpoint O to the sphere 76 independently of rotation of the X axis. Also the maximum value rmax in regard to all faces of the first layer does not change before and after rotation by a reason similar to that in the case of the minimum value rmin.

Further, though not described, also in the case where the angle of view or the number of or the distance between the faces of the first layer is varied, since the direction of a straight light from the viewpoint O to an imaging object does not change, the minimum value $r_{min}$ and the maximum value $r_{max}$ do not change.

Accordingly, since not the reciprocal 1/z but the quantization value of the reciprocal 1/r is used as the y value of each pixel of the depth images of the first layer, upon reconstruction by the reconstruction section 59, the process for redoing 8-bit quantization of the depth images can be reduced.

It is to be noted that, although it is described in the foregoing description that the low resolution texture stream and the low resolution depth stream are not reconstructed, they may otherwise be reconstructed. Also in this case, upon reconstruction, since the y value of each pixel of the low resolution depth images is a quantization value of the reciprocal 1/r, the process for reducing 8-bit quantization of the low resolution depth image can be reduced similarly as upon reconstruction of the depth images of the first layer.

Further, the reconstruction of the low resolution texture stream and the low resolution depth stream may be performed by varying the mapping method of the low resolution texture stream and the low resolution depth stream. Also in this case, by setting the y value of each pixel of the depth images to the quantization value of the reciprocal 1/r, upon reconstruction, the process for reducing 8-bit quantization of the low resolution depth image can be reduced.

(Example of Position on Sphere of Each Pixel of Depth Image of Six Faces of First Layer)

Figure 7:
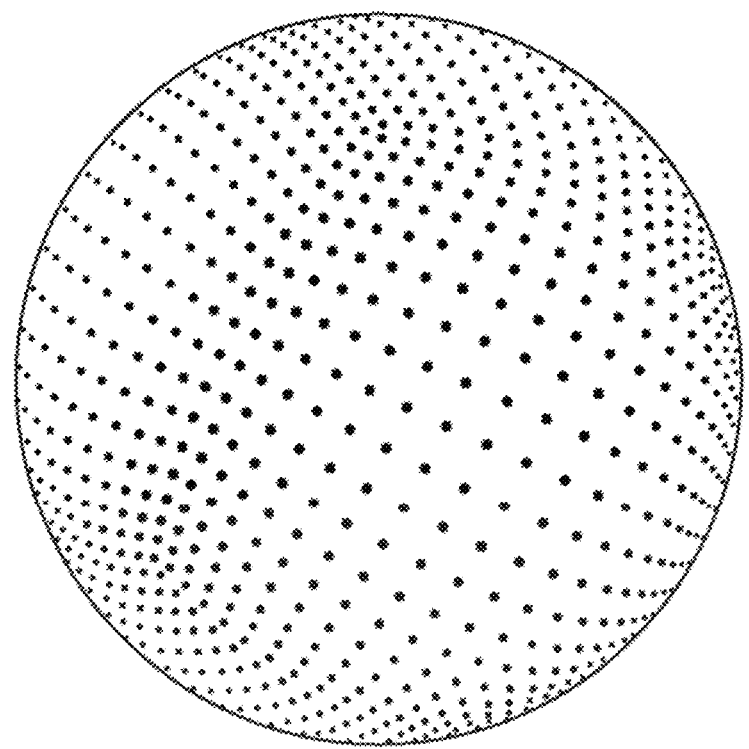
FIG. 7 is a view depicting an example of a position of each pixel on a sphere when depth images of six faces of a first layer are mapped on the sphere.

FIG. 7 is a view depicting an example of the position of each pixel on a sphere when depth images of the six faces of the first layer are mapped to the sphere.

It is to be noted that, in FIG. 7, the position of each pixel on a sphere when depth images of the six faces of the first layer are mapped to the sphere is represented by a point.

The distances between positions on the depth image of the pixels of the depth images of the faces of the first layer are equal to each other. However, as depicted in FIG. 7, the distances between the positions on the sphere of the pixels when the depth images of the six faces of the first layer are mapped to the sphere are not equal distances. In other words, the density of positions of the pixels on the sphere when the depth images of the six faces of the first layer are mapped to the sphere is not fixed.

(Example of Faces of First Layer)

Figure 8B:
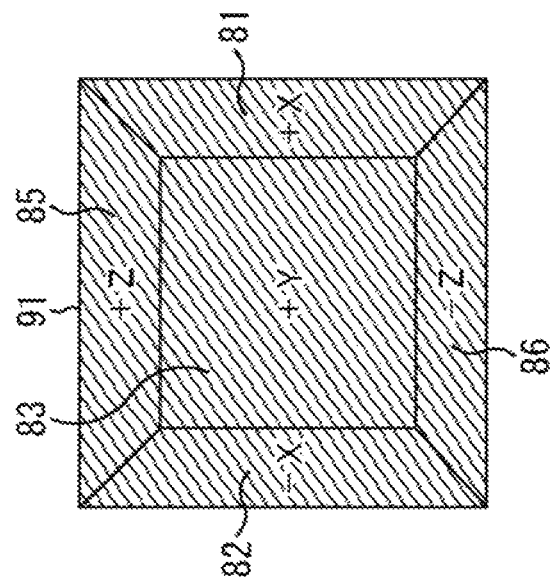
FIGS. 8A and 8B are views depicting an example of faces of the first layer.
Figure 8A:
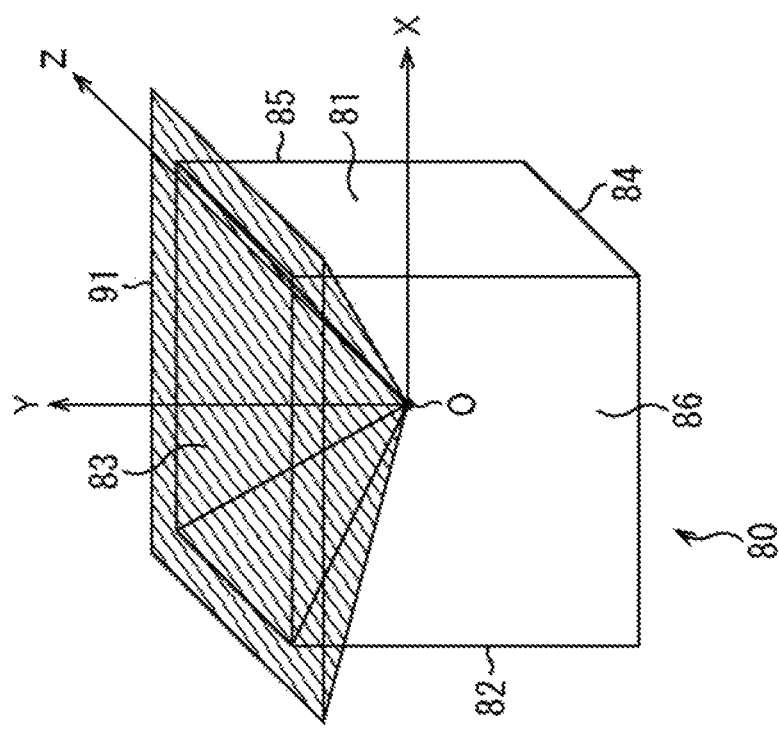

FIGS. 8A and 8B are views depicting an example of faces of the first layer.

It is to be noted that, in the following description, when the distance between the viewpoint O and each of the six faces is represented by R, the face in regard to which X=R is suitably referred to also as +X face, and the face in regard to which X=−R is suitably referred to also as −X face. Similarly, the faces in regard to which Y=R, Y=−r, Z=R and Z=−R are suitably referred to also as +Y face, −Y face, +Z face and −Z face, respectively.

Further, FIG. 8A is a perspective view of the cube 80 of the first layer, and FIG. 8B is a view when the cube 80 of the first layer is viewed in the negative direction of the Y axis.

As depicted in FIG. 8A, one face 91 of the first layer is a face including the +Y face 83 from among the six faces 81 to 86 configuring the cube 80 centered at the viewpoint O. More particularly, the face 91 is a face that is set to a position same as that of the +Y face 83 and has angles of view in the transverse direction and the vertical direction that are greater than 90 degrees that is an angle of view of the +Y face 83 but is smaller than 180 degrees.

Accordingly, as depicted in FIG. 8B, the texture image of the face 91 includes not only a texture image mapped to the +Y face 83 but also part of texture images mapped to the +X face 81, −X face 82, +Z face 85 and −Z face 86 neighboring with the +Y face 83. The description just given in regard to the texture images similarly applies also to the depth images of the face 91.

In FIGS. 8A and 8B, while only one face 91 of the first layer is depicted, also the other five faces are faces that are set to positions same as those of the +X face 81, −X face 82, −Y face 84, +Z face 85 and −Z face 86 and have angles of view in the transverse direction and the vertical direction that are greater than 90 degrees but smaller than 180 degrees similarly to the face 91.

As described above, since the six faces of the first layer are configured so as to individually include the six faces 81 to 86 configuring a cube, an omnidirectional image is mapped to one of the six faces of the first layer without fail. Accordingly, if the home server 13 uses three faces neighboring with each other from among the six faces of the first layer, then it can generate a display image in an arbitrary direction over 360 degrees around in the horizontal direction and 180 degrees around in the vertical direction with the viewpoint O set as a viewing position.

(Configuration Example of Table of Viewpoint Position Information and Face Information of First Layer)

FIG. 9 is a view depicting a configuration example of a table of viewpoint position information and face information of the first layer from among metadata generated by the metadata generation section 57 of FIG. 3.

In the example of FIG. 9, from within face information, information indicative of a three-dimensional position of a face in the 3D model coordinate system is an azimuth angle, an elevation angle, a rotation angle and a sight line vector, and information indicative of a size is a transverse angle of view and a vertical angle of view.

The azimuth angle is an angle in an XZ plane direction defined by a line interconnecting a viewpoint and the center of each face and the Z axis, and the elevation angle is an angle defined by the line interconnecting the viewpoint and the center of each face and the XZ plane. Here, in the azimuth angle, the clockwise direction is positive direction, and in the elevation angle, the counterclockwise direction is a positive direction. A line when a line extending in the Z-axis direction from the viewpoint is horizontally rotated by the azimuth angle on the XZ plane and then is rotated upwardly or downwardly by the elevation angle in the Y-axis direction is a normal that passes the center of the face.

The rotation angle is an angle in the rotation direction of each face when a line interconnecting the viewpoint and the center of the face is taken as an axis. Here, in the rotation angle, the clockwise direction is a positive direction. The sight line vector is a vector that is directed to the center of each face from a starting point given by the viewpoint and has a length of 1, namely, a normal vector that passes the center of each face. The transverse angle of view is an angle defined by two lines interconnecting two end portions in the transverse direction of each face and the viewpoint, and the vertical angle of view is an angle defined by two lines interconnecting two end portions in the vertical direction of each face and the viewpoint.

As depicted in FIG. 9, in the table of viewpoint position information and face information of the first layer, the first layer texture streams of each face and a common portion of file names of files in which the first layer depth streams are placed are registered in the storage 58 of FIG. 3.

In particular, in the example of FIG. 9, the file names of the first layer texture streams of the faces including the +Z face 85, −Z face 86, +X face 81, −X face 82, +Y face 83 and −Y face 84 are posZ_texture, negZ_texture, posX_texture, negX_texture, posY_texture and negY_texture, respectively. Further, the file names of the first layer depth streams of the faces including the +Z face 85, −Z face 86, +X face 81, −X face 82, +Y face 83 and −Y face 84 are posZ_depth, negZ_depth, posX_depth, negX_depth, posY_depth and negY_depth, respectively. Accordingly, in the table of FIG. 9, posZ, negZ, posX, negX, posY and negY are registered as the common portions of the file names of the faces of the first layer are registered.

Further, in the table of viewpoint position information and face information of the first layer, in an associated relationship with a common portion of a file name, face information, viewpoint position information, and a transverse pixel number and a vertical pixel number of a texture image and a depth image of the face corresponding to the common portion of the file name are registered.

In particular, the angles in the XZ plane direction defined by lines individually interconnecting the center of the faces of the first layer including the +Z face 85, −Z face 86, +X face 81, −X face 82, +Y face 83 and −Y face 84 and the viewpoint O and the Z axis are 0 degrees, −180 degrees, 90 degrees, −90 degrees, 0 degrees and 0 degrees, respectively, and the angles with respect to the XZ plane are 0 degrees, 0 degrees, 0 degrees, 0 degrees, 90 degrees and −90 degrees, respectively. Accordingly, the azimuth angles "0 degrees," "−180 degrees," "90 degrees," "−90 degrees," "0 degrees" and "0 degrees" are registered and the elevation angles "0 degrees," "0 degrees," "0 degrees," "0 degrees," "90 degrees" and "−90 degrees" are registered in an associated relationship with the common portions "posZ," "negZ," "posX," "negX," "posY" and "negY" of the file names, respectively.

Further, in the example of FIG. 9, the rotation angles of all faces of the first layer are 0 degrees. Accordingly, the rotation angle "0 degrees" is registered in an associated relationship with the common portions "posZ," "negZ," "posX," "negX," "posY" and "negY" of the file names. Further, the coordinates (0, 0, 0) of the origin as viewpoint position information is registered in an associated relationship with the common portions "posZ," "negZ," "posX," "negX," "posY" and "negY" of the file names.

Further, the sight line vectors of the faces of the first layer individually including the +Z face 85, −Z face 86, +X face 81, −X face 82, +Y face 83 and −Y face 84 from the viewpoint O are (0, 0, 1), (0, 0, −1), (1, 0, 0), (−1, 0, 0), (0, 1, 0) and (0, −1, 0). Accordingly, the sight line vectors (0, 0, 1), (0, 0, −1), (1, 0, 0), (−1, 0, 0), (0, 1, 0) and (0, −1, 0) are registered in an associated relationship with the common portions "posZ," "negZ," "posX," "negX," "posY" and "negY" of the file names, respectively.

Furthermore, in the example of FIG. 9, the transverse angles of view and the vertical angles of view of all faces of the first layer are 100 degrees greater than 90 degrees, and the transverse pixel number which is the number of pixels in the transverse direction and the vertical pixel number which is the number of pixels in the vertical direction of the texture images and the depth images are 1024. Accordingly, the transverse angle of view "100 degrees," vertical angle of view "100 degrees," transverse pixel number "1024" and vertical pixel number "1024" are registered in an associated relationship with the common portions "posZ," "negZ," "posX," "negX," "posY" and "negY" of the file names, respectively.

(Description of Hierarchization)

FIG. 10 is a view depicting a position in the depth direction of an imaging object corresponding to a predetermined face of the first layer, and FIG. 11 is a view depicting a configuration example of the texture images of the first layer and the second layer of the imaging object of FIG. 10 in the case where the viewpoints of the first layer and the second layer are same.

It is to be noted that FIG. 10 is a view of the viewpoint O of the first layer and an imaging object as viewed from above, and the upward and downward direction of FIG. 10 is a depth direction of a predetermined plane of the first layer including the imaging object in the angle of view. Further, in FIG. 11, the leftward and rightward direction and the upward and downward direction represent the transverse direction and the depth direction of the texture image, respectively. The upward direction in FIGS. 10 and 11 is this side, and the downward direction is the deep side.

In the example of FIGS. 10 and 11, a middle foreground 111 and a background 112 behind the foreground are imaging objects included in a predetermined angle of view of the first layer. In this case, as depicted in FIG. 11, the texture image of a predetermined face of the first layer is configured from a picked up image 121 of the foreground 111 and a picked up image 122A in a region 112A of the background 112 that is not hidden by the foreground 111.

On the other hand, the texture image of a face of the second layer corresponding to the predetermined face of the first layer includes, as a valid region, a picked up image 122C in an imaged occlusion region 112C imaged by the multi camera 11 from within an occlusion region 112B of the background 112 shielded by the foreground 111 as depicted in FIG. 11.

Although anything may be placed in a region other than the valid region from within the texture image of the face of the second layer, if a special value such as an invalid value or the like is placed, then the value of the special value varies because of compression encoding, resulting in difficulty in reproduction of the special value by decoding by the home server 13.

Accordingly, the region other than the valid region of the texture image of the face of the second layer is divided into an unnecessary region (background region) corresponding to the region 112A, and an imaginary region corresponding to a region other than the imaged occlusion region 112C from within the occlusion region 112B.

Then, in the unnecessary region corresponding to the region 112A in which an occlusion region does not exist, either a picked up image 122A is disposed similarly as in the first layer or a flat image whose edge portion is not steep is disposed. In the case where the picked up image 122A is disposed in the unnecessary region, since the texture images in the first layer and the second layer in the unnecessary region become same, in the case where the texture image of the first layer is compression encoded by an MVC method, a 3D-HEVC method or the like by referring to the texture image of the second layer, the compression ratio can be improved. Further, in the case where a flat image is displayed in the unnecessary region, the compression ratio of the second layer image can be improved in comparison with that in an alternative case in which an image having a steep edge portion is disposed. It is to be noted that the picked up image 122A may be disposed in part of the unnecessary region while a flat image is disposed in the other part.

Further, the imaginary region is a region in which, although an occlusion region exists, imaging is not performed by the multi camera 11 and that corresponds to a region other than the imaged occlusion region 112C from within the occlusion region 112B. Accordingly, in the imaginary region, an inpainted image inferred (inpainted) using the picked up image 122C of the imaged occlusion region 112C is disposed or the picked up image 121 is disposed similarly as in the first layer.

It is to be noted that, for the inpainting, an image picked up in the past may be used. Where the content server 12 performs inpainting, the home server 13 can treat the imaginary region equivalently to the valid region. Further, where the content server 12 performs inpainting before reproduction, also inpainting that is high in processing load and requires much time can be performed.

Further, in the case the picked up image 121 is disposed in the imaginary region, also when imaginary regions are scattered or inpainting is difficult, an imaginary region can be generated readily. An inpainting image may be disposed at part of an imaginary region while the picked up image 121 is disposed at the other part.

It is to be noted that, since the configuration of the depth images of the first layer and the second layer are similar to the configuration of the texture images of the first layer and the second layer except that the picked up image is replaced to the depth image, description of the same is omitted. Further, in the following, a case is described in which a picked up image or a depth image similar to that of the first layer is placed in an unnecessary region and an imaginary region of the second layer.

(Description of Viewpoints of First Layer and Second Layer)

FIGS. 12A, 12B, and 12C are views illustrating texture images of the first layer and the second layer corresponding to a predetermined face of the first layer in the case where the viewpoints of the first layer and the second layer are same. FIGS. 13A, 13B, and 13C are views illustrating texture images of the first layer and the second layer corresponding to a predetermined face of the first layer in the case where viewpoints of the first layer and the second layer are different from each other.

FIG. 12A and FIG. 13A are views of the viewpoint O of the first layer and an imaging object as viewed from above, and the upward and downward direction in FIG. 12A and FIG. 13A is the depth direction of the predetermine face of the first layer including the imaging object in the angle of view.

As depicted in FIG. 12A, in the case where the viewpoint of the second layer is the viewpoint O of the first layer, a bar-like imaging object 141 extends to the viewpoint O in the angle of view of a predetermined face 131 of the first layer forms a point in both a texture image 151 of the first layer and a texture image 152 of the second layer.

In particular, since the directions from the viewpoints O of the first layer and the second layer toward the face 131 are same, the imaging object 141 is degenerated to one point in both the texture image 151 of the first layer and the texture image 152 of the second layer. Accordingly, in the texture image 151 and the texture image 152, the length of the imaging object 141 extending in a direction toward the viewpoint O cannot be represented.

In contrast, in the case where the viewpoint of the second layer is the viewpoint O that is different from the viewpoint O of the first layer, the imaging object 141 included in the angle of view of the face 131 of the first layer and a face 161 of the second layer becomes a straight line in a texture image 172 of the second layer.

In particular, the direction from the viewpoint O of the first layer toward the face 131 and the direction from a viewpoint O' of the second layer toward the face 161 are different from each other. Accordingly, even if the imaging object 141 is degenerated to one point in the texture image 151 of the first layer, the imaging object 141 is not degenerated into one point in the texture image 172 of the second layer. Therefore, in the texture image 172, the length of the imaging object 141 extending in a direction toward the viewpoint O can be represented.

From the foregoing, in the content server 12, the viewpoints of the first layer and the second layer are set so as to be different from each other.

(First Example of Viewpoint of Second Layer)

Figure 14B:
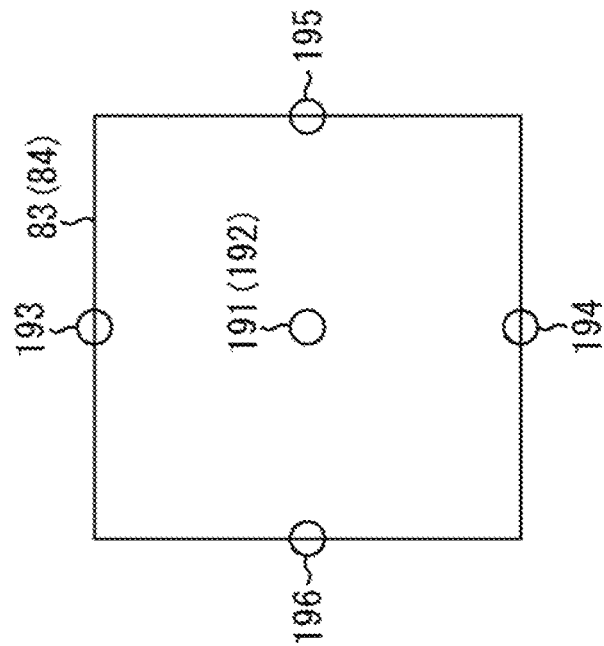
Figure 14A:
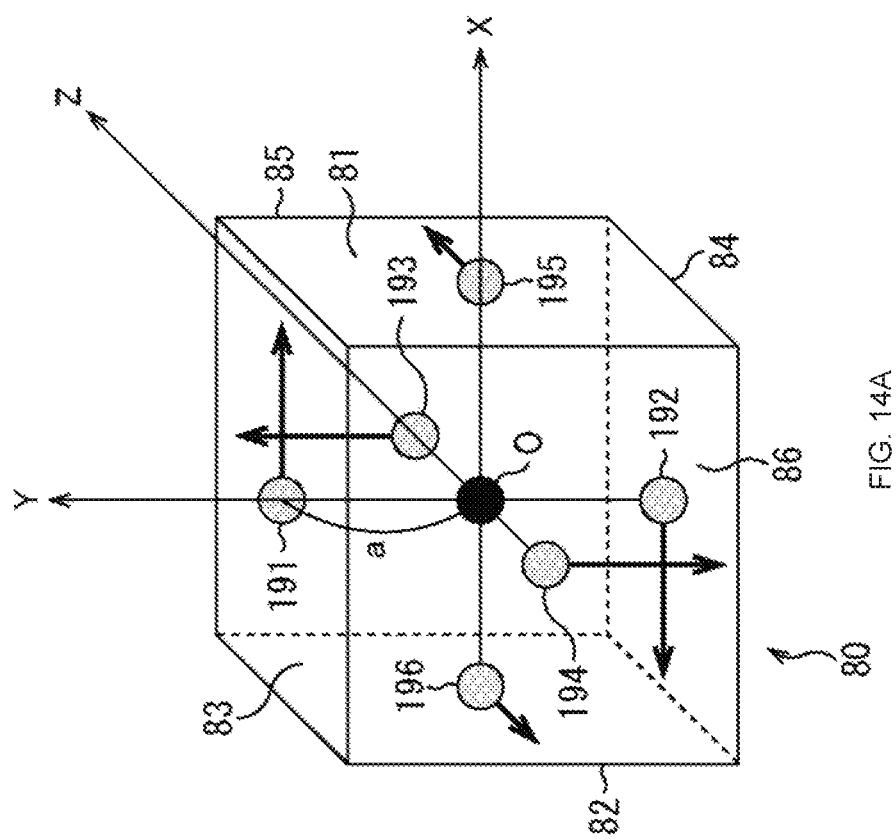

FIGS. 14A and 14B are views depicting a first example of the viewpoint of the second layer.

FIG. 14A is a perspective view of a cube 80 of the first layer, and FIG. 14B is a view of the cube 80 as viewed in the negative direction of the Y axis. This similarly applies also to FIGS. 16A and 16B.

In the example of FIGS. 14A and 14B, a viewpoint 191 of a face of the second layer corresponding to a face that includes the +X face 81 of the first layer is set to a position moved by a length a equal to one half the length of each side of the cube 80 in the positive direction of the Y axis from the viewpoint O of the first layer. As indicated by an arrow mark applied to the viewpoint 191 in FIGS. 14A and 14B, the sight line vector of the face of the second layer corresponding to the face including the +X face 81 of the first layer is (1, 0, 0) similarly as in the first layer.

A viewpoint 192 of the face of the second layer corresponding to the face including the −X face 82 of the first layer is set to a position moved by the length a in the negative direction of the Y axis from the viewpoint O. As indicated by an arrow mark applied to the viewpoint 192 in FIGS. 14A and 14B, the sight line vector of the face of the second layer corresponding to the face including the −X face 82 of the first layer is (−1, 0, 0) similarly to the first layer.

Further, a viewpoint 193 of a face of the second layer corresponding to the face 91 including the +Y face 83 of the first layer and a viewpoint 194 of a face of the second layer corresponding to a face including the −Y face 84 are set to positions moved by the length a in the positive direction and the negative direction of the Z axis from the viewpoint O, respectively. As indicated by arrow marks applied to the viewpoint 193 and the viewpoint 194 in FIGS. 14A and 14B, a sight line vector of the face of the second layer corresponding to the face 91 of the first layer and a sight line vector of the face of the second layer corresponding to the face including the −Y face 84 are (0, 1, 0) and (0, −1, 0) similarly as in the first layer, respectively.

Further, a viewpoint 195 of a face of the second layer corresponding to the face including the +Z face 85 of the first layer and a viewpoint 196 of a face of the second layer corresponding to the face including the −Z face 86 are set to positions moved by the length a in the positive direction and the negative direction of the X axis from the viewpoint O of the first layer, respectively. As indicated by arrow marks applied to the viewpoint 195 and the viewpoint 196 in FIGS. 14A and 14B, a sight line vector of the face of the second layer corresponding to the face including the +Z face 85 of the first layer and a sight line vector of the face of the second layer corresponding to the face including the −Z face 86 are (0, 0, 1) and (0, 0, −1) similarly as in the first layer, respectively.

In this manner, in the example of FIGS. 14A and 14B, the viewpoints 191 to 196 of the faces of the second layer are set to positions moved by the length a in one direction perpendicular to the sight line vectors from the viewpoints O of the first layer. Further, the sight line vectors of the faces of the second layer are same as the sight line vectors of the corresponding faces of the first layer. Furthermore, the displacement direction of the viewpoints 191 to 196 of the faces of the second layer with respect to the viewpoint O differs for each face.

It is to be noted that the distance between the viewpoints 191 to 196 of the faces of the second layer and the viewpoint O in the X-axis direction, Y-axis direction or Z-axis direction is not limited to the length a equal to one half the length of each side of the cube 80.

(First Configuration Example of Table of Viewpoint Position Information and Face Information of Second Layer)

FIG. 15 is a view depicting a configuration example of a table of viewpoint position information and face information of the second layer from within metadata generated by the metadata generation section 57 of FIG. 3 in the case where the viewpoints 191 to 196 of FIGS. 14A and 14B are set as viewpoints of the faces of the second layer.

The table of FIG. 15 is same as the table of FIG. 9 except a common portion of file names and viewpoint position information.

In particular, in the example of FIG. 15, the file names of the texture images of the faces of the second layer corresponding to the faces of the first layer including the +Z face 85, −Z face 86, +X face 81, −X face 82, +Y face 83 and −Y face 84 are posZ2_texture, negZ2_texture, posX2_texture, negX2_texture, posY2_texture and negY2_texture, respectively. Further, the file names of the depth images of the faces of the second layer corresponding to the faces of the first layer including the +Z face 85, −Z face 86, +X face 81, −X face 82, +Y face 83 and −Y face 84 are posZ2_depth, negZ2_depth, posX2_depth, negX2_depth, posY2_depth and negY2_depth, respectively. Accordingly, "posZ2," "negZ2," "posX2," "negX2," "posY2" and "negY2" are registered as the common portions of the file names of the faces of the second layer in the table of FIG. 15.

Further, coordinates (a, 0, 0), (−a, 0, 0), (0, a, 0), (0, −a, 0), (0, 0, a) and (0, 0, −a) of the viewpoints 191 to 196 when the viewpoint O is determined as the origin are registered in an associated relationship with the common portions "posZ2," "negZ2," "posX2," "negX2," "posY2" and "negY2" of the file names, respectively.

(Second Example of Viewpoint of Second Layer)

Figure 16B:
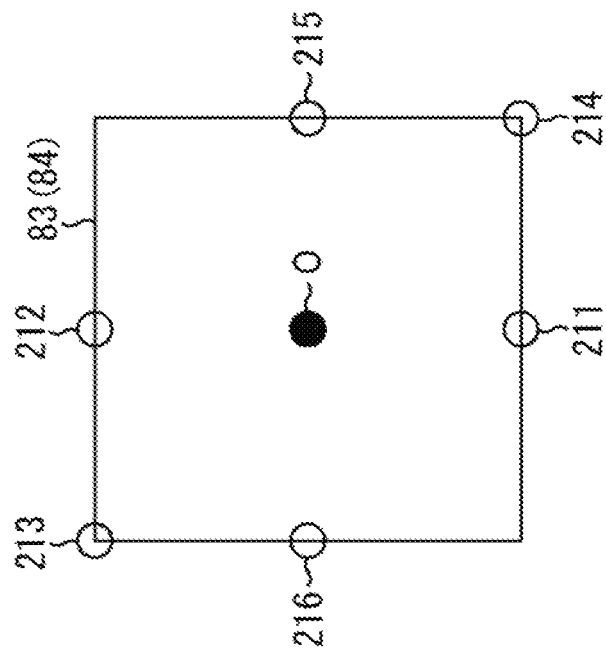
FIGS. 16A and 16b are views depicting a second example of viewpoints of the second layer.
Figure 16A:
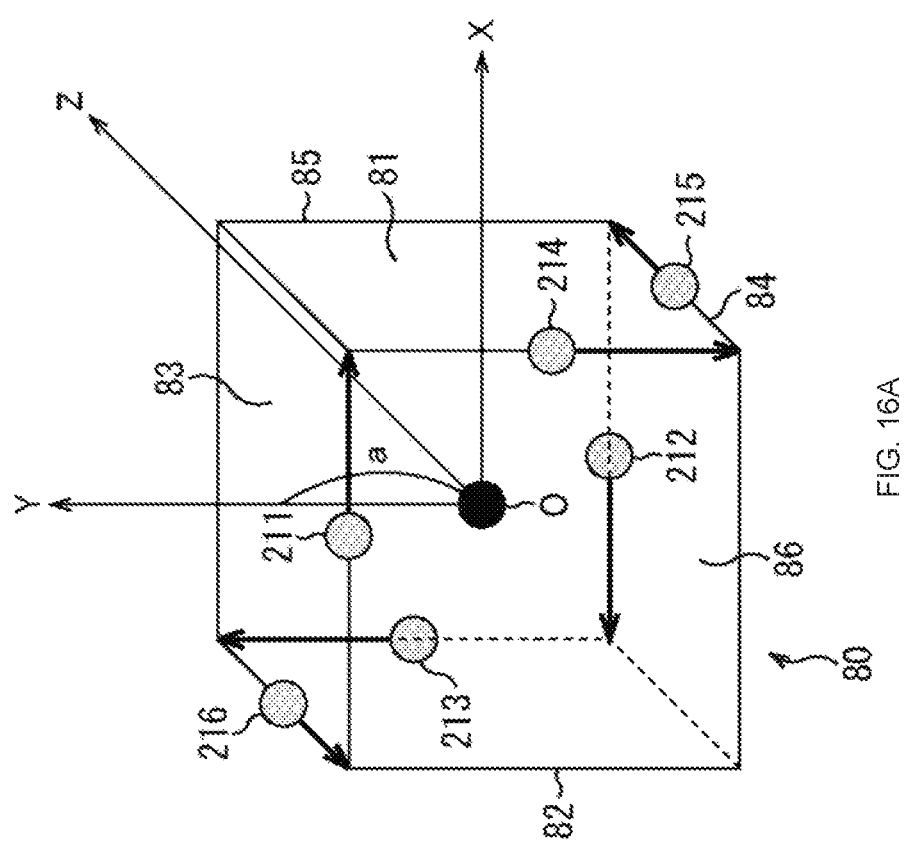

FIGS. 16A and 16B are views depicting a second example of viewpoints of the second layer.

In the example of FIGS. 16A and 16B, a viewpoint 211 of a face of the second layer corresponding to a face that includes the +X face 81 of the first layer and a viewpoint 212 of a face of the second layer corresponding to a face that includes the −X face 82 of the first layer are set to a position moved by the length a in the positive direction of the Y axis and the negative direction of the Z axis from the viewpoint O of the first layer and a position moved by the length a in the negative direction of the Y axis and the positive direction of the Z axis from the viewpoint O of the first layer, respectively. As indicated by an arrow mark applied to the viewpoint 211 and the viewpoint 212 in FIGS. 16A and 16B, the sight line vector of the face of the second layer corresponding to the face including the +X face 81 of the first layer and the sight line vector of a face of the second layer corresponding to the face including the −X face 82 of the first layer are (1, 0, 0) and (−1, 0, 0) similarly as in the first layer.

A viewpoint 213 of a face of the second layer corresponding to the face 91 including the +Y face 83 of the first layer and a viewpoint 214 of the face of the second layer corresponding to the face including the −Y face 84 are set to a position moved by the length a in the negative direction of the X axis and the positive direction of the Z axis from the viewpoint O and a position moved by the length a in the positive direction of the X axis and the negative direction of the Z axis from the viewpoint O, respectively. As indicated by arrow marks applied to the viewpoint 213 and the viewpoint 214 in FIGS. 16A and 16B, the sight line vector of the face of the second layer corresponding to the face 91 of the first layer and the sight line vector of the face of the second layer corresponding to the face including the −Y face 84 are (0, 1, 0) and (0, −1, 0) similarly to the first layer, similarly.

Further, a viewpoint 215 of a face of the second layer corresponding to a face including the +Z face 85 of the first layer and a viewpoint 216 of a face of the second layer corresponding to a face including the −Z face 86 of the first layer are set to a position moved by the length a in the positive direction of the X axis and the negative direction of the Y axis from the viewpoint O and a position moved by the length a in the negative direction of the X axis and the positive direction of the Y axis from the viewpoint O, respectively. As indicated by arrow marks applied to the viewpoint 215 and the viewpoint 216 in FIGS. 16A and 16B, a sight line vector of the face of the second layer corresponding to a face including the +Z face 85 of the first layer and a sight line vector of the face of the second layer corresponding to the face including the −Z face 86 are (0, 0, 1) and (0, 0, −1) similarly as in the first layer, respectively.

In this manner, in the example of FIGS. 16A and 16B, the viewpoints 211 to 216 of the faces of the second layer are set to positions moved by the length a in two directions perpendicular to the sight line vectors from the viewpoints O of the first layer. Further, the sight line vectors of the faces of the second layer are the same as the sight line vectors of the corresponding faces of the first layer. Furthermore, the displacement directions of the viewpoints 211 to 216 of the faces of the second layer with respect to the viewpoint O differ among different faces. Further, the viewpoints 211 to 216 are symmetry with respect to the viewpoint O.

It is to be noted that the distances between the viewpoints 191 to 196 of the faces of the second layer and the viewpoint O in the X-axis direction, Y-axis direction and Z-axis direction are not limited to the length a that is equal to one half the length of each side of the cube 80.

(Second Configuration Example of Table of Viewpoint Position Information and Face Information of Second Layer)

FIG. 17 is a view depicting a configuration example of a table of viewpoint position information and face information of the second layer from within metadata generated by the metadata generation section 57 of FIG. 3 in the case where the viewpoints 211 to 216 of FIGS. 16A and 16B are set as viewpoints of the faces of the second layer.

The table of FIG. 17 is same as the table of FIG. 15 except viewpoint position information.

In particular, in the table of FIG. 17, coordinates (a, −a, 0), (−a, a, 0), (0, a, −a), (0, −a, a), (−a, 0, a) and (a, 0, −a) of the viewpoints 211 to 216 when the viewpoint O is determined as the origin are registered in an associated relationship with the common portions "posZ2," "negZ2," "posX2," "negX2," "posY2" and "negY2" of the file names, respectively.

(Description of Processing of Content Server)

Figure 18:
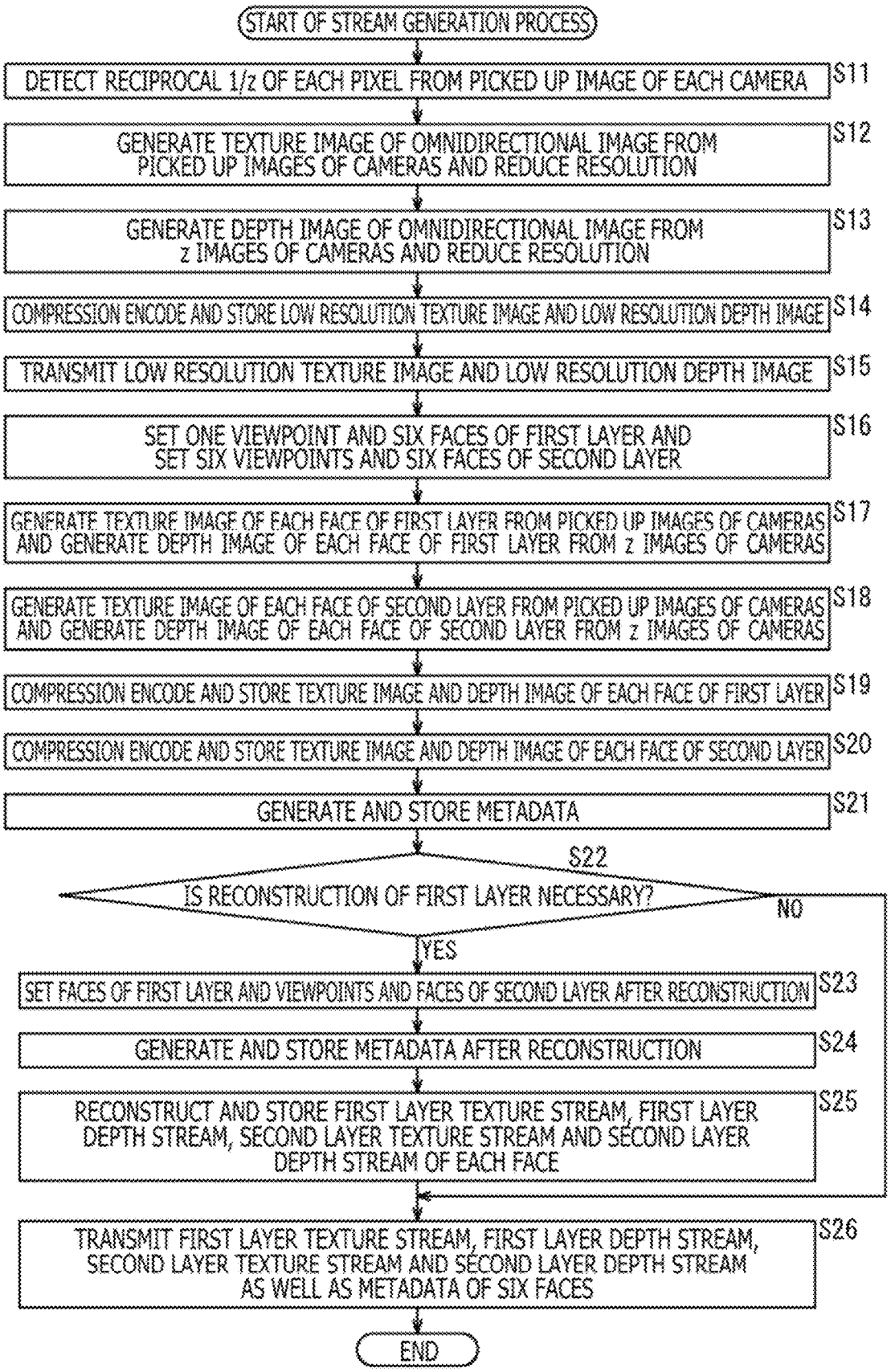
FIG. 18 is a flow chart illustrating a stream generation process.

FIG. 18 is a flow chart illustrating a stream generation process of the content server 12 of FIG. 2. This stream generation process is started when picked up images of the cameras are supplied from the multi camera 11 of FIG. 1.

At step S11 of FIG. 18, the depth detection section 31 of the content server 12 detects a reciprocal 1/z of each pixel of a picked up image of each camera from a picked up image of each camera supplied from the multi camera 11 and supplies such reciprocals 1/z to the low resolution image processing section 33 and the high resolution image processing section 34.

At step S12, the low resolution image processing section 33 uses a predetermined three-dimensional position in the camera coordinate system as a viewpoint to generate a texture image of an omnidirectional image from the picked up images of the cameras supplied from the multi camera 11 to reduce the resolution.

At step S13, the low resolution image processing section 33 generates a depth image of an omnidirectional image from the z images of the cameras supplied from the depth detection section 31 to reduce the resolution.

At step S14, the low resolution image processing section 33 compression encodes and stores the low resolution texture image generated by the process at step S12 and the low resolution depth image generated by the process at step S13.

At step S15, the low resolution image processing section 33 transmits the low resolution texture stream and the low resolution depth stream stored therein to the home server 13 of FIG. 1.

At step S16, the setting section 56 (FIG. 3) of the high resolution image processing section 34 sets the origin of the 3D model coordinate system as one viewpoint common in the first layer and sets six faces including the six faces configuring a cube centered at the viewpoint of the first layer as faces of the first layer. Further, the setting section 56 sets six viewpoints and six faces of the second layer corresponding to the faces of the first layer. The setting section 56 supplies the viewpoint position information of the one viewpoint of the first layer and the face information of the six faces to the first layer generation section 50 and the metadata generation section 57. Further, the setting section 56 supplies the viewpoint position information of the six viewpoints and the face information of the six faces of the second layer to the second layer generation section 53 and the metadata generation section 57.

At step S17, the first layer generation section 50 generates, setting the viewpoint of the omnidirectional image in the camera coordinate system to the origin and setting the origin indicated by the viewpoint position information of the first layer as a viewpoint, texture images of the faces corresponding to the face information of the first layer from the picked up images of the cameras. Further, the first layer generation section 50 generates z images of the faces corresponding to the face information of the first layer from the z images of the cameras and supplies the z images to the quantization section 51, and the quantization section 51 generates depth images of the faces from the z images of the faces.

At step S18, the second layer generation section 53 generates, for each of the faces corresponding to the face information of the second layer, texture images from the picked up images of the cameras setting the viewpoint of the omnidirectional image in the camera coordinate system as the origin and setting a three-dimensional position indicated by the viewpoint position information of the second layer as a viewpoint. Further, the second layer generation section 53 generates, for each of the faces corresponding to the face information of the second layer, z images of the second layer from the z images of the cameras and supplies the z images to the quantization section 54, and the quantization section 54 generates depth images of the faces from the z images of the faces.

At step S19, the encoder 52 compression encodes the texture images and the depth images of the faces of the first layer for each face and for each kind of image and supplies resulting images to the storage 58 so as to be stored.

At step S20, the encoder 55 compression encodes the texture images and the depth images of the faces of the second layer for each face and for each kind of image and supplies resulting images to the storage 58 so as to be stored.

At step S21, the metadata generation section 57 generates face metadata on the basis of the face detection information supplied from the first layer generation section 50 and the second layer generation section 53. The metadata generation section 57 generates metadata including a table that is supplied from the setting section 56 and includes the viewpoint position information and the face information of the first layer and the viewpoint position information and the face information of the second layer, recommended viewing direction information supplied from the setting section 56 and the face metadata and supplies the metadata to the storage 58 so as to be stored.

At step S22, the reconstruction section 59 decides whether or not it is necessary to reconstruct texture images and depth images of the first layer. For example, in the case where an instruction to change the number of, angle of view, distance between, position of or inclination of the faces of the first layer is issued from the user, the reconstruction section 59 decides that it is necessary to reconstruct the texture images and the depth images of the first layer.

In the case where it is decided at step S22 that it is necessary to reconstruct texture images and depth images of the first layer, the processing advances to step S23. At step S23, the reconstruction section 59 sets faces of the first layer after reconstruction and viewpoints and faces of the second layer corresponding to the faces of the first layer after reconstruction.

At step S24, the reconstruction section 59 generates metadata including a table that includes the viewpoint position information and the face information of the first layer and the viewpoint position information and the face information of the second layer after the reconstruction, recommended viewing direction information and face metadata and supplies the metadata to the storage 58.

At step S25, the reconstruction section 59 reconstructs the first layer texture streams of the faces stored in the storage 58 into texture streams of the faces of the first layer after reconstruction set at step S23 and supplies the resulting texture streams to the storage 58 so as to be stored. Further, the reconstruction section 59 reconstructs the first layer depth streams stored in the storage 58 into first layer depth streams of the faces of the first layer after reconstruction set at step S23 and supplies the resulting depth streams to the storage 58 so as to be stored.

Further, the reconstruction section 59 reconstructs the second layer texture streams of the faces stored in the storage 58 into second layer texture streams of the viewpoints and the faces of the second layer after reconstruction set at step S23 and supplies the resulting texture streams to the storage 58 so as to be stored. The reconstruction section 59 reconstructs the second layer depth streams stored in the storage 58 into second layer depth streams of the viewpoints and the faces of the second layer after reconstruction set at step S23 and supplies the resulting depth streams to the storage 58 so as to be stored. Then, the processing advances to step S26.

On the other hand, in the case where it is decided at step S22 that it is not necessary to reconstruct the texture images and the depth images of the first layer, the processing advances to step S26.

At step S26, the transmission section 60 reads out the first layer texture streams, first layer depth streams, second layer texture streams and second layer depth streams of the six faces before reconstruction and the metadata from the storage 58 and transmits the read out streams and metadata to the home server 13.

The content server 12 generates texture images and depth images in an occlusion region at the viewpoint of the first layer as texture images and depth images of the second layer, respectively, in such a manner as described above. Accordingly, in the case where the viewing position is different from the viewpoint O, the home server 13 can generate an occlusion region of the viewpoint O included in the display image by using the texture images and the depth images of the second layer. Therefore, the home server 13 can generate a display image of high picture quality.

Further, the content server 12 sets the viewpoint of the second layer to a three-dimensional position different from the viewpoint O of the first layer. Accordingly, in the second layer, it is possible to represent the length of an imaging object, which extends to the viewpoint O, in the direction in which it extends to the viewpoint O.

Furthermore, the content server 12 sets the y value of each pixel of the depth images as a value obtained by 8-bit quantization of the reciprocal $1/r$. Accordingly, it is not necessary for the content server 12 to redo 8-bit quantization of a depth image upon reconstruction.

(Configuration Example of First Embodiment of Home Server)

Figure 19:
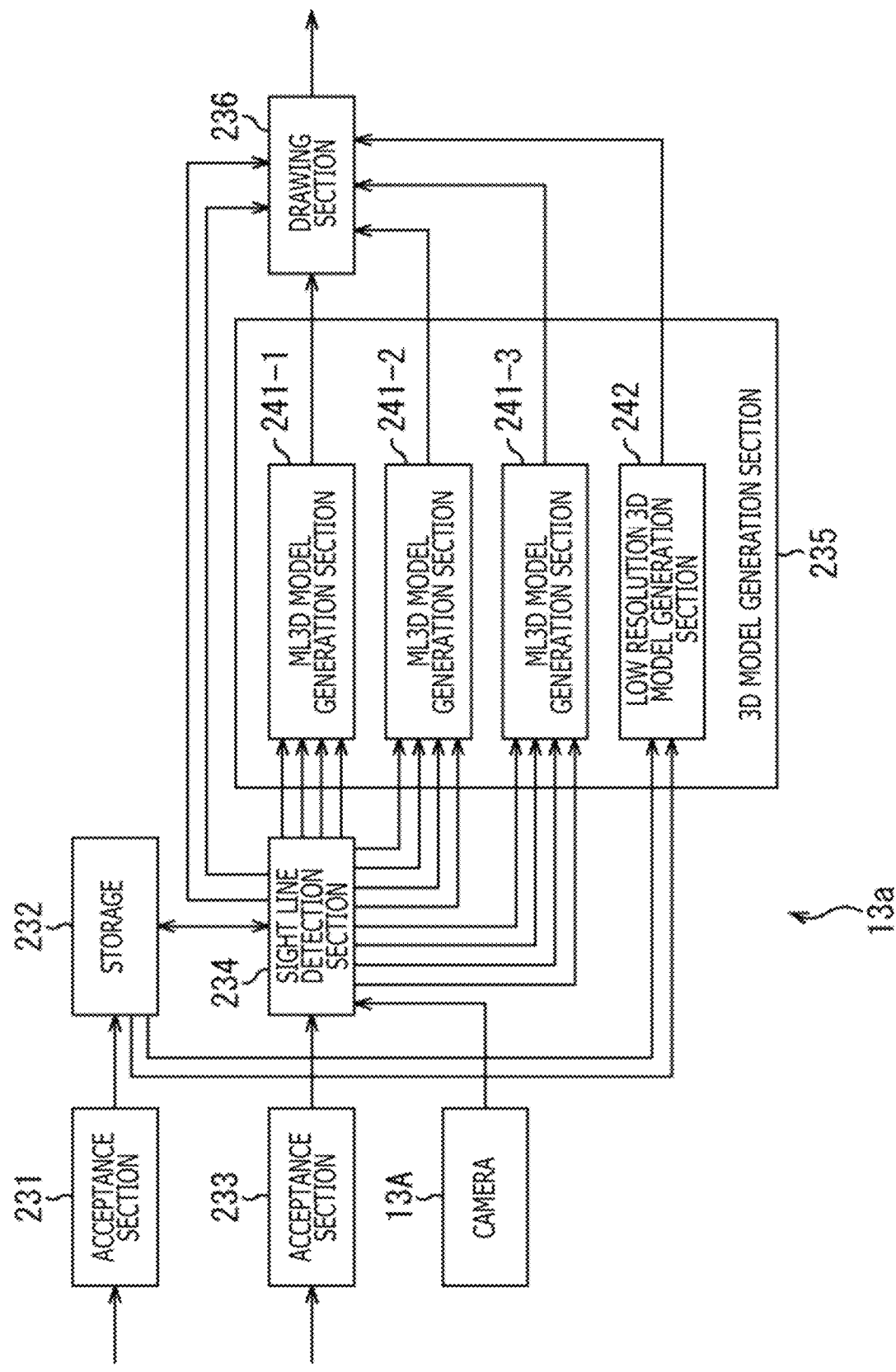
FIG. 19 is a block diagram depicting a configuration example of a first embodiment of a home server.

FIG. 19 is a block diagram depicting a configuration example of a home server 13a that is a first embodiment of the home server 13 of FIG. 1.

The home server 13 of FIG. 19 includes a camera 13A, an acceptance section 231, a storage 232, another acceptance section 233, a sight line detection section 234, a 3D model generation section 235, and a drawing section 236. The 3D model generation section 235 includes ML3D model generation sections 241-1 to 241-3, and a low resolution 3D model generation section 242.

The acceptance section 231 of the home server 13a accepts low resolution texture stream and low resolution depth stream, first layer texture streams, first layer depth streams, second layer texture streams and second layer depth streams of the six faces and metadata transmitted thereto from the content server 12 and supplies them to the storage 232.

The storage 232 stores the low resolution texture stream and low resolution depth stream, the first layer texture streams, first layer depth streams, second layer texture streams and second layer depth streams of the six faces and the metadata supplied from the acceptance section 231.

The acceptance section 233 accepts a detection result of the gyro sensor 15B of FIG. 1 from the head mounted display 15 and supplies the detection result to the sight line detection section 234.

The sight line detection section 234 determines a sight line direction of the viewer in the 3D model coordinate system on the basis of a detection result of the gyro sensor 15B supplied from the acceptance section 233. Further, the sight line detection section 234 acquires a picked up image of the marker 15A from the camera 13A and detects a viewing position in the 3D model coordinate system on the basis of the picked up image.

The sight line detection section 234 reads out the table of the first layer from within the metadata from the storage 232. The sight line detection section 234 determines, on the basis of the viewing position and the sight line direction in the 3D model coordinate system and the table of the first layer, three faces corresponding to the sight line vector closest to the sight line extending in the sight line direction from the viewing position from among the six faces as selection faces. In particular, the sight line detection section 234 selects a face including one of the +X face 81 and the −X face 82, a face including one of the +Y face 83 and the −Y face 84 and a face including one of the +Z face 85 and the −Z face 86 as the selection faces.

Since the selection faces are determined in such a manner as described above, the ratio of the high resolution region in the display image generated using the texture images and the depth images of the first layer and the second layer corresponding to the selection faces by the drawing section 236 hereinafter described is highest. Further, since the three selection faces are determined, the ratio of the high resolution region in the display image in the case where the sight line is directed to the proximity of a vertex of the cube 80 can be increased in comparison with that in an alternative case in which one selection face is selected.

The sight line detection section 234 reads out the first layer texture streams, first layer depth streams, second layer texture streams and second layer depth streams corresponding to the three selection faces from the storage 232. The sight line detection section 234 supplies the read out first layer texture streams, first layer depth streams, second layer texture streams and second layer depth streams for each face to the ML3D model generation sections 241-1 to 241-3. Further, the sight line detection section 234 reads out the low resolution texture stream and the low resolution depth stream from the storage 232 and supplies them to the low resolution 3D model generation section 242.

Further, the sight line detection section 234 determines the viewing range of the viewer in the 3D model coordinate system on the basis of the viewing position and the sight line direction in the 3D model coordinate system. The sight line detection section 234 supplies the viewing range and the viewing position of the viewer to the drawing section 236. The sight line detection section 234 supplies the three selection faces and the viewpoint position information and the face information of the three faces of the second layer corresponding to the three selection faces to the drawing section 236.

The ML3D model generation sections 241-1 to 241-3 individually use the first layer texture streams and the first layer depth streams to generate three-dimensional data including three-dimensional positions (u, v, z) and connection information in the texture image coordinate system of sampling points corresponding to the pixels of the texture image of the first layer and RGB values as color information. It is to be noted that the connection information of each sampling point is information representative of connection between the sampling point (vertex) and a different sampling point. The texture image coordinate system is a coordinate system having a u axis given by the transverse direction, a v axis given by the vertical direction and a z axis in the depth direction of the texture image.

Further, the ML3D model generation sections 241-1 to 241-3 use the second layer texture streams and the second layer depth streams supplied from the sight line detection section 234 to generate three-dimensional data of a sampling point corresponding to each pixel of the texture image of the second layer. The ML3D model generation sections 241-1 to 241-3 supply the three-dimensional data of the first layer and the second layer to the drawing section 236.

The low resolution 3D model generation section 242 decodes the low resolution texture stream and the low resolution depth stream supplied from the sight line detection section 234 to generate a low resolution texture image and a low resolution depth image. The low resolution 3D model generation section 242 converts YCbCr values as a pixel value of each pixel of the low resolution texture image into RGB values to make RGB values of the sampling point corresponding to each pixel. Further, the low resolution 3D model generation section 242 performs 8-bit dequantization for the pixel value of each pixel of the low resolution depth image and obtains a reciprocal 1/r. Then, the low resolution 3D model generation section 242 calculates, on the basis of such reciprocals 1/r of the pixels of the low resolution depth image, a three-dimensional position (u, v, z) of each pixel as a three-dimensional position (u, v, z) of a sampling point corresponding to the pixel.

Further, the low resolution 3D model generation section 242 generates, on the basis of the three-dimensional positions (u, v, z) of the sampling points, connection information of the sampling points such that every three neighboring sampling points are connected to each other. The low resolution 3D model generation section 242 supplies the three-dimensional positions (u, v, z), connection information and RGB values of the sampling points as three-dimensional data of the low resolution texture images to the drawing section 236.

The drawing section 236 performs triangle patch drawing (point cloud drawing) of the low resolution texture image in the 3D model coordinate system on the basis of the three-dimensional data of the low resolution texture image supplied from the low resolution 3D model generation section 242. Thereafter, the drawing section 236 performs, on the basis of the three-dimensional data of the first layer and the second layer supplied from the ML3D model generation sections 241-1 to 241-3 and the viewpoint position information and the face information supplied from the sight line detection section 234, triangle patch drawing of the texture images of the first layer and the second layer in the 3D model coordinate system.

In particular, the viewpoint of the low resolution texture image is the origin of the 3D model coordinate system, and the position and the size of each of the faces of a regular octahedron as a 3D model are determined in advance. Accordingly, the drawing section 236 can calculate internal parameters and external parameters of the cameras corresponding to the faces of the regular octahedron. Therefore, the drawing section 236 can use the internal parameters and the external parameters to recognize the position (u, v) on the screen image and the three-dimensional position (X, Y, Z) in the 3D model coordinate system of each sampling point from the three-dimensional positions (u, v, z) of the sampling points of the low resolution texture image. As a result, the positions (u, v) on the screen image and three-dimensional positions (X, Y, Z), connection information and RGB values of the sampling points of the low resolution texture image can be used to perform triangle patch drawing.

Further, the drawing section 236 can calculate internal parameters and external parameters of the cameras corresponding to the faces of the first layer and the second layer on the basis of the viewpoint position information and the face information of the first layer and the second layer. Accordingly, the drawing section 236 can use the internal parameters and the external parameters to recognize the position (u, v) on the screen image and the three-dimensional position (X, Y, Z) of each sampling point from the three-dimensional positions (u, v, z) of the sampling points of the first layer and the second layer. As a result, the drawing section 236 can use the positions (u, v) on the screen image and three-dimensional positions (X, Y, Z), connection information and RGB values of the sampling points of the first layer and the second layer to perform triangle patch drawing.

The drawing section 236 generates a display image by perspectively projecting (mapping) triangle patches drawn in the 3D model coordinate system within the viewing range from the viewpoint given as the viewing position supplied from the sight line detection section 234. The drawing section 236 transmits the display image to the conversion apparatus 14 of FIG. 1.

It is to be noted that, in the case where there is no necessity to distinguish the ML3D model generation sections 241-1 to 241-3 individually from each other, each of them is hereinafter referred to simply as ML3D model generation section 241.

(Configuration Example of ML3D Model Generation Section)

Figure 20:
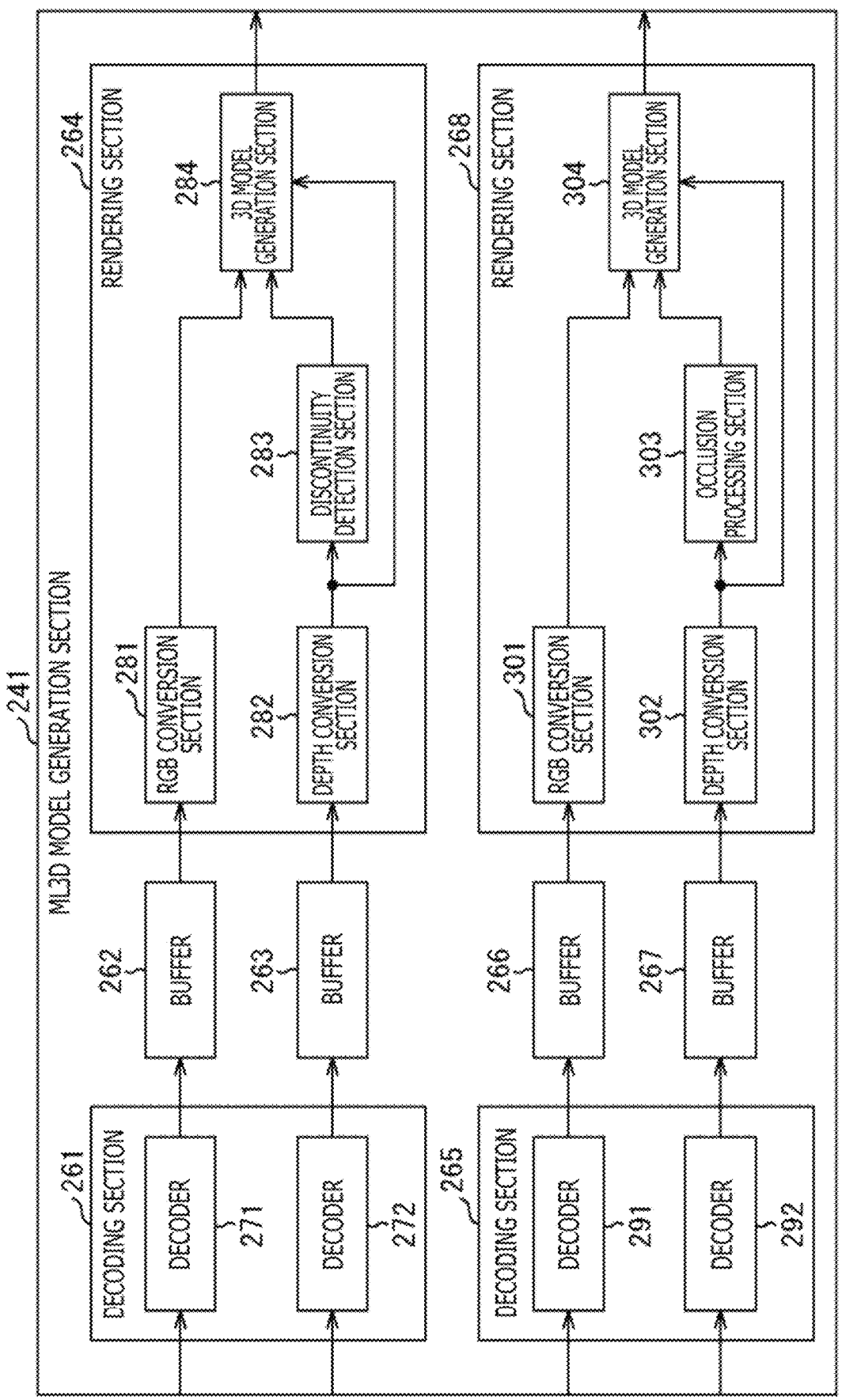
FIG. 20 is a block diagram depicting a configuration example of a first embodiment an ML3D model generation section.

FIG. 20 is a block diagram depicting a configuration example of the ML3D model generation section 241 of FIG. 19.

The ML3D model generation section 241 of FIG. 20 is configured from a decoding section 261, a buffer 262, another buffer 263, a rendering section 264, a decoding section 265, a further buffer 266, a still further buffer 267 and another rendering section 268. The decoding section 261 is configured from a decoder 271 and another decoder 272.

The rendering section 264 is configured from an RGB conversion section 281, a depth conversion section 282, a discontinuity detection section 283, and a 3D model generation section 284. The decoding section 265 is configured from a decoder 291, and another decoder 292. The rendering section 268 is configured from an RGB conversion section 301, a depth conversion section 302, an occlusion processing section 303 and a 3D model generation section 304.

The decoding section 261 of the ML3D model generation section 241 decodes first layer texture streams and first layer depth streams.

In particular, the decoder 271 of the decoding section 261 decodes the first layer texture streams supplied from the sight line detection section 234 of FIG. 19 to generate a texture image of the first layer. The decoder 271 accumulates the texture image of the first layer into the buffer 262.

The decoder 272 decodes the first layer depth streams supplied from the sight line detection section 234 to generate a depth image of the first layer. The decoder 272 accumulates the depth image of the first layer into the buffer 263.

The rendering section 264 performs rendering of the first layer texture streams (texture image of the first layer) and the first layer depth streams (depth image of the first layer) after the decoding to generate three-dimensional data of a texture image for drawing of the first layer.

In particular, the RGB conversion section 281 of the rendering section 264 converts YCbCr values as a pixel value of each of the pixels of the texture image of the first layer accumulated in the buffer 262 into RGB values and determines the RGB values as RGB values of a sampling point corresponding to each pixel. Then, the RGB conversion section 281 supplies the RGB values of the sampling points to the 3D model generation section 284.

The depth conversion section 282 performs 8-bit dequantization for pixel values of the pixels of the depth images of the first layer accumulated in the buffer 263 to obtain reciprocals 1/r. Then, the depth conversion section 282 calculates, on the basis of the reciprocals 1/r of the pixels of the depth images of the first layer, three-dimensional positions (u, v, z) of the pixels as three-dimensional positions (u, v, z) of sampling points corresponding to the pixels. The depth conversion section 282 supplies the three-dimensional positions (u, v, z) of the sampling points to the discontinuity detection section 283 and the 3D model generation section 284.

The discontinuity detection section 283 detects, on the basis of the three-dimensional positions (u, v, z) of the sampling points supplied from the depth conversion section 282, discontinuity pixels that are pixels corresponding to sampling points at each of which the difference of the z coordinate from a neighboring sampling point from among the pixels of the depth images of the first layer is equal to or greater than a threshold value. The discontinuity detection section 283 supplies the three-dimensional positions (u, v, z) of the sampling points corresponding to the discontinuity pixels to the 3D model generation section 284.

The 3D model generation section 284 generates connection information of the sampling points on the basis of the three-dimensional positions (u, v, z) of the sampling points supplied from the depth conversion section 282 such that three neighboring sampling points from among the sampling points are connected to each other. In particular, the 3D model generation section 284 generates, for each sampling point, connection information representative of connection between three vertices of a triangle patch that includes the sampling point as a vertex. Then, the 3D model generation section 284 deletes, on the basis of the three-dimensional positions (u, v, z) of the sampling points corresponding to the discontinuity pixels supplied from the discontinuity detection section 283, the connection information representative of connection of the sampling points corresponding to the discontinuity pixels from within the generated connection information of the sampling points.

The 3D model generation section 284 generates three-dimensional positions (u, v, z), RGB values and connection information after the deletion of the sampling points of the first layer as three-dimensional data of the first layer and supplies the three-dimensional data to the drawing section 236 of FIG. 19.

The decoder 291 of the decoding section 265 decodes the second layer texture streams supplied from the sight line detection section 234 of FIG. 19 to generate a texture image of the second layer. The decoder 291 accumulates the texture image of the second layer into the buffer 266.

The decoder 292 decodes the second layer depth streams supplied from the sight line detection section 234 to generate a depth image of the second layer. The decoder 292 accumulates the depth image of the second layer into the buffer 267.

The rendering section 268 performs rendering of the second layer texture streams (texture image of the second layer) and the second layer depth streams (depth image of the second layer) after the decoding to generate three-dimensional data of a texture image for drawing of the second layer.

The RGB conversion section 301 of the rendering section 268 converts YCbCr values as a pixel value of each of the pixels of the texture image of the second layer accumulated in the buffer 266 into RGB values and determines the RGB values as RGB values of a sampling point corresponding to each pixel. Then, the RGB conversion section 301 supplies the RGB values of the sampling points to the 3D model generation section 304.

The depth conversion section 302 performs 8-bit dequantization for pixel values of the pixels of the depth images of the second layer accumulated in the buffer 267 to obtain reciprocals 1/r. Then, the depth conversion section 302 calculates, on the basis of the reciprocals 1/r of the pixels of the depth images of the second layer, three-dimensional positions (u, v, z) of the pixels as three-dimensional positions (u, v, z) of sampling points corresponding to the pixels. The depth conversion section 302 supplies the three-dimensional positions (u, v, z) of the sampling points to the occlusion processing section 303 and the 3D model generation section 304.

The occlusion processing section 303 detects discontinuity pixels from among pixels of the depth image of the second layer on the basis of the three-dimensional positions (u, v, z) of the sampling points supplied from the depth conversion section 302. The occlusion processing section 303 performs an occlusion process for correcting the three-dimensional positions (u, v, z) of the sampling points corresponding to the discontinuity pixels on the basis of the three-dimensional positions (u, v, z) of the sampling points of the second layer.

In particular, the occlusion processing section 303 corrects, for example, the two-dimensional position (u, v) of each sampling point corresponding to a discontinuity pixel to a two-dimensional position (u, v) of a sampling point neighboring on the near side with the sampling point. The occlusion processing section 303 supplies the three-dimensional positions (u, v, z) after the occlusion process of the sampling points of the second layer to the 3D model generation section 304.

The 3D model generation section 304 generates, for each sampling point, connection information representative of connection to two sampling points neighboring with the sampling point on the basis of the three-dimensional positions (u, v, z) of the sampling points supplied from the occlusion processing section 303. The 3D model generation section 304 generates three-dimensional positions (u, v, z) and connection information of the sampling points and RGB values supplied from the RGB conversion section 301 as three-dimensional data of the second layer. The 3D model generation section 304 supplies the three-dimensional data of the second layer to the drawing section 236 of FIG. 19.

(Configuration Example of Low Resolution 3D Model Generation Section)

Figure 21:
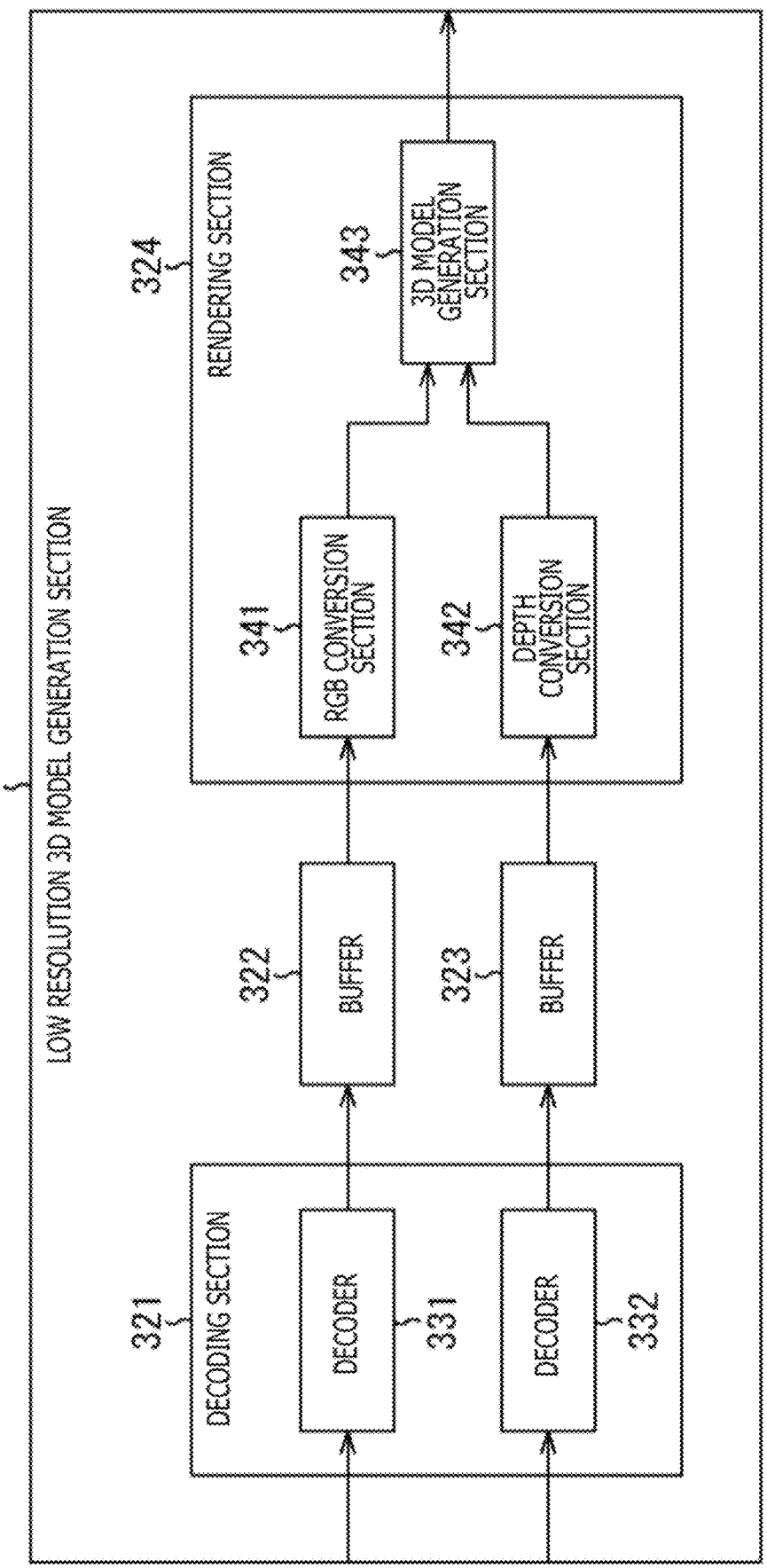
FIG. 21 is a block diagram depicting a configuration example of a first embodiment of a low resolution 3D model generation section.

FIG. 21 is a block diagram depicting a configuration example of the low resolution 3D model generation section 242 of FIG. 19.

The low resolution 3D model generation section 242 of FIG. 21 is configured from a decoding section 321, a buffer 322, another buffer 323 and a rendering section 324. The decoding section 321 is configured from a decoder 331 and another decoder 332. The rendering section 324 is configured from an RGB conversion section 341, a depth conversion section 342 and a 3D model generation section 343.

The decoding section 321 of the low resolution 3D model generation section 242 performs decoding of a low resolution texture stream and a low resolution depth stream.

In particular, the decoder 331 of the decoding section 321 decodes a low resolution texture stream supplied from the sight line detection section 234 of FIG. 19 to generate low resolution texture images. The decoder 331 accumulates the low resolution texture images into the buffer 322.

The decoder 332 decodes the low resolution depth stream supplied from the sight line detection section 234 to generate low resolution depth images. The decoder 332 accumulates the low resolution depth images into the buffer 323.

The rendering section 324 performs rendering of the low resolution texture stream (low resolution texture images) and the low resolution depth stream (low resolution depth images) after the decoding to generate three-dimensional data of a low resolution texture image for drawing.

In particular, the RGB conversion section 341 of the rendering section 324 converts YCbCr values as pixel values of the pixels of the low resolution texture images accumulated in the buffer 322 into RGB values and determines them as RGB values of sampling points corresponding to the pixels. Then, the RGB conversion section 341 supplies the RGB values of the sampling points to the 3D model generation section 343.

The depth conversion section 342 performs 8-bit dequantization for the pixel values of the pixels of the low resolution depth images accumulated in the buffer 323 to obtain reciprocals 1/r. Then, the depth conversion section 342 calculates, on the basis of the reciprocals 1/r of the pixels of the low resolution depth images, three-dimensional positions (u, v, z) of the pixels as three-dimensional positions (u, v, z) of the sampling points corresponding to the pixels. The depth conversion section 342 supplies the three-dimensional positions (u, v, z) of the sampling points to the 3D model generation section 343.

The 3D model generation section 343 generates, on the basis of the three-dimensional positions (u, v, z) of the sampling points supplied from the depth conversion section 342, connection information of the sampling points such that each three neighboring sampling points from among the sampling points are connected to each other. In particular, the 3D model generation section 343 generates, for each of the sampling points, connection information representative of connection of three vertices of a triangle patch having a vertex at the sampling point.

The 3D model generation section 343 generates the three-dimensional positions (u, v, z) and the RGB values of and the connection information between the sampling points as three-dimensional data of the low resolution texture image and supplies the three-dimensional data to the drawing section 236 of FIG. 19.

The ML3D model generation sections 241 perform decoding and rendering of high resolution encoded streams corresponding to three selection faces in such a manner as described above. The low resolution 3D model generation section 242 performs decoding and rendering of the low resolution encoded stream. Then, the drawing section 236 performs final rendering for generating a display image on the basis of the three-dimensional data of the first layer and the layer corresponding to the three selection faces and the three-dimensional data of the low resolution texture image.

(Description of Effect of Deletion of Connection Information and Occlusion Process)

Figure 23:
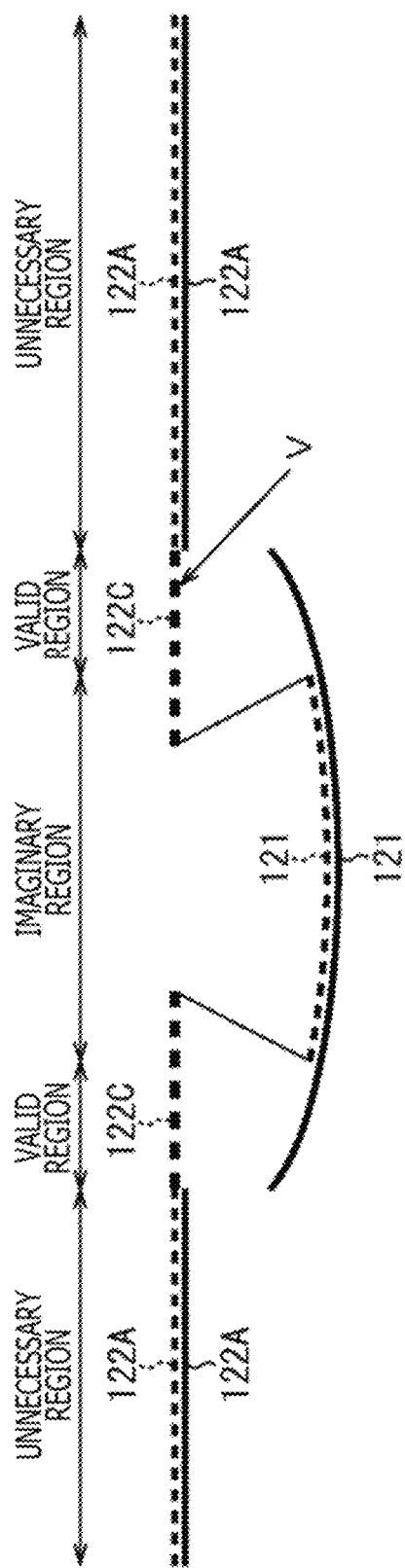
FIG. 23 is a view illustrating another example of connection information.

FIGS. 22A and 22B are views illustrating connection information in the case where connection information representative of connection to a sampling point corresponding to a discontinuity pixel in connection information of the first layer is not deleted, and FIG. 23 is a view illustrating connection information in the case where such connection information is deleted.

Referring to FIGS. 22A, 22B, and 23, the leftward and rightward direction represents the transverse direction of a texture image and the upward and downward direction represents a depth direction of the texture image. The upward direction in FIGS. 22A, 22B, and 23 is the near side, and the downward direction is the deep side. Further, in FIGS. 22A, 22B, and 23, a solid line represents three-dimensional positions (u, v, z) of sampling points of the first layer, and a broken line represents three-dimensional positions (u, v, z) of sampling points of the second layer. Further, in the examples of FIGS. 22A, 22B, and 23, the foreground 111 and the background 112 of FIG. 10 are imaging objects.

In the case where an occlusion process is not performed in none of the first layer and the second layer, three-dimensional positions of sampling points corresponding to discontinuity pixels on the boundaries of a picked up image 121 of a foreground 111 and a picked up image 122A of a region 112A of a background 112 of the first layer as depicted in FIG. 22A.

Further, in the case where connection information representative of connection to sampling points corresponding to discontinuity pixels in both the first layer and the second layer, the sampling points corresponding to the discontinuity pixels of the first layer and the second layer are connected to two neighboring sampling points as depicted in FIG. 22A.

Accordingly, a triangle patch having vertices at a sampling point corresponding to a discontinuity pixel of the first layer and two neighboring sampling points is generated, and the picked up image 122C in the valid region is filled by the triangle patch. Therefore, in the case where a display image including the imaged occlusion region 112C corresponding to a sight line V directed from a right lower portion to a left upper portion in the figure is to be generated, the valid region of the second layer in which the picked up image 122C of the imaged occlusion region 112C is disposed cannot be used.

On the other hand, in the case where connection information representative of connection to a sampling point corresponding to a discontinuity pixel is not deleted but an occlusion process is performed in both the first layer and the second layer, as depicted in FIG. 22B, the two-dimensional position of a sampling point corresponding to a discontinuity pixel in the first layer and the second layer is corrected to a two-dimensional position of a sampling point neighboring on the near side with the sampling point.

Accordingly, in the case where a display image corresponding to the sight line V is to be generated, the picked up image 122A of the region 112A of the first layer can be used as the display image of the imaged occlusion region 112C. As a result, the picture quality of the display image is improved.

However, a sampling point corresponding to a discontinuity pixel of the first layer after the occlusion process is connected to two neighboring sampling points and a triangle patch is generated. Accordingly, similarly as in the case of FIG. 22A, in the case where a display image corresponding to the sight line V is to be generated, the valid region of the second layer in which the picked up image 122C of the imaged occlusion region 112C is disposed cannot be used.

In contrast, the 3D model generation section 284 deletes connection information representative of connection to discontinuity pixels of the first layer as depicted in FIG. 23. Accordingly, a triangle patch having a vertex at the sampling point corresponding to the discontinuity pixel of the first layer is not generated. Therefore, in the case where a display image corresponding to the sight line V is to be generated, a valid region of the second layer in which a picked up image 122C of an imaged occlusion region 112C is disposed can be used. Since, in the second layer, deletion of connection information is not performed, a triangle patch of the second layer exists without fail in a region in which a triangle patch of the first layer does not exist.

Further, the occlusion processing section 303 performs an occlusion process for the second layer. Accordingly, as depicted in FIG. 23, the two-dimensional position of a sampling point on the depth side from between sampling points corresponding to a discontinuity pixel on the boundary between an valid region and a imaginary region of the second layer is connected to the two-dimensional position of the sampling point neighboring on the near side with the sampling point on the depth side. Accordingly, in the second layer, an occlusion region is reduced. Therefore, the picture quality of the second layer that is used when a display image corresponding to the sight line V is to be generated is improved, and as a result, the picture quality of the display image is improved.

(Description of Effect of Angle of View of Face of First Layer)

FIGS. 24A, 24B, 25A, and 25B are views illustrating sampling points in the case where the angle of view of each face of the first layer is 90 degrees and 100 degrees, respectively.

In the examples of FIGS. 24A, 24B, 25A, and 25B, it is assumed that, for the convenience of description, the resolutions of a texture image and a depth image of the first layer in the case where the angle of view of each face of the first layer is 90 degrees and 100 degrees are 4×4 pixels and 6×6 pixels, respectively.

Figure 24B:
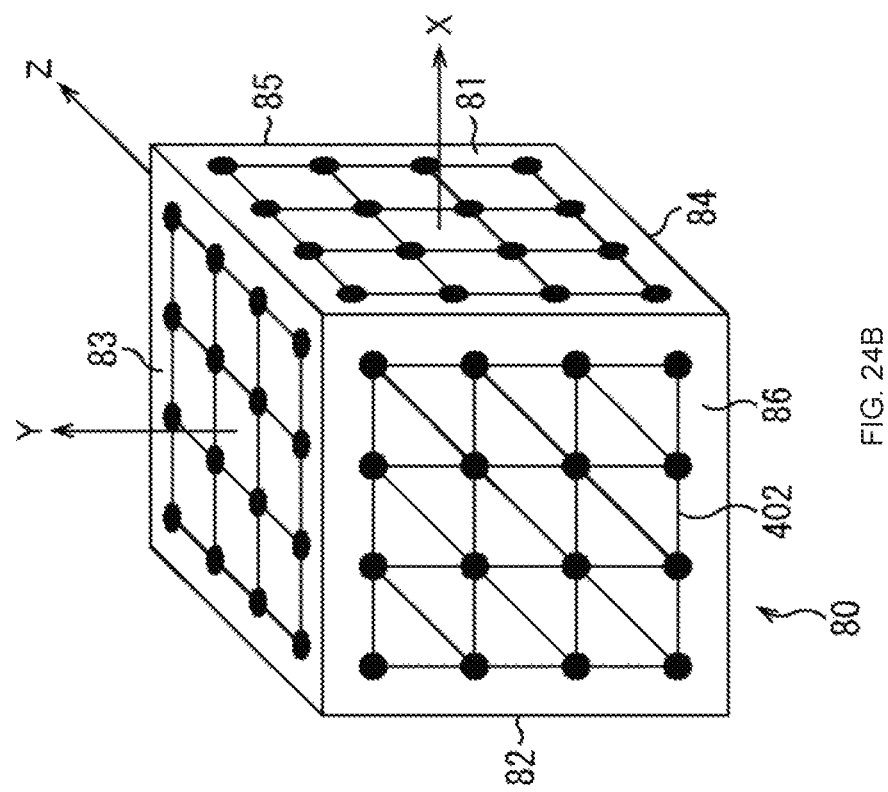
FIGS. 24A and 24B are views illustrating an example of sampling points.

As depicted in FIG. 24B, in the case where the angle of view of each face of the first layer is 90 degrees, the six faces of the first layer are six faces 81 to 86 configuring a cube 80.

Figure 24A:
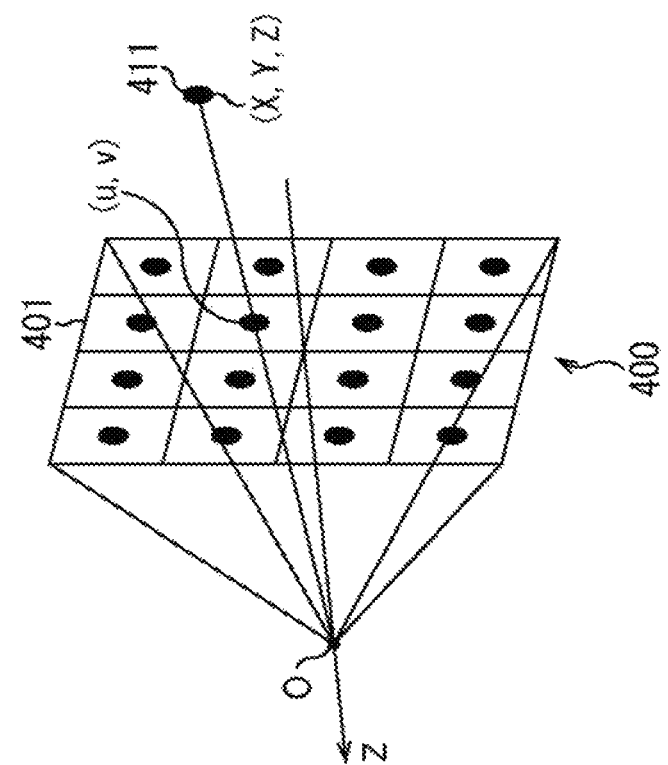

However, as depicted in FIG. 24A, the position (u, v) of a sampling point 411 on a texture image 400 of the −Z face 86 of the first layer, namely, the position at which a line directed from the viewpoint O in the 3D model coordinate system toward the sampling point 411 crosses with the −Z face 86 is the center of each pixel 401. Also the positions (u, v) of sampling points of the other faces 81 to 85 are centers of pixels similarly as in the −Z face 86.

Accordingly, the sizes in the u direction and the v direction of a region 402 on the faces 81 to 86 of all triangle patches configured by connection of every three sampling points neighboring with each other from among the sampling points each indicated by a dark round mark in FIG. 24B are smaller by sizes of one half of a pixel in comparison with the faces 81 to 86. Therefore, triangle patches corresponding to the boundaries of the faces 81 to 86 are not generated, and as a result, it becomes difficult to generate a display image of a sight line passing the boundary between the faces 81 to 86 in high picture quality.

Figure 25B:
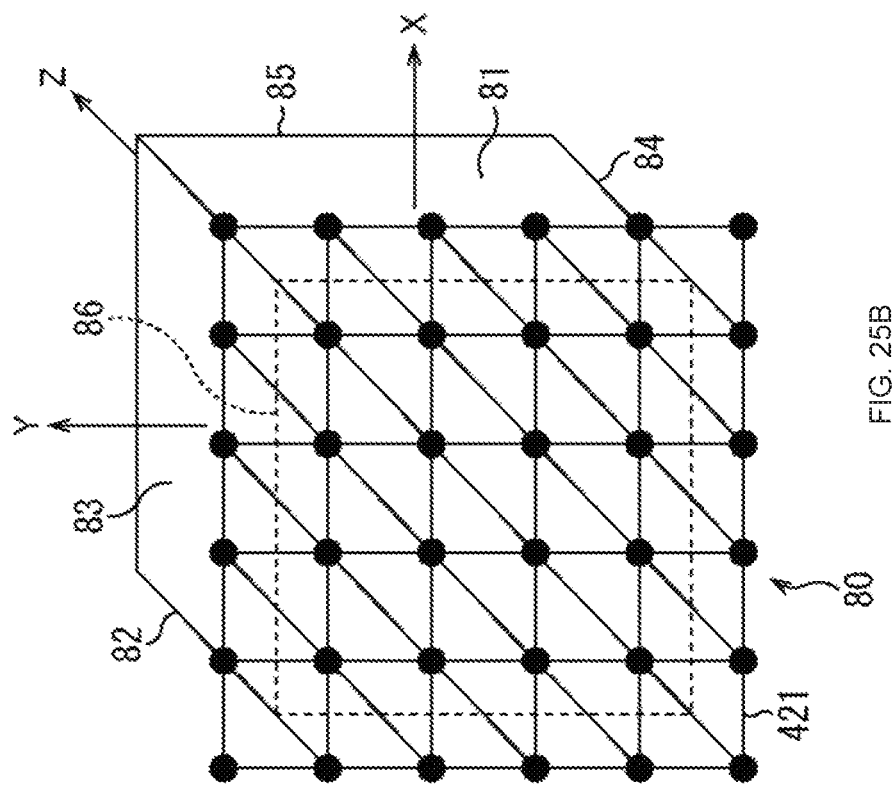
FIGS. 25A and 25B are views illustrating another example of sampling points.
Figure 25A:
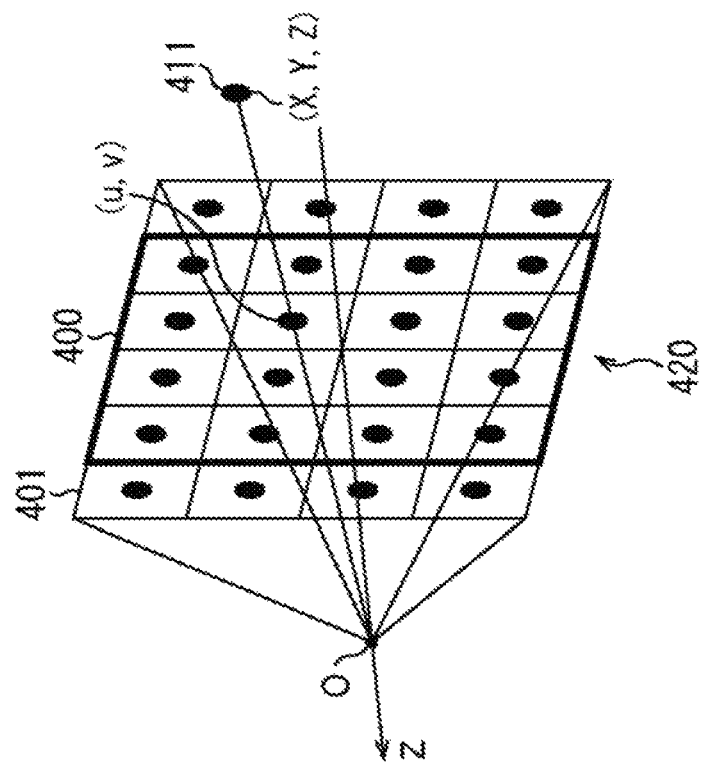

In contrast, in the case where the angle of view of each face of the first layer is 100 degrees, the size of a texture image 420 of the faces of the first layer including the −Z face 86 becomes 6×6 pixels greater than the size of the texture image 400 of FIGS. 24A and 24B as depicted in FIG. 25A. Also the size of the texture image of each face of the first layer including the other faces 81 to 85 becomes 6×6 pixels similarly.

Accordingly, as depicted in FIG. 25B, the sizes in the u direction and the v direction of a region 421 on the −Z face 86 of all triangle patches configured by connection of every three neighboring sampling points from among the sampling points each indicated by a dark round mark in the figure are greater by a size of one half of a pixel in comparison with that of the −Z face 86. Though not depicted, also the sizes in the u direction and the v direction of a region of a triangle patch of each face of the first layer including the other faces 81 to 85 are greater by a size of one half of a pixel in comparison with those of the faces 81 to 85 similarly to the region 421. Accordingly, a triangle patch corresponding to the boundary of each of the faces 81 to 86 is generated, and as a result, a display image of an arbitrary sight line including a sight line passing the boundary of each of the faces 81 to 86 can be generated with high picture quality.

Although an effect in the case where the angle of view of each face of the first layer is 100 degrees is described with reference to FIGS. 24A, 24B, 25A, and 25B, if the angle of view of each face of the first layer is greater than 90 degrees, then a similar effect is generated even in the case where the angle of view is not 100 degrees.

(Description of Effect of Angle of View of Face of Second Layer)

Figure 26B:
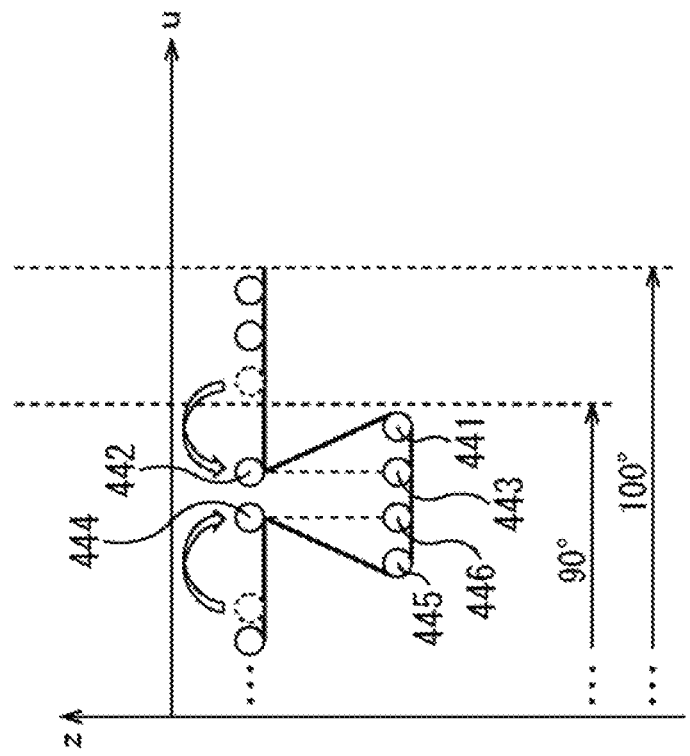
FIGS. 26A and 26B are views illustrating an occlusion process.
Figure 26A:
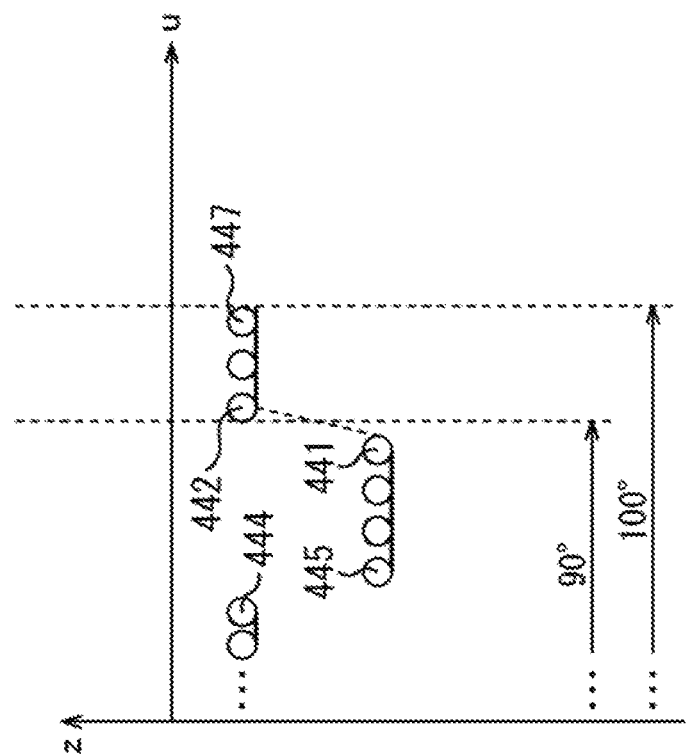

FIGS. 26A and 26B are views illustrating an occlusion process in the case where the angle of view of each face of the second layer is 90 degrees and 100 degrees.

Referring to FIGS. 26A and 26B, the axis of abscissa represents a u axis and the axis of ordinate represents a z axis. Further, a round mark represents a sampling point. Furthermore, in the example of FIGS. 26A and 26B, the z coordinates of the position in the depth direction increases toward the deep side.

In the case where the angle of view of each face of the second layer is 90 degrees, sampling points are mapped only to one of the faces of the second layer. Accordingly, as depicted in FIG. 26A, a sampling point 442 neighboring with a sampling point 441 that is mapped to an end portion in the u direction of the face of a processing target is not mapped to the face of the processing target, and upon occlusion process of the face of the processing target, the position of the sampling point 442 on the z axis is unknown.

Therefore, even in the case where the difference between the z coordinates of the sampling point 441 and the sampling point 442 is equal to or greater than the threshold value, a pixel corresponding to the sampling point 441 is not detected as a discontinuity pixel. Similarly, also in the case where a face to which the sampling point 442 is mapped is the face of the processing target, a pixel corresponding to the sampling point 442 is not detected as a discontinuity pixel. Accordingly, an occlusion process cannot be performed for the sampling point 441 and the sampling point 442. In other words, in order to perform an occlusion process for the sampling point 441 and the sampling point 442, it is necessary to use, in addition to a depth image of the face of the processing target, also a depth image of a face neighboring with the face of the processing target.

In contrast, in the case where the angle of view of each face of the second layer is 100 degrees, at an end portion of each face, a sampling point that is mapped to a region other than an end portion of a face neighboring with the face is mapped in an overlapping relationship as a margin. For example, at an end portion of the face of the processing target to which the sampling point 441 is mapped, the sampling point 442 that is mapped in a region other than an end portion of a face neighboring with the face of the processing target is mapped.

Accordingly, in the case where the difference between the z coordinates of the sampling point 441 and the sampling point 442 is equal to or greater than the threshold value, pixels corresponding to the sampling point 441 and the sampling point 442 are detected as discontinuity pixels. Therefore, an occlusion process can be performed for the sampling point 441 and the sampling point 442 as depicted in FIG. 26B. As a result, the u coordinate of the sampling point 442 corresponding to a discontinuity pixel is corrected to the u coordinate of a sampling point 443 in the proximity of and on the nearer side than the sampling point 442 (which has a smaller z coordinate).

It is to be noted that, since, in the example of FIGS. 26A and 26B, the difference of the z coordinate between a sampling point 444 and a sampling point 445 mapped to a region other than an end portion of the face of the processing target is equal to or greater than the threshold value, also pixels corresponding to the sampling point 444 and the sampling point 445 are detected as discontinuity pixels. As a result, as depicted in FIG. 26B, the u coordinate of the sampling point 444 is corrected to the u coordinate of a sampling point 446 in the proximity of and on the nearer side than the sampling point 444.

Further, a sampling point 447 at an end portion of the face of the processing target, which has the greatest u coordinate, is mapped to a region other than an end portion of a face neighboring with the face of the processing target. Accordingly, in the case where this face is set as a face of a processing target, it is decided whether or not a pixel corresponding to the sampling point 447 is a discontinuity pixel, and in the case where it is decided that the pixel is a discontinuity pixel, an occlusion process for the sampling point 447 can be performed.

As described above, in the case where the angle of view of each face of the second layer is 100 degrees, it is possible to use only a sampling point of each face to perform an occlusion process also for the sampling point 441 mapped to an end portion of a region other than an end portion of each face. As a result, an occlusion region of the second layer is reduced, and the picture quality of the display image can be improved.

While an effect in the case where the angle of view of each face of the second layer is 100 degrees is described with reference to FIGS. 26A and 26B, if the angle of view of each face of the second layer is greater than 90 degrees, then even in the case where the angle of view is not 100 degrees, a similar effect is generated.

It is to be noted that the ML3D model generation sections 241-1 to 241-3 may perform image processing such as a filter process using peripheral pixels or the like for a texture image or a depth image obtained as a result of decoding. In this case, since the angle of view of each face of the first layer and the second layer is greater than 90 degrees, an effect that, also at an end portion of a region other than an end portion of each face, image processing can be performed similarly to an occlusion process.

(Description of Processing of Home Server)

Figure 27:
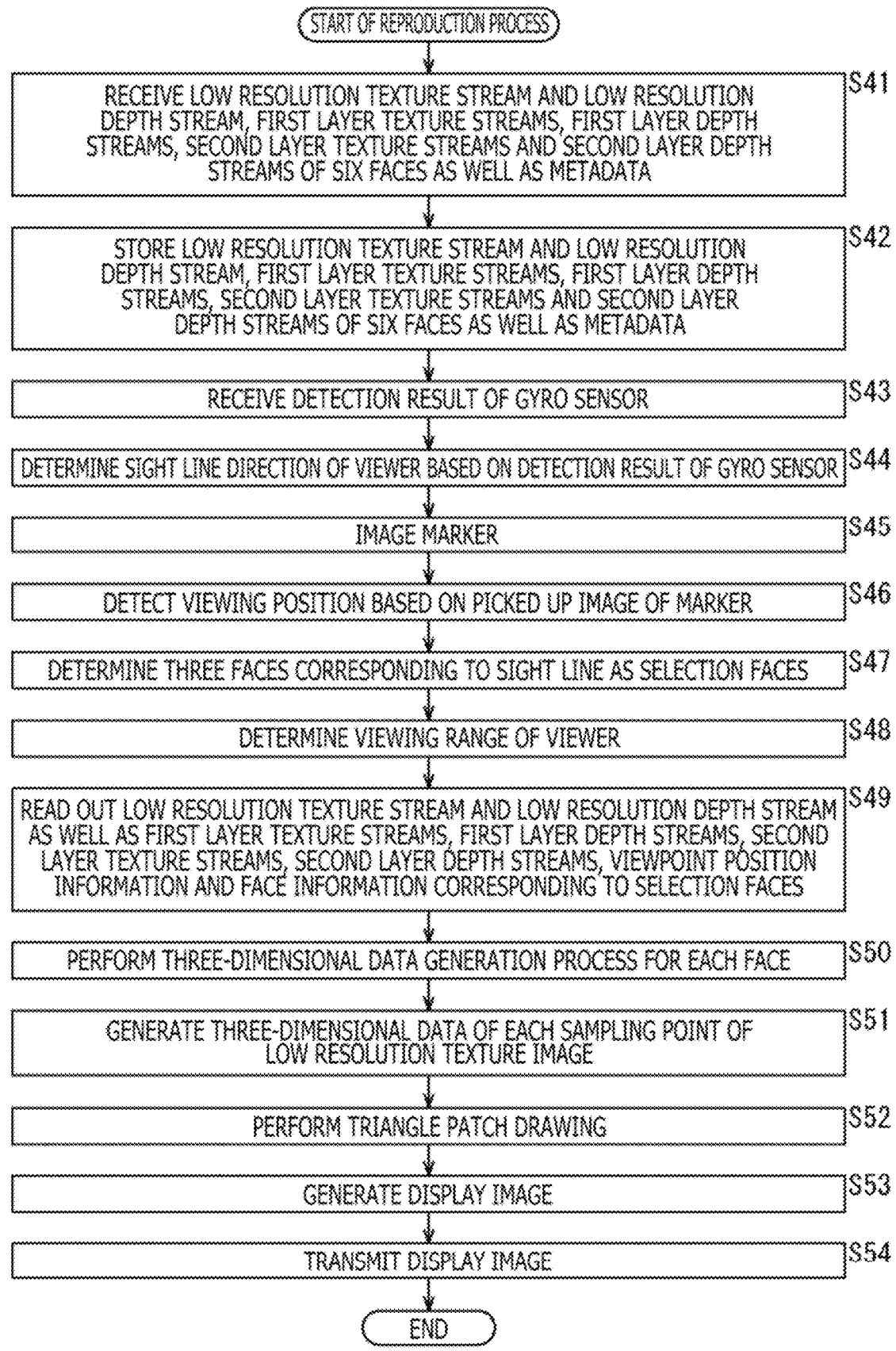
FIG. 27 is a flow chart illustrating a first embodiment of a reproduction process.

FIG. 27 is a flow chart illustrating a reproduction process of the home server 13a of FIG. 19. This reproduction process is started when a low resolution texture stream and a low resolution depth stream, first layer texture streams, first layer depth streams, second layer texture streams and second layer depth streams of six faces and metadata are transmitted, for example, from the content server 12 to the home server 13a.

At step S41 of FIG. 27, the acceptance section 231 of the home server 13a accepts a low resolution texture stream and a low resolution depth stream, first layer texture streams, first layer depth streams, second layer texture streams and second layer depth streams of six faces and metadata transmitted from the content server 12 and supplies them to the storage 232.

At step S42, the storage 232 stores the low resolution texture stream and low resolution depth stream, the first layer texture streams, first layer depth streams, second layer texture streams and second layer depth streams of the six faces and the metadata.

At step S43, the acceptance section 233 accepts a result of the detection of the gyro sensor 15B of FIG. 1 from the head mounted display 15 and supplies the same to the sight line detection section 234.

At step S44, the sight line detection section 234 determines a sight line direction of the viewer in the 3D model coordinate system on the basis of the detection result of the gyro sensor 15B supplied from the acceptance section 233. At step S45, the camera 13A images the marker 15A applied to the head mounted display 15 and supplies a picked up image obtained as a result of the imaging to the sight line detection section 234.

At step S46, the sight line detection section 234 detects a viewing position in the 3D model coordinate system on the basis of the picked up image of the marker 15A supplied from the camera 13A and supplies the viewing position to the drawing section 236.

At step S47, the sight line detection section 234 determines three faces corresponding to sight line vectors closest to the sight line from among the six faces as selection faces on the basis of the table of the first layer from within the metadata stored in the storage 232 and the viewing position and the sight line direction in the 3D model coordinate system.

At step S48, the sight line detection section 234 determines a viewing range of the viewer in the 3D model coordinate system on the basis of the viewing position and the sight line direction in the 3D model coordinate system, and supplies the viewing range to the drawing section 236.

At step S49, the sight line detection section 234 reads out the low resolution texture stream and the low resolution depth stream from the storage 232 and supplies them to the low resolution 3D model generation section 242. Further, the sight line detection section 234 reads out first layer texture streams, first layer depth streams, second layer texture streams and second layer depth streams corresponding to the three selection faces from the storage 232. The sight line detection section 234 supplies the read out first layer texture streams, first layer depth streams, second layer texture streams and second layer depth streams for each face to the ML3D model generation sections 241-1 to 241-3. Further, the sight line detection section 234 reads out the viewpoint position information and the face information corresponding to the three selection faces from the storage 232 and supplies them to the drawing section 236.

At step S50, the ML3D model generation sections 241-1 to 241-3 perform, for each face, a three-dimensional data generation process for generating three-dimensional data of the sampling points of the first layer and the second layer. Details of the three-dimensional data generation process are hereinafter described with reference to FIG. 28.

At step S51, the low resolution 3D model generation section 242 generates three-dimensional data of the sampling points of the low resolution texture image from the low resolution texture stream and the low resolution depth stream supplied from the sight line detection section 234 and supplies the three-dimensional data to the drawing section 236.

At step S52, the drawing section 236 performs, on the basis of the three-dimensional data of the low resolution texture image supplied from the low resolution 3D model generation section 242, triangle patch drawing of the low resolution texture image in the 3D model coordinate system. Thereafter, the drawing section 236 performs, on the basis of the three-dimensional data of the first layer and the second layer supplied from the ML3D model generation sections 241-1 to 241-3 and the viewpoint position information and the face information supplied from the sight line detection section 234, triangle patch drawing of texture images of the first layer and the second layer in the 3D model coordinate system.

At step S53, the drawing section 236 generates a display image by perspectively projecting the triangle patch drawn in the 3D model coordinate system to the viewing range with respect to the viewpoint given as the viewing position supplied from the sight line detection section 234. At step S54, the drawing section 236 transmits the display image to the conversion apparatus 14 of FIG. 1.

Figure 28:
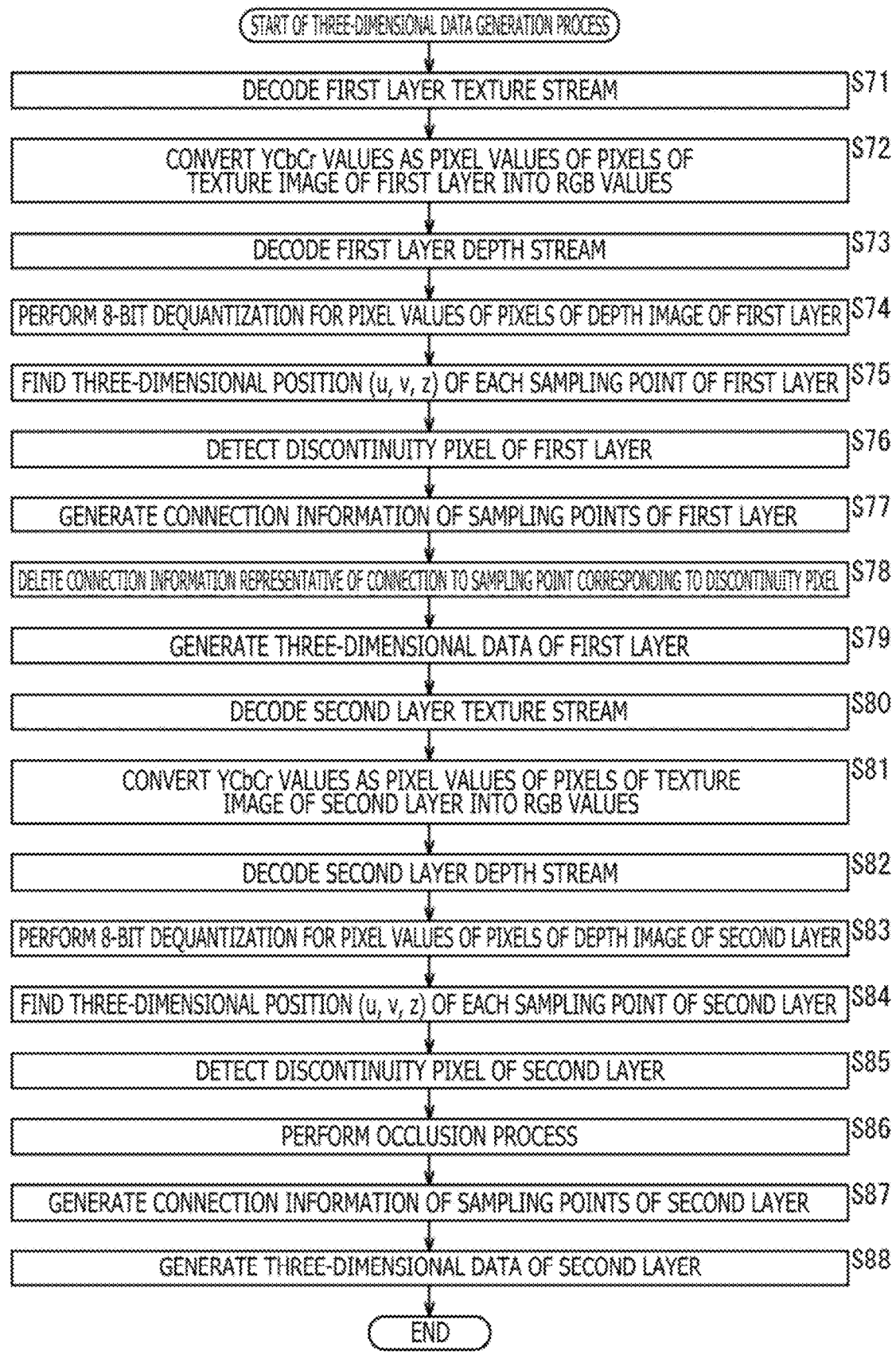
FIG. 28 is a flow chart illustrating details of a three-dimensional data generation process.

FIG. 28 is a flow chart illustrating details of the three-dimensional data generation process performed by each of the ML3D model generation sections 241 (ML3D model generation sections 241-1 to 241-3) at step S50 of FIG. 27.

At step S71 of FIG. 28, the decoding section 271 (FIG. 20) of the ML3D model generation section 241 decodes first layer texture streams supplied from the sight line detection section 234 of FIG. 19 to generate texture images of the first layer. The decoding section 271 accumulates the texture images of the first layer into the buffer 262.

At step S72, the RGB conversion section 281 converts YCbCr values as pixel values of the pixels of the texture image of the first layer accumulated in the buffer 262 into RGB values and determines them as RGB values of sampling points corresponding to the pixels. Then, the RGB conversion section 281 supplies the RGB values of the sampling points to the 3D model generation section 284.

At step S73, the decoder 272 decodes the first layer depth streams supplied from the sight line detection section 234 to generate depth images of the first layer. The decoder 272 accumulates the depth images of the first layer into the buffer 263.

At step S74, the depth conversion section 282 performs 8-bit dequantization for the pixel value of each pixel of the depth image of the first layer accumulated in the buffer 263 and obtains a reciprocal 1/r of each pixel of the depth image of the first layer.

At step S75, the depth conversion section 282 calculates the three-dimensional position (u, v, z) of each pixel of the depth image of the first layer on the basis of the reciprocal 1/r of each pixel of the depth image of the first layer as a three-dimensional position (u, v, z) of a sampling point corresponding to the pixel. The depth conversion section 282 supplies the three-dimensional positions (u, v, z) of the sampling points to the discontinuity detection section 283 and the 3D model generation section 284.

At step S76, the discontinuity detection section 283 detects discontinuity pixels from among the pixels of the depth images of the first layer on the basis of the three-dimensional positions (u, v, z) of the sampling points supplied from the depth conversion section 282. The discontinuity detection section 283 supplies the three-dimensional positions (u, v, z) of the sampling points corresponding to the discontinuity pixels to the 3D model generation section 284.

At step S77, the 3D model generation section 284 generates, on the basis of the three-dimensional positions (u, v, z) of the sampling points supplied from the depth conversion section 282, connection information of the sampling points of the first layer such that every three neighboring sampling points from among the sampling points are connected to each other.

At step S78, the 3D model generation section 284 deletes, on the basis of the three-dimensional positions (u, v, z) of the sampling points corresponding to the discontinuity pixels supplied from the discontinuity detection section 283, connection information representative of connection to the sampling points corresponding to the discontinuity pixels from within the connection information of the sampling points generated at step S77.

At step S79, the 3D model generation section 284 generates three-dimensional positions (u, v, z) of the sampling points of the first layer, RGB values and connection information after the deletion by the process at step S78 as three-dimensional data of the first layer. The 3D model generation section 284 supplies the three-dimensional data of the first layer to the drawing section 236 of FIG. 19.

At step S80, the decoder 291 decodes the second layer texture streams supplied from the sight line detection section 234 to generate texture images of the second layer. The decoder 291 accumulates the texture images of the second layer into the buffer 266.

At step S81, the RGB conversion section 301 converts the YCbCr values as pixel values of the pixels of the texture images of the second layer accumulated in the buffer 266 into RGB values and determines the RGB values as RGB values of the sampling points corresponding to the pixels. Then, the RGB conversion section 301 supplies the RGB values of the sampling points to the 3D model generation section 304.

At step S82, the decoder 292 decodes the second layer depth streams supplied from the sight line detection section 234 to generate depth images of the second layer. The decoder 292 accumulates the depth images of the second layer into the buffer 267.

At step S83, the depth conversion section 302 performs 8-bit dequantization for the pixel values of the pixels of the depth images of the second layer accumulated in the buffer 267 and obtains reciprocals 1/r of the pixels of the depth images of the second layer.

At step S84, the depth conversion section 302 calculates, on the basis of the reciprocals 1/r of the pixels of the depth images of the second layer, three-dimensional positions (u, v, z) of the pixels of the depth images of the second layer as three-dimensional positions (u, v, z) of sampling points corresponding to the pixels. The depth conversion section 302 supplies the three-dimensional positions (u, v, z) of the sampling points to the occlusion processing section 303 and the 3D model generation section 304.

At step S85, the occlusion processing section 303 detects, on the basis of the three-dimensional positions (u, v, z) of the sampling points supplied from the depth conversion section 302, discontinuity pixels among the pixels of the depth image of the second layer.

At step S86, the occlusion processing section 303 performs, on the basis of the three-dimensional positions (u, v, z) of the sampling points of the second layer, an occlusion process for correcting the three-dimensional positions (u, v, z) of the sampling points corresponding to the discontinuity pixels. The occlusion processing section 303 supplies the three-dimensional positions (u, v, z) after the occlusion process of the sampling points of the second layer to the 3D model generation section 304.

At step S87, the 3D model generation section 304 generates, on the basis of three-dimensional positions (u, v, z) of the sampling points supplied from the occlusion processing section 303, connection information of the sampling points of the second layer such that every three neighboring sampling points among the sampling points are connected to each other.

At step S88, the 3D model generation section 304 generates the three-dimensional positions (u, v, z) and the connection information of the sampling points and the RGB values supplied from the RGB conversion section 301 as three-dimensional data of the second layer. The 3D model generation section 304 supplies the three-dimensional data of the second layer to the drawing section 236 of FIG. 19.

The home server 13a generates a display image using the first layer and the second layer in such a manner as described above. Accordingly, in the case where the viewing position is different from the viewpoint O, an occlusion region of the viewpoint O included in the display image can be generated using the second layer. Accordingly, a display image of high picture quality can be generated.

Further, the home server 13a generates a display image using not only a texture image but also a depth image. Accordingly, it is possible to map a texture image to a triangle patch of a three-dimensional shape according to an imaging object by triangle patch drawing and generate a display image using the triangle patch. Therefore, in comparison with an alternative case in which a display image is generated by mapping a texture image to a predetermined face using only a texture image, a display image of higher picture quality can be generated.

Furthermore, a texture image and a depth image of the first layer are a texture image and a depth image obtained by mapping a texture image and a depth image of an omnidirectional image, respectively. Accordingly, a reproduction apparatus that reproduces only a texture image and a depth image obtained by mapping a texture image and a depth image of an omnidirectional image to a predetermined face can reproduce the texture image and the depth image of the first layer.

In particular, the format of texture images and depth images of the first layer and the second layer generated by the content server 12 has compatibility with the format of a texture image and a depth image obtained by mapping a texture image and a depth image of an omnidirectional image. Further, the reproduction method by the home server 13a has compatibility with the reproduction method of a reproduction apparatus that reproduces only a texture image and a depth image obtained by mapping a texture image and a depth image of an omnidirectional image to a predetermined face.

It is to be noted that the home server 13a may generate a display image using only a texture image and a depth image of the first layer. In this case, for the first layer, an occlusion process is performed in place of deletion of connection information.

Further, while, in the foregoing description, the 3D model generation section 284 deletes connection information representative of connection to a sampling point corresponding to a discontinuity pixel detected by the discontinuity detection section 283, connection information may otherwise be deleted on the basis of triangle patch validity information (details are hereinafter described) transmitted from the content server 12. In this case, the discontinuity detection section 283 is not provided.

(Description of Triangle Patch Validity Information)

Figure 29:
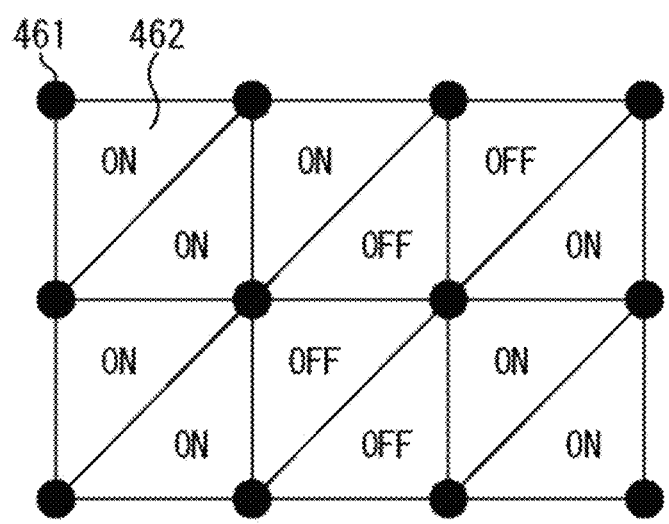
FIG. 29 is a view illustrating triangle patch validity information.

FIG. 29 is a view illustrating triangle patch validity information transmitted from the content server 12 in such a case as just described.

In the example of FIG. 29, the number of sampling points 461 of the first layer is 12. Accordingly, the number of triangle patches 462 each of which has vertices at three neighboring sampling points 461 is 12.

In this case, the content server 12 detects discontinuity pixels similarly to the discontinuity detection section 283. Then, the content server 12 sets a triangle patch 462 having a vertex at a sampling point corresponding to each discontinuity pixel as invalid (OFF) and sets each triangle patch 462 that does not include a sampling point corresponding to any discontinuity pixel as valid (ON).

The content server 12 generates triangle patch validity information indicating that each triangle patch 462 is valid or invalid and places the triangle patch validity information into metadata.

The 3D model generation section 284 of the home server 13a deletes, on the basis of the triangle patch validity information, connection information representative of connection between sampling points that configure the vertices of each invalid triangle patch. As a result, any triangle patch whose triangle patch validity information indicates invalid is not drawn.

It is to be noted that triangle patches are generated by two for each sampling point except sampling points at the right end and the lower end. Further, the triangle patch validity information is information of 1 bit indicating that the triangle patch is valid or invalid. Accordingly, if the pixel number in the horizontal direction of a texture image of the first layer is represented by width and the pixel number in the vertical direction is represented by height, the bit number of triangle patch validity information of all triangle patches is (width−1)*(height−1)*2 bits.

The triangle patch validity information is transmitted in a lossless compression state or a non-compression state from the content server 12 to the home server 13a. It is to be noted that the triangle patch validity information may be disposed as Cb and Cr values of a depth image.

Second Embodiment

In the first embodiment, a display image is generated on the basis of a low resolution encoded stream and high resolution encoded streams corresponding to three selection faces close to the sight line of a viewer. Accordingly, in the case where, for example, the sight line direction of the viewer changes rapidly or changes by a great amount, the ratio of the low resolution region in the display image becomes high and the picture quality deteriorates. In order to prevent this, it is conceivable, for example, to increase the number of selection faces or generate a display image using only high resolution encoded streams of all faces without using a low resolution encoded stream.

In the meantime, decoding and rendering of a low resolution encoded stream and a high resolution encoded stream are processes of a very high load. Therefore, there is the possibility that decoding and rendering of the encoded streams may not be performed in time by a processing capacity of the home server 13 or the like, resulting in occurrence of non-display of all or part of the display image, freeze or delay of update and therefore in deterioration of the picture quality. Especially, if the number of selection faces is increased as described above or only high resolution encoded streams are used to generate a display image, then the possibility that deterioration of the picture quality by delay in decoding and rendering of the encoded streams may occur becomes high.

Therefore, the second embodiment decreases the load upon the home server 13 and suppresses deterioration of the picture quality of a display image by performing decoding and rendering of the encoded streams with priorities applied among the encoded streams as occasion demands.

Configuration Example of Second Embodiment of Home Server

Figure 30:
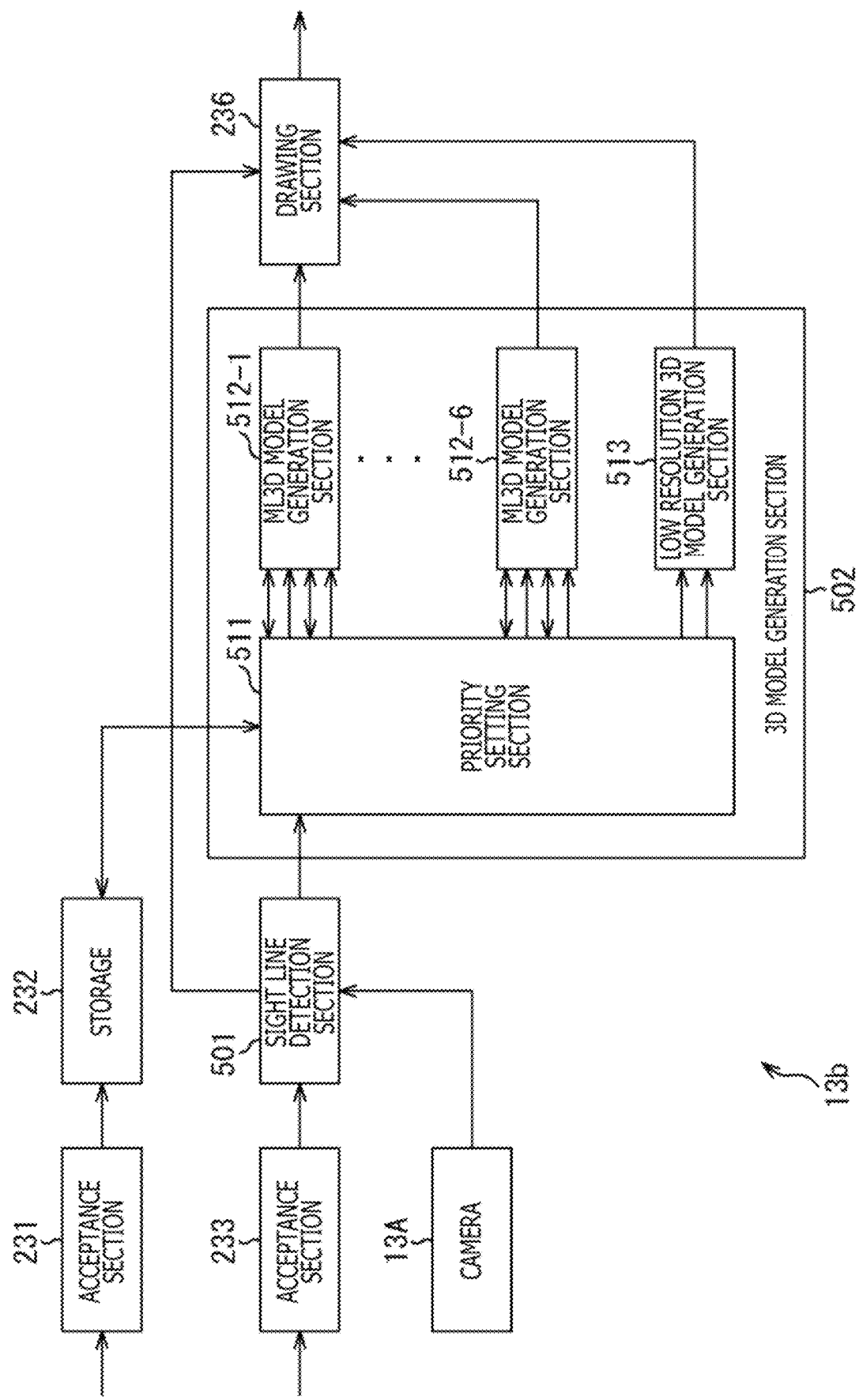
FIG. 30 is a block diagram depicting a configuration example of a second embodiment of the home server.

FIG. 30 is a block diagram depicting a configuration example of a home server 13b (image processing apparatus) that is a second embodiment of the home server 13 of FIG. 1.

The same components as those of FIG. 19 from among components depicted in FIG. 30 are denoted by the same reference signs. Overlapping description is suitably omitted.

The home server 13b of FIG. 30 is configured from a camera 13A, an acceptance section 231, a storage 232, another acceptance section 233, a drawing section 236, a sight line detection section 501 and a 3D model generation section 502 (image generation section). The home server 13b is different in comparison with the home server 13a of FIG. 19 in that the sight line detection section 501 and the 3D model generation section 502 are provided in place of the sight line detection section 234 and the 3D model generation section 235. The 3D model generation section 502 is configured from a priority setting section 511, ML3D model generation sections 512-1 to 512-6 and a low resolution 3D model generation section 513.

The sight line detection section 501 performs determination of a sight line direction of a viewer, detection of a viewing position of the viewer and determination of a viewing range of the viewer similarly to the sight line detection section 234 of FIG. 19. The sight line detection section 501 supplies the viewing range and the viewing position of the viewer to the drawing section 236. Further, the sight line detection section 501 supplies the sight line direction and the viewing position of the viewer to the priority setting section 511.

The priority setting section 511 sets, on the basis of recommended viewing direction information and face metadata of metadata stored in the storage 232, a viewing position and a sight line direction of a viewer supplied from the sight line detection section 501, sound source information supplied from a sound processing section not depicted and a distribution of color information in the image supplied from the ML3D model generation sections 512-1 to 512-6, a priority for performing decoding and rendering of each encoded stream. The priority setting section 511 supplies the priorities for the encoded streams to the respectively corresponding ML3D model generation sections 512-1 to 512-6 and the low resolution 3D model generation section 513.

Further, the priority setting section 511 reads out first layer texture streams, first layer depth streams, second layer texture streams and second layer depth streams corresponding to the faces from the storage 232. The priority setting section 511 supplies the read out first layer texture streams, first layer depth streams, second layer texture streams and second layer depth streams for each face to the ML3D model generation sections 512-1 to 512-6. Further, the priority setting section 511 reads out a low resolution texture stream and a low resolution depth stream from the storage 232 and supplies them to the low resolution 3D model generation section 513.

The ML3D model generation sections 512-1 to 512-6 generate three-dimensional data of texture images of the first layer and the second layer of the respectively corresponding faces similarly to the ML3D model generation sections 241-1 to 241-3 of FIG. 19. For example, the ML3D model generation section 512-1 generates three-dimensional data of the texture images of the first layer and the second layer of the faces including the +X face 81. The ML3D model generation section 512-2 generates three-dimensional data of the texture images of the first layer and the second layer of the faces including the −X face 82. The ML3D model generation section 512-3 generates three-dimensional data of the texture images of the first layer and the second layer of the faces including the +Y face 83. The ML3D model generation section 512-4 generates three-dimensional data of the texture images of the first layer and the second layer of the faces including the −Y face 84. The ML3D model generation section 512-5 generates three-dimensional data of the texture images of the first layer and the second layer of the faces including the +Z face 85. The ML3D model generation section 512-6 generates three-dimensional data of the texture images of the first layer and the second layer of the faces including the −Z face 86. Then, the ML3D model generation sections 512-1 to 512-6 supply the three-dimensional data of the texture images of the first layer and the second layer to the drawing section 236.

However, different from the ML3D model generation sections 241-1 to 241-3, the ML3D model generation sections 512-1 to 512-6 perform, when decoding and rendering of the high resolution encoded streams are performed, a thinning process of a picture in accordance with the priority set by the priority setting section 511 as hereinafter described. Further, the ML3D model generation sections 512-1 to 512-6 detect a distribution of color information of pictures of the decoded first layer texture streams and second layer texture streams and supply a detection result to the priority setting section 511.

It is to be noted that, in the case where there is no necessity to distinguish the ML3D model generation sections 512-1 to 512-6 individually from each other, each of them is hereinafter referred to simply as ML3D model generation section 512.

The low resolution 3D model generation section 513 generates three-dimensional data of a low resolution texture image similarly to the low resolution 3D model generation section 242 of the home server 13a of FIG. 19. The low resolution 3D model generation section 513 supplies the three-dimensional data of the low resolution texture image to the drawing section 236.

However, different from the low resolution 3D model generation section 242, the low resolution 3D model generation section 513 performs, when decoding and rendering of a low resolution encoded stream are to be performed, a thinning process of a picture in accordance with the priority set by the priority setting section 511.

(Configuration Example of ML3D Model Generation Section)

Figure 31:
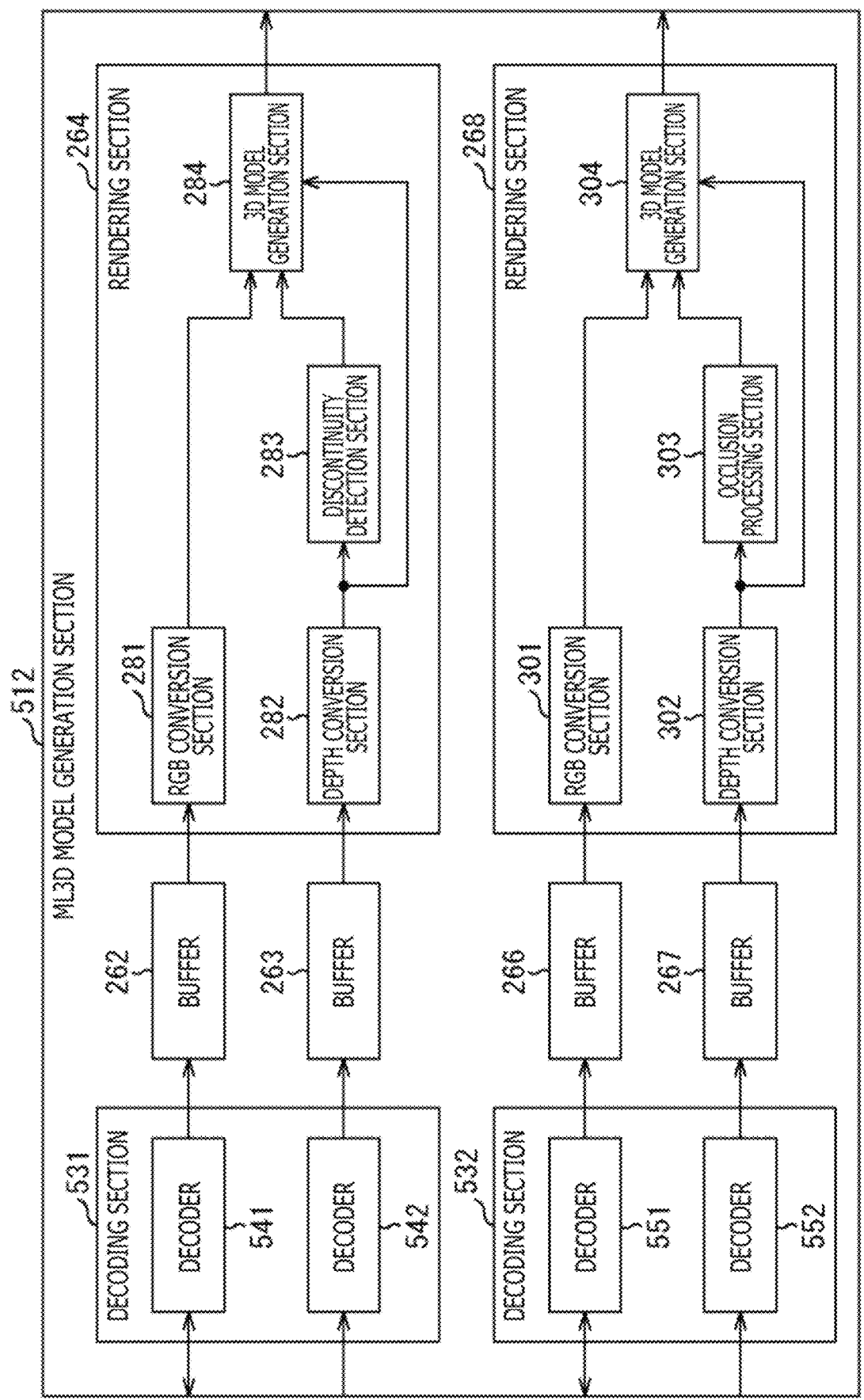
FIG. 31 is a block diagram depicting a configuration example of a second embodiment of the ML3D model generation section

FIG. 31 is a block diagram depicting a configuration example of the ML3D model generation section 512 of FIG. 30.

The same components as those of FIG. 20 from among components depicted in FIG. 30 are denoted by the same reference signs. Overlapping description is suitably omitted.

The ML3D model generation section 512 of FIG. 31 includes a buffer 262, another buffer 263, a rendering section 264, a decoding section 265, a further buffer 266, a still further buffer 267, another rendering section 268, another decoding section 531 and a further decoding section 532. The ML3D model generation section 512 is different in comparison with the ML3D model generation section 241 of FIG. 20 in that the decoding section 531 and the decoding section 532 are provided in place of the decoding section 261 and the decoding section 265. The decoding section 531 includes a decoder 541 and another decoder 542. The decoding section 532 includes a decoder 551 and another decoder 552.

The decoder 541 of the decoding section 531 decodes first layer texture streams supplied from the priority setting section 511 to generate texture images of the first layer and accumulates the texture images of the first layer into the buffer 262 similarly to the decoder 271 of FIG. 20.

It is to be noted that, different from the decoder 271, the decoder 541 performs, when decoding of a first layer texture stream is to be performed, a thinning process of a picture in accordance with the priority set by the priority setting section 511 as hereinafter described. Further, the decoder 541 detects a distribution of color information of the decoded picture and supplies a result of the detection to the priority setting section 511 of FIG. 30.

Similarly to the decoder 272 of FIG. 20, the decoder 542 of the decoding section 531 decodes first layer depth streams supplied from the priority setting section 511 to generate depth images of the first layer and accumulates the depth images of the first layer into the buffer 263.

It is to be noted that, different from the decoder 272, the decoder 542 performs, when decoding of a first layer depth stream is to be performed, a thinning process of a picture in accordance with the priority set by the priority setting section 511 as hereinafter described.

The decoder 551 of the decoding section 532 decodes second layer texture streams supplied from the priority setting section 511 to generate texture images of the second layer and accumulates the texture images of the second layer into the buffer 266 similarly to the decoder 291 of FIG. 20.

It is to be noted that, different from the decoder 291, the decoder 551 performs, when decoding of second layer texture stream is to be performed, a thinning process of a picture in accordance with the priority set by the priority setting section 511 as hereinafter described. Further, the decoder 551 detects a distribution of color information of the decoded picture and supplies a result of the detection to the priority setting section 511 of FIG. 30.

Similarly to the decoder 292 of FIG. 20, the decoder 552 of the decoding section 532 decodes second layer depth streams supplied from the priority setting section 511 to generate depth images of the second layer and accumulates the depth images of the second layer into the buffer 267.

It is to be noted that, different from the decoder 292, the decoder 552 performs, when decoding of a second layer depth stream is to be performed, a thinning process of a picture in accordance with the priority set by the priority setting section 511 as hereinafter described.

(Configuration Example of Low Resolution 3D Model Generation Section)

Figure 32:
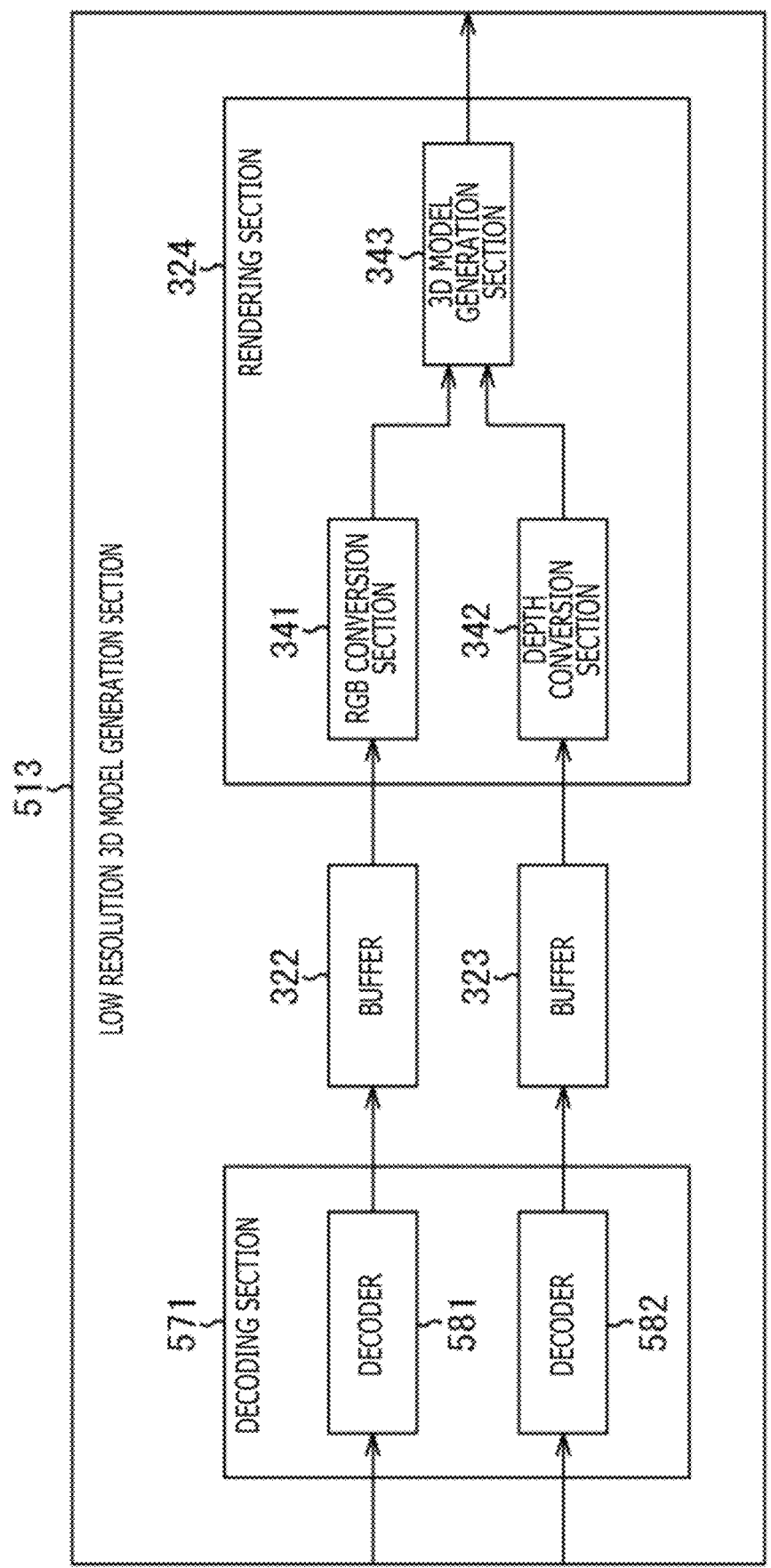
FIG. 32 is a block diagram depicting a configuration example of a second embodiment of the low resolution 3D model generation section.

FIG. 32 is a block diagram depicting a configuration example of the low resolution 3D model generation section 513 of FIG. 31.

The same components as those of FIG. 21 from among components depicted in FIG. 32 are denoted by the same reference signs. Overlapping description is suitably omitted.

The low resolution 3D model generation section 513 of FIG. 32 is configured from a buffer 322, another buffer 323, a rendering section 324 and a decoding section 571. The low resolution 3D model generation section 513 is different in comparison with the low resolution 3D model generation section 242 of FIG. 21 in that the decoding section 571 is provided in place of the decoding section 321. The decoding section 571 is configured from a decoder 581 and another decoder 582.

Similarly to the decoder 331 of FIG. 21, the decoder 581 of the decoding section 571 decodes a low resolution texture stream supplied from the priority setting section 511 to generate low resolution texture images and accumulates the low resolution texture images into the buffer 322.

It is to be noted that, different from the decoder 331, the decoder 581 performs, when decoding of a low resolution texture stream is to be performed, a thinning process of a picture in accordance with the priority set by the priority setting section 511 as hereinafter described.

Similarly to the decoder 332 of FIG. 21, the decoder 582 of the decoding section 571 decodes a low resolution depth stream supplied from the priority setting section 511 to generate low resolution depth images and accumulates the low resolution depth images into the buffers 323.

It is to be noted that, different from the decoder 332, the decoder 582 performs, when decoding of a low resolution depth stream is to be performed, a thinning process of a picture in accordance with the priority set by the priority setting section 511 as hereinafter described.

(Description of Processing of Home Server)

Figure 33:
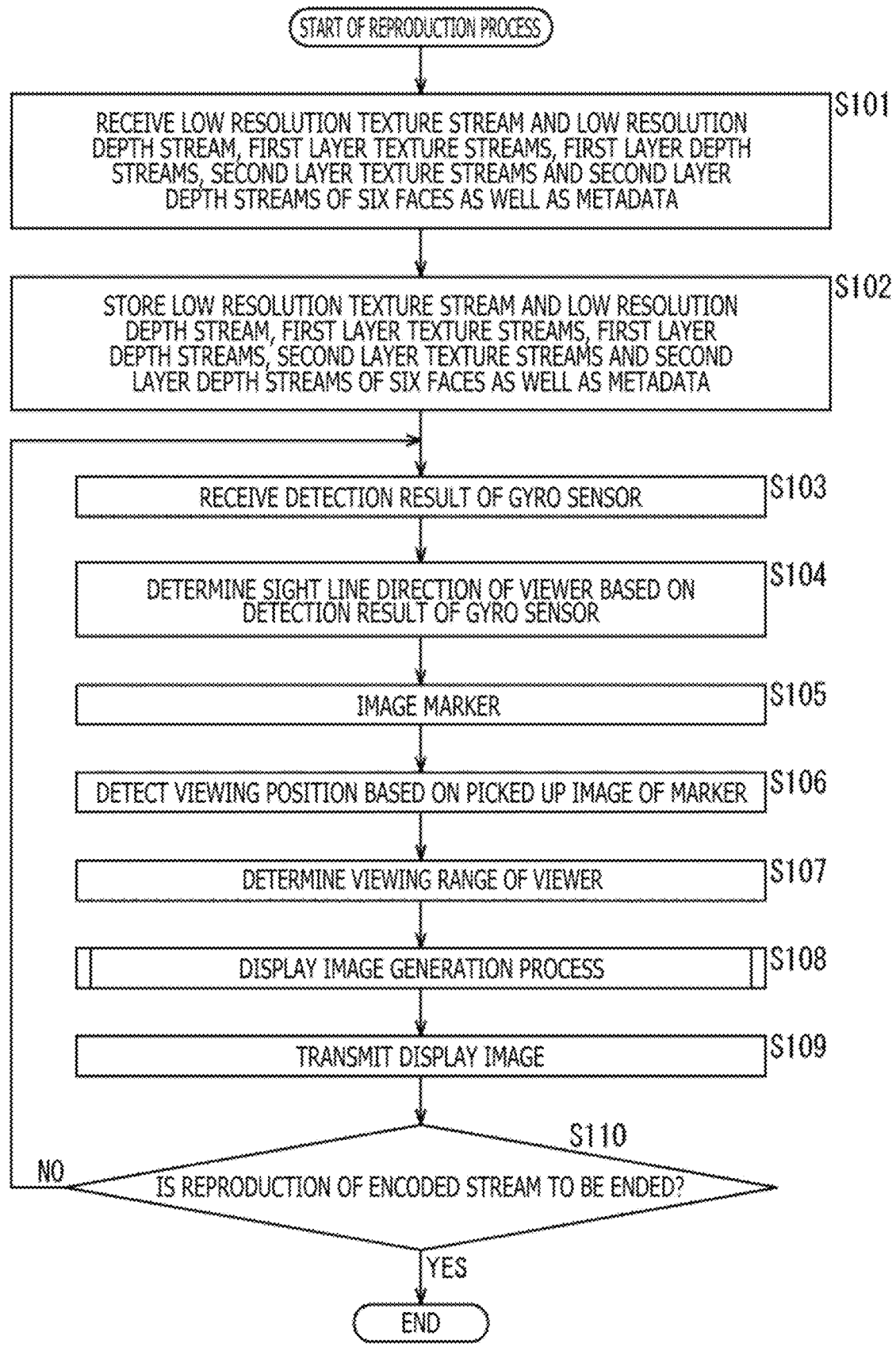
FIG. 33 is a flow chart illustrating a second embodiment of the reproduction process.

FIG. 33 is a flow chart illustrating a reproduction process of the home server 13b of FIG. 30. This reproduction process is started when a low resolution texture stream and a low resolution depth stream, first layer texture streams, first layer depth streams, second layer texture streams and second layer depth streams of six faces and metadata are transmitted, for example, from the content server 12.

At steps S101 to S103, processes similar to those at steps S41 to S43 of FIG. 27 are executed.

At step S104, the sight line detection section 501 determines a sight line direction of the viewer in the 3D model coordinate system on the basis of a detection result of the gyro sensor 15B supplied from the acceptance section 233 similarly as in the process at step S44 of FIG. 27. The sight line detection section 501 supplies the sight line direction of the viewer to the priority setting section 511.

At step S105, the camera 13A images the marker 15A applied to the head mounted display 15 and supplies a picked up image obtained as a result of the imaging to the sight line detection section 234.

At step S106, the sight line detection section 501 detects a viewing position in the 3D model coordinate system on the basis of the picked up image of the marker 15A supplied from the camera 13A and supplies the viewing position to the drawing section 236 and the priority setting section 511.

At step S107, the sight line detection section 501 determines a viewing range of the viewer in the 3D model coordinate system on the basis of the viewing position and the sight line direction in the 3D model coordinate system similarly to the process at step S48 of FIG. 27 and supplies the viewing range to the drawing section 236.

At step S108, the home server 13b performs a display image generation process. Details of the display image generation process are hereinafter described with reference to FIG. 34.

At step S109, the drawing section 236 transmits the display image to the conversion apparatus 14 of FIG. 1 similarly to the process at step S54 of FIG. 27.

At step S110, the priority setting section 511 decides whether or not reproduction of the encoded streams ends. In the case where a non-reproduced encoded stream remains in the storage 232, the priority setting section 511 decides that reproduction of the encoded streams does not end, and the processing returns to step S103.

Thereafter, the processes at steps S103 to S110 are executed repetitively until it is decided at step S110 that reproduction of the encoded streams ends.

On the other hand, in the case where a non-reproduced encoded stream does not remain in the storage 232 at step S110, the priority setting section 511 decides that reproduction of the encoded streams ends, and the reproduction process ends.

Figure 34:
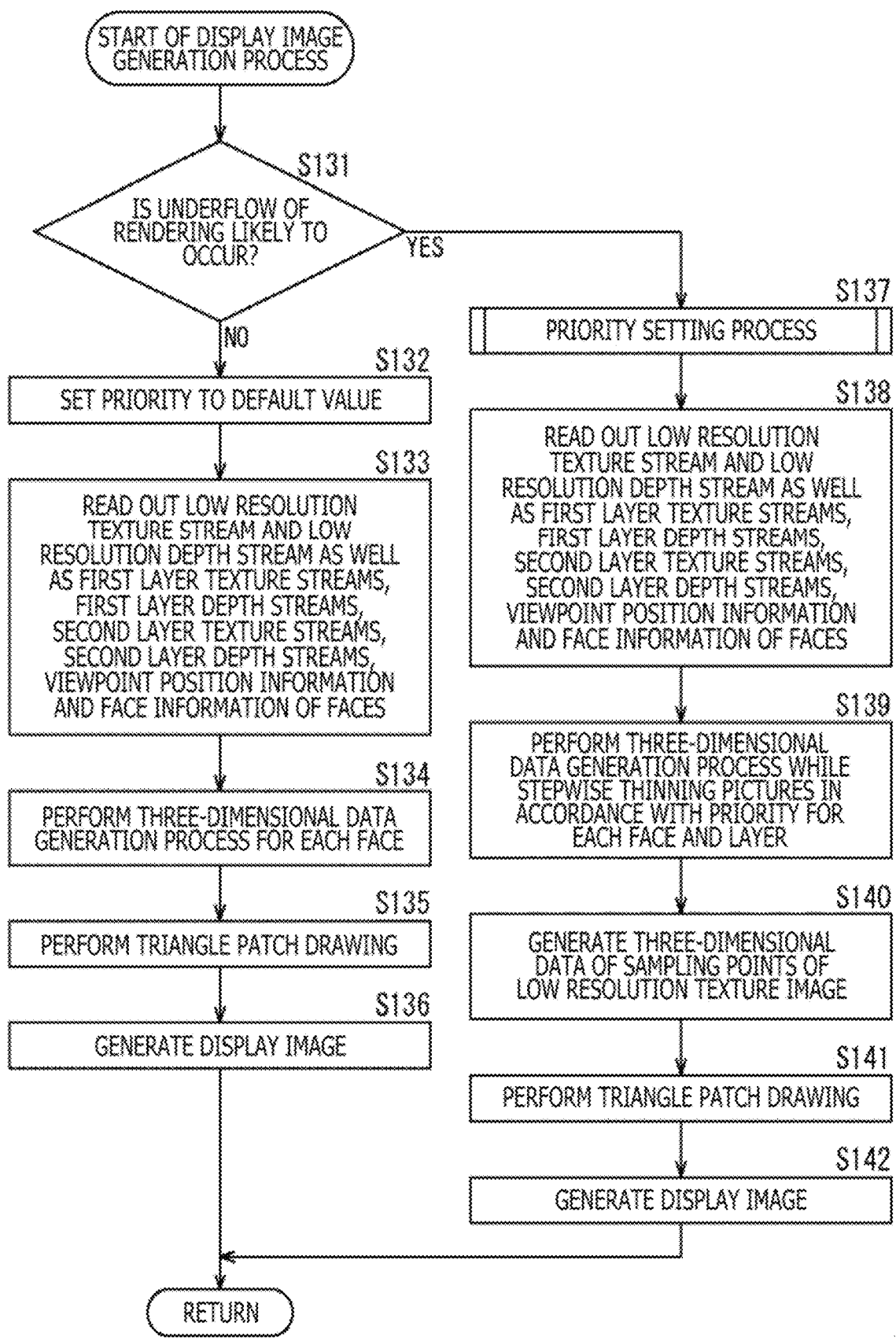
FIG. 34 is a flow chart illustrating details of a display image generation process.

FIG. 34 is a flow chart illustrating details of the display image generation process performed by the home server 13b at step S108 of FIG. 33.

At step S131, the priority setting section 511 decides whether or not underflow of rendering is likely to occur. For example, the priority setting section 511 checks the accumulation amount of the buffer 262, buffer 263, buffer 266 and buffer 267 of each of the ML3D model generation sections 512. In the case where the accumulation amounts of all buffers are equal to or greater than a predetermined threshold value, the priority setting section 511 decides that underflow of rendering is not likely to occur, and the processing advances to step S132. In other words, in the case where decoding of the high resolution encoded streams is performed steadily and occurrence of delay of rendering of the high resolution encoded streams is not predicted, the processing advances to step S132.

At step S132, the priority setting section 511 sets the priority to a default value.

Figure 35:
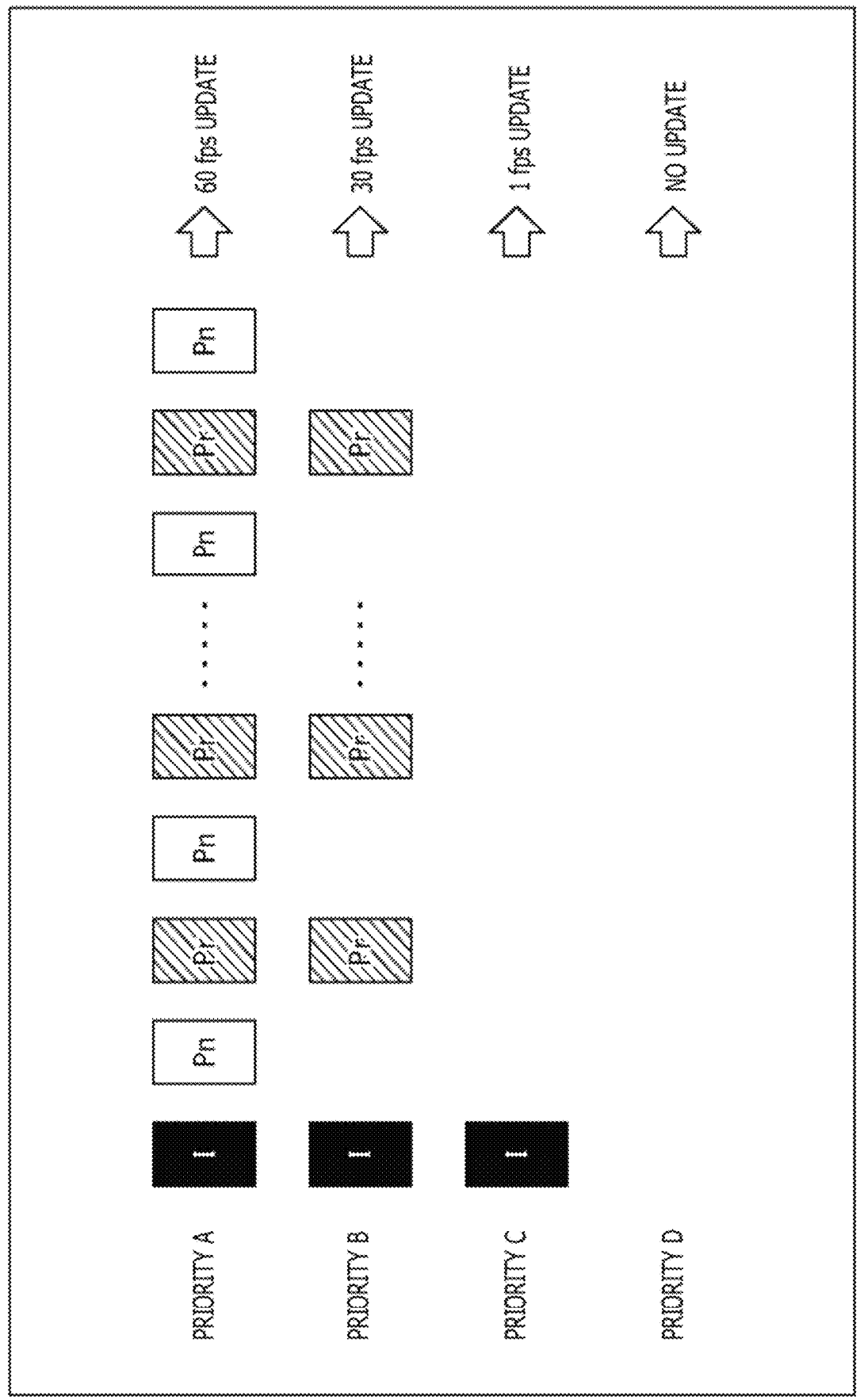
FIG. 35 is a view depicting an example of priorities and a thinning method of pictures.

FIG. 35 depicts an example of priorities and thinning methods of a picture. A rectangle in the figure depicts a picture in each GOP (Group of Picture) of an encoded stream. A picture with a letter I indicated on a black background indicates an I picture that has no dependency with any other picture and is decoded independently. A picture indicated by slanting lines and characters Pr is a reference P picture that is referred to from a different picture from among P pictures that is decoded using inter-frame prediction. A picture indicated by characters Pn on a white background is a non-reference P picture that is not referred to by any other pictures from among P pictures.

For example, for an encoded stream that is set to the highest priority A, picture thinning is not performed. In other words, reproduction of all pictures of the encoded stream is performed. For example, the frame rate of three-dimensional data generated from an encoded stream set to the priority A is 60 fps (frame per second).

In an encoded stream that is set to the second highest priority B, a non-reference P picture in each GOP of the encoded stream is thinned out. In other words, only an I picture and a reference P picture of the encoded stream are reproduced. For example, the frame rate of three-dimensional data generated from an encoded stream set to the priority B is 30 fps.

In an encoded stream that is set to the third highest priority C, a reference P picture and a non-reference P picture in each GOP of the encoded stream are thinned out. In other words, only an I picture of the encoded stream is reproduced. For example, the frame rate of three-dimensional data generated from an encoded stream set to the priority C is 1 fps.

In an encoded stream that is set to the lowest priority D, all pictures in each GOP are thinned out. In other words, reproduction of the encoded stream is not performed, and update of the frame is not performed. Accordingly, any encoded stream set to the priority D is not used for generation of a display image.

In this manner, as the priority decreases, a picture to be thinned out is added in order of a non-reference P picture, a reference P picture and an I picture.

For example, in the case where the priority setting section 511 is to set the priority to the default value, it sets high resolution encoded streams of all faces of all layers to the priority A. In other words, all high resolution encoded streams are reproduced without thinning out of any picture. On the other hand, the priority setting section 511 sets the low resolution encoded stream to the priority D. In other words, reproduction of the low resolution encoded stream is stopped.

The priority setting section 511 supplies the set priorities to the decoder 541, decoder 542, decoder 551 and decoder 552 of the ML3D model generation sections 512 and the decoder 581 and the decoder 582 of the low resolution 3D model generation section 513.

At step S133, the priority setting section 511 reads out the low resolution texture stream and the low resolution depth stream within a period for next reproduction (hereinafter referred to as reproduction target period) from the storage 232 and supplies them to the low resolution 3D model generation section 513. Further, the priority setting section 511 reads out the first layer texture streams, first layer depth streams, second layer texture streams and second layer depth streams corresponding to the faces within the next reproduction target period from the storage 232. The priority setting section 511 supplies the read out first layer texture streams, first layer depth streams, second layer texture streams and second layer depth streams of the faces to the respective corresponding ML3D model generation sections 512. Further, the priority setting section 511 reads out viewpoint position information and face information corresponding to the faces from the storage 232 and supplies them to the drawing section 236.

It is to be noted that the reproduction target period is set in a unit of a predetermined number of GOPs.

At step S134, each ML3D model generation section 512 performs, for each face, a three-dimensional data generation process for generating three-dimensional data of the texture images of the first layer and the second layer similarly to the process at step S50 of FIG. 27. At this time, the ML3D model generation section 512 performs the three-dimensional data generation process without thinning out pictures of the high resolution encoded streams.

It is to be noted that, since the low resolution encoded stream is set to the priority D, a generation process of three-dimensional data for the low resolution texture image is not performed.

At step S135, the drawing section 236 performs, on the basis of the three-dimensional data of the first layer and the second layer supplied from the ML3D model generation sections 512 and the viewpoint position information and the face information supplied from the sight line detection section 234, triangle patch drawing of texture images of the first layer and the second layer in the 3D model coordinate system.

At this time, triangle patch drawing of a low resolution texture image is not performed.

At step S136, a display image is generated similarly as in the process at step S53 of FIG. 27. As described hereinabove, in the case where it is decided that underflow of rendering is not likely to occur, a generation process of three-dimensional data of the low resolution texture image is not performed. Then, a display image is generated using only the three-dimensional data of the texture images of the first layer or the second layer of the high resolution. Accordingly, all regions of the display image within the viewing range of the viewer have the high resolution, and the picture quality is enhanced.

Thereafter, the display image generation process ends.

On the other hand, for example, in the case where the accumulation amount of at least one buffer from among the buffer 262, buffer 263, buffer 266 and buffer 267 of each ML3D model generation section 512 is smaller than a predetermined threshold value at step S131, the priority setting section 511 decides that underflow of rendering is likely to occur, and the processing advances to step S137. In particular, in the case where decoding of at least one high resolution encoded stream is not performed in time and occurrence of delay in rendering of the high resolution encoded stream is predicted, the processing advances to step S137.

At step S137, the priority setting section 511 performs a priority setting process. Although details of the priority setting process are hereinafter described with reference to FIGS. 36 and 37, the priority of the high resolution encoded stream of each of the faces of the layers is set to one of the priorities A to D.

It is to be noted that the priority of the high resolution encoded streams of the face and the layer overlapping with the viewing range of the viewer and the face and the layer that are viewed by the viewer with a high degree of possibility is set high. On the other hand, the priority of the high resolution encoded streams of the face and the layer that are viewed by the viewer with a low degree of possibility is set low. Further, the priority degree of the low resolution encoded stream is set to the highest priority A.

At step S138, a process similar to that at step S133 is performed.

At step S139, each ML3D model generation section 512 generates three-dimensional data while stepwise thinning out in accordance with the priority for each face and each layer. In particular, similarly as in the process at step S50 of FIG. 27, each ML3D model generation section 512 performs, for each face, a three-dimensional data generation process for generating three-dimensional data of texture images of the first layer and the second layer.

At this time, each ML3D model generation section 512 generates three-dimensional data while thinning out a picture in a GOP of each high resolution encoded stream in accordance with the priority set by the priority setting section 511 as described hereinabove with reference to FIG. 35. In particular, the decoder 541, decoder 542, decoder 551 and decoder 552 of each ML3D model generation section 512 skip decoding of a picture of a target for thinning out to thin out the picture. Then, as the priority of the high resolution encoded stream becomes lower, the amount of thinning out of pictures to be decided increases.

It is to be noted that each ML3D model generation section 512 may otherwise thin out a picture of a target of thinning out by skipping rendering of the picture while decoding of all pictures is performed. In particular, the decoder 541, decoder 542, decoder 551 and decoder 552 of each ML3D model generation section 512 carry out decoding of all pictures. Meanwhile, the rendering section 264 and the rendering section 268 of each ML3D model generation section 512 skip rendering of a picture of a target of thinning out to thin out the picture. Then, as the priority of a high resolution encoded stream decreases, the amount of thinning out of pictures to be rendered increases.

At step S140, three-dimensional data of the low resolution texture image is generated and supplied to the drawing section 236 similarly as in the process at step S51 of FIG. 27. At this time, three-dimensional data is generated without thinning out any picture of the low resolution encoded stream.

At step S141, triangle patch drawing is performed similarly as in the process at step S52 of FIG. 27.

At step S142, a display image is generated similarly as in the process at step S53 of FIG. 27. At this time, a display image is generated using the three-dimensional data of the low resolution texture image and three-dimensional data of the high resolution texture images of the faces and the layers set to the priorities A to C.

Here, in the case where underflow of rendering is likely to occur as described hereinabove, the priority of the low resolution encoded stream and the high resolution encoded streams of the faces and the layers overlapping with the viewing range of the viewer as sell as a high resolution encoded stream of a face and a layer that are viewed with a high degree of possibility by the viewer is set high. Accordingly, the ratio of the high resolution region in the viewing range of the viewer becomes high and the update frequency of the high resolution region in the viewing range is maintained high. Further, also in the case where the sight line of the viewer moves unexpectedly, it is possible to present to the viewer whether the image is an image of a high resolution region or an image in a low resolution region whose update frequency is high. Furthermore, the load on the home server 13b is reduced and the delay of reproduction of the encoded streams is suppressed, and the real time property of a display image is guaranteed. As a result, deterioration of the picture quality of the display image within the viewing range of the viewer is suppressed and deterioration of the user experience is suppressed.

Thereafter, the display image generation process ends.

Figure 36:
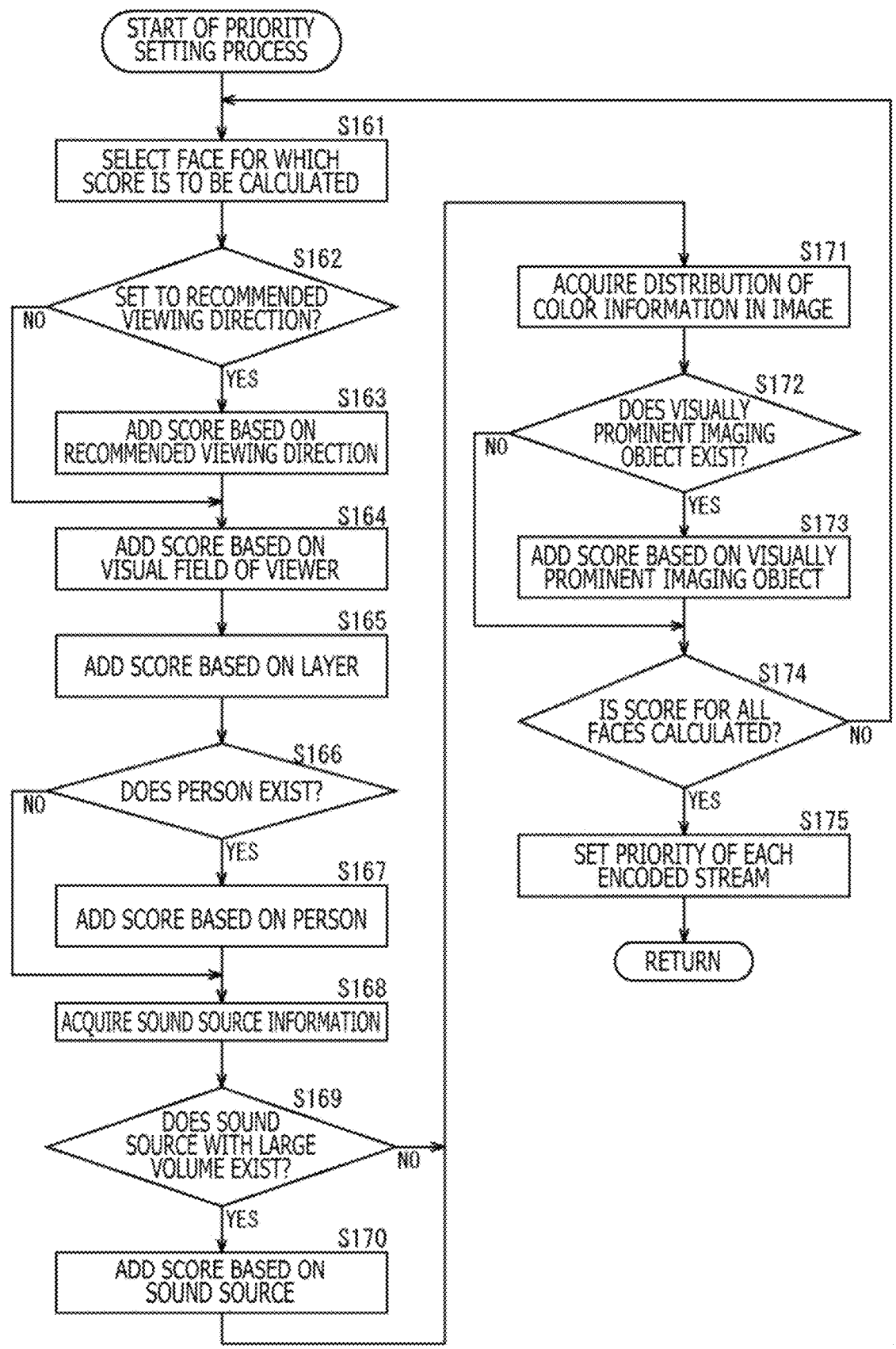
FIG. 36 is a flow chart illustrating details of a priority setting process.

FIG. 36 is a flow chart illustrating details of the priority setting process performed by the priority setting section 511 at step S137 of FIG. 34.

Meanwhile, FIG. 37 depicts an example of a score calculation table that is used for calculation of a score for setting a priority. The score calculation table includes items for an addition factor, a reference value and a weight coefficient. As hereinafter described, the priority setting section 511 performs calculation of a score on the basis of the score calculation table of FIG. 37.

At step S161, the priority setting section 511 selects a face whose score is to be calculated. The priority setting section 511 selects, from among the six faces of the first layer and the six faces of the second layer, one face whose score has not been calculated as yet.

It is to be noted that the face selected by the priority setting section 511 is hereinafter referred to as setting target face.

At step S162, the priority setting section 511 decides, on the basis of the recommended viewing direction information of the metadata stored in the storage 232, whether or not the setting target face is set to the recommended viewing direction. In the case where the setting target face is a face in the recommended viewing direction, the priority setting section 511 decides that the setting target face is set to the recommended viewing direction, and the processing advances to step S163.

At step S163, the priority setting section 511 adds a score based on the recommended viewing direction.

For example, in the score calculation table of FIG. 37, the reference value in the case where the setting target face is set to the recommended viewing direction is set to 1, and the reference value in the case where the setting target face is not set to the recommended viewing direction is set to 0. Further, the weight coefficient is set to 10.

It is to be noted that a value obtained by multiplying the reference value by a weight coefficient is added to the score. Accordingly, in the case where the setting target face is set to the recommended viewing direction, 10 obtained by multiplying 1 that is the reference value by 10 that is the weight coefficient is added to the score. On the other hand, in the case where the setting target face is not set to the recommended viewing direction, the score is not added.

Thereafter, the processing advances to step S164.

On the other hand, in the case where it is decoded at step S162 that the setting target face is not set to the recommended viewing direction, the process at step S163 is skipped, and the processing advances to step S164 while the addition of the score is not performed.

At step S164, the priority setting section 511 adds a score based on the visual field of the viewer. For example, in the case where the sight line extending in the sight line direction from the viewing position of the viewer crosses with the setting target face, the priority setting section 511 decides that the setting target face is the center of the visual field of the viewer. On the other hand, in the case where the setting target face is a face neighboring with a face that crosses with the sight line of the viewer, the priority setting section 511 decides that the setting target face is a periphery of the visual field of the viewer. Furthermore, in the case where the setting target face is not any of a face crossing with the sight line of the viewer and a face neighboring with a face crossing with the sight line, the priority setting section 511 decides that the setting target face is outside of the visual field of the viewer.

For example, in the case where a face including the +Y face 83 of FIG. 8B crosses with the sight line of the viewer, the face including the +Y face 83 is the center of the visual field. A face including one of the +X face 81, −X face 82, +Z face 85 and −Z face 86 becomes a periphery of the visual field. A face including the −Y face 84 is outside the visual field.

On the other hand, in the score calculation table of FIG. 37, the reference value in the case where the setting target face is the center of the visual field is set to 2, the reference value in the case where the setting target face is a visual field periphery is set to 1, and the reference value in the case where the setting target face is outside of the visual field is set to 0. Further, the weight coefficient is set to 5. Accordingly, in the case where the setting target face is the center of the visual field, the score is added by 10. In the case where the setting target face is a periphery of the visual field, the score is added by 5. In the case where the setting target face is outside of the visual field, the score is not added.

At step S165, the priority setting section 511 adds a score based on the layer.

For example, in the score calculation table of FIG. 37, the reference value of the first layer is set to 2 and the reference value of the second layer is set to 1 while the reference value of any other layer is set to 0. Further, the weight coefficient is set to 4. Accordingly, in the case where the layer of the setting target face is the first layer, the score is added by 8. In the case where the layer of the setting target face is the second layer, the score is added by 4. In the case where the layer of the setting target face is any other layer, the score is not added.

It is to be noted that, since, in the present example, the third layer and layers following the third layer are not set, there is no case in which the layer of the setting target face is any other layer.

At step S166, the priority setting section 511 decides whether or not a person exist on the setting target face. For example, the priority setting section 511 detects, on the basis of the face metadata from within the metadata stored in the storage 232, whether or not the face of a person appears in a texture stream of the setting target face within a reproduction target period. In the case where the face of a person appears, the priority setting section 511 decides that a person exists in the setting target face, and the processing advances to step S167.

At step S167, the priority setting section 511 adds a score based on a person.

For example, in the score calculation table of FIG. 37, noticed objects A to C are set as objects that are noticed with a high degree of possibility by the viewer. Among the noticed objects A to C, the noticed object A is a person, and the reference value in the case where a person exists is set to 1 while the reference value in the case where no person exists is set to 0. Further, the weight coefficient is set to 3. Accordingly, in the case where a person exists in the setting target face, the score is added by 3. In the case where no person exists on the setting target face, the score is not added.

In particular, since the possibility that the viewer may see toward a direction in which a person exists is high, the priority of an encoded stream corresponding to the face and the layer in which the person exists is set high.

Thereafter, the processing advances to step S168.

On the other hand, in the case where the face of a person does not appear in the texture stream of the setting target face within the reproduction target period at step S166, the priority setting section 511 decides that a person does not exist on the setting target face. Then, the process at step S167 is skipped, and the processing advances to step S168 while addition of the score is not performed.

At step S168, the priority setting section 511 acquires sound source information. In particular, the priority setting section 511 acquires sound source information of sound to be reproduced in synchronism with a display image a predetermined period before the reproduction target period (for example, one frame before) from a sound processing unit not depicted. The sound source information indicates, for example, a position and a sound volume in a 3D model coordinate system of each sound source.

At step S169, the priority setting section 511 decides whether or not a sound source having a high sound volume exists on the setting target face. For example, the priority setting section 511 extracts a sound source whose sound volume is equal to or higher than a predetermined threshold value on the basis of the acquired sound source information. In the case where the extracted sound source exists in a direction toward the setting target face with reference to the viewing position of the viewer, the priority setting section 511 decides that the sound source having a large sound volume exists on the setting target face, and the processing advances to step S170.

At step S170, the priority setting section 511 adds a score based on the sound source.

For example, in the score calculation table of FIG. 37, a sound source having a large sound volume is set as the noticed object B. Further, the reference value in the case where a sound source having a large sound volume exists is set to 1, and the reference value in the case where a sound source having a large sound volume does not exist is set to 0. Further, the weight coefficient is set to 2. Accordingly, in the case where a sound source having a great sound volume exists on the setting target face, the score is added by 2. In the case where a sound source having a large sound volume does not exist on the setting target face, the score is not added.

In particular, since the possibility that the viewer may see toward a direction in which loud sound is heard is high, the priority of an encoded stream corresponding to a face and a layer on which a sound source of a great sound volume exists is set high.

Thereafter, the processing advances to step S171.

On the other hand, in the case where it is decided at step S169 that a sound source having a large sound volume does not exist on the setting target face, the process at step S170 is skipped, and the processing advances to step S171 while addition of the score is not performed.

At step S171, the priority setting section 511 acquires a distribution of color information in the image. In particular, the priority setting section 511 acquires, from the decoder 541 or the decoder 551 of the ML3D model generation section 512 that performs decoding of a texture stream of the setting target face, a distribution of color information of a picture latest on the time axis from among pixels decoded already of the texture stream of the setting target face.

At step S172, the priority setting section 511 decides whether or not an imaging object that is visually noticeable exists on the setting target face. For example, the priority setting section 511 performs detection of a color region that is characteristic in comparison with a surrounding region in the acquired distribution of color information. It is to be noted that an arbitrary method can be adopted as a detection method of a characteristic color region. Then, in the case where a characteristic color region is detected, the priority setting section 511 decides that an imaging object that is visually noticeable exists on the setting target face, and the processing advances to step S173.

At step S173, the priority setting section 511 adds a score based on the imaging object that is visually noticeable.

For example, in the score calculation table of FIG. 37, a visually noticeable imaging object is set as the noticed object C. Further, the reference value in the case where a visually noticeable imaging object exists is set to 1, and the reference value in the case where a visually noticeable imaging object does not exist is set to 0. Further, the weight coefficient is set to 1. Accordingly, in the case where a visually noticeable imaging object exists on the setting target face, the score is added by 1. In the case where a visually noticeable imaging object does not exist on the setting target face, the score is not added.

In particular, since the possibility that the viewer may see toward a direction in which a visually noticeable imaging object exits is high, the priority of an encoded stream corresponding to a face and a layer on and in which a visually noticeable imaging object exists is set high.

Thereafter, the processing advances to step S174.

On the other hand, in the case where it is decided at step S172 that a visually noticeable imaging object does not exist on the setting target face, the process at step S173 is skipped, and the processing advances to step S174 while addition of the score is not performed.

At step S174, the priority setting section 511 decides whether or not the score is calculated for all faces. In the case where it is decided that the score is not calculated for all faces as yet, the processing advances to step S161.

Thereafter, the processes at steps S161 to S174 are executed repetitively until it is decided at step S174 that the score for all faces is calculated.

On the other hand, in the case where it is decided at step S174 that the score for all faces is calculated, the processing advances to step S175.

At step S175, the priority setting section 511 sets a priority for each encoded stream. For example, the priority setting section 511 sets the priority of the low resolution encoded stream to the priority A. In particular, since the low resolution encoded stream covers all directions including the viewing range of the viewer, the priority is set higher than that for the high resolution encoded streams, and decoding and rendering are performed with a top priority.

Further, the priority setting section 511 arranges 12 different faces including the six faces of the first layer and the six faces of the second layer in the descending order of the score and sets a high resolution encoded stream corresponding to a face having a score included in the top 25% to the priority A. The priority setting section 511 sets a high resolution encoded stream corresponding to a face having a score included in the second top 25% to the priority B. The priority setting section 511 sets a high resolution encoded stream corresponding to a face having a score included in the bottom 50% to the priority D.

Consequently, the priorities of the high resolution encoded stream corresponding to a face and a layer overlapping with a viewing range of the viewer and a high resolution encoded stream corresponding to a face and a layer that may be viewed with a high degree of possibility by the viewer are set high. On the other hand, the priority of a high resolution encoded stream corresponding to a face and a layer that may be viewed with a low degree of possibility by the viewer is set low.

The priority setting section 511 supplies the priorities for the high resolution encoded streams to the decoder 541, decoder 542, decoder 551 and decoder 552 of the respectively corresponding ML3D model generation sections 512. Further, the priority setting section 511 supplies the priority degree for the low resolution encoded stream to the decoder 581 and the decoder 582 of the low resolution 3D model generation section 513.

Thereafter, the priority setting process ends.

Third Embodiment

In a third embodiment, decoding and rendering of encoded streams are performed with priorities applied thereto similarly as in the second embodiment. However, in the third embodiment, generation of a display image is performed using only high resolution encoded streams without using a low resolution encoded stream.

Configuration Example of Third Embodiment of Home Server

FIG. 38 is a block diagram depicting a configuration example of a home server 13c (image processing apparatus) that is the third embodiment of the home server 13 of FIG. 1.

The same components as those of FIG. 30 from among components depicted in FIG. 38 are denoted by the same reference signs. Overlapping description is suitably omitted.

The home server 13c of FIG. 38 is configured from a camera 13A, an acceptance section 231, a storage 232, another acceptance section 233, a drawing section 236, a sight line detection section 501 and a 3D model generation section 601 (image generation section). The home server 13c is different in comparison with the home server 13b of FIG. 30 in that the 3D model generation section 601 is provided in place of the 3D model generation section 502. The 3D model generation section 601 is different in comparison with the 3D model generation section 502 of FIG. 30 in that the low resolution 3D model generation section 513 is not provided.

It is to be noted that a reproduction process of the home server 13c is substantially similar to the reproduction process of the home server 13b described hereinabove with reference to FIGS. 33 to 37.

However, in the 3D model generation section 601 of the home server 13c, only three-dimensional data of texture images of the first layer and the second layer is generated while three-dimensional data of a low resolution texture image is not generated. Accordingly, in comparison with the 3D model generation section 502 of FIG. 30, the 3D model generation section 601 is reduced in load by an amount arising from omission of decoding and rendering of the low resolution encoding stream. Further, the 3D model generation section 601 can increase the processing amount of decoding and rendering of high resolution encoding streams by an amount arising from the reduction of the load.

Therefore, for example, at step S175 of FIG. 36 described hereinabove, 12 different faces are arranged in the descending order of the score and a high resolution encoded stream corresponding to a face having a score included in the top 25% is set to the priority A. A high resolution encoded stream corresponding to a face having a score included in the second top 25% is set to the priority B. A high resolution encoded stream corresponding to a face having a score included in the third top 25% is set to the priority C. A high resolution encoded stream corresponding to a face having a score included in the bottom 25% is set to the priority D. In other words, in comparison with the reproduction process of the home server 13b, the ratio of a high resolution encoding stream set to the priority C increases and the ratio of a high resolution encoding stream set to the priority D decreases.

Then, at step S142 of FIG. 34 described hereinabove, the drawing section 236 generates a display image using only three-dimensional data of the texture images of the first layer and the second layer of the high resolution. At this time, the drawing section 236 generates a display image using also three-dimensional data of high resolution texture images based on the high resolution encoding stream set to the priority D. For example, the drawing section 236 stops update of an image in a region within the display image corresponding to the high resolution encoding stream set to the priority D in an immediately preceding state in which the stream is set to the priority D so as to obtain a still picture.

Consequently, all regions in the display image become a high resolution region and the picture quality is enhanced. Further, the update frequency becomes high in the viewing range of the viewer and the update frequency of a region with regard to which the possibility that the viewer may view is low becomes low. Further, the load on the home server 13c is reduced and the delay in reproduction of the encoding stream is suppressed, and the real time property of the display image is guaranteed. As a result, deterioration of the picture quality of the display image within the viewing range of the viewer is suppressed and reduction of the user experience is suppressed.

It is to be noted that, in the third embodiment, the generation process of a low resolution encoding stream can be omitted in the content server 12.

Fourth Embodiment

Configuration Example of Second Embodiment of Image Displaying System

FIG. 39 is a block diagram depicting a configuration example of a second embodiment of the image displaying system to which the present disclosure is applied.

The same components depicted in FIG. 39 as those of FIG. 1 are denoted by the same reference signs. Overlapping description is suitably omitted.

The image displaying system 700 of FIG. 39 is configured from a multi camera 11, a content server 12, a conversion apparatus 14, a head mounted display 15, a distribution server 701, a network 702, and a reproduction apparatus 703. In the image displaying system 700, for example, only a first layer texture stream, a first layer depth stream, a second layer texture stream and a second layer depth stream of one face corresponding to a sight line from among six faces are distributed to and reproduced by the reproduction apparatus 703.

In particular, the distribution server 701 of the image displaying system 700 receives and stores a low resolution texture stream and a low resolution depth stream, first layer texture streams, first layer depth streams, second layer texture streams and second layer depth streams of six faces, and metadata transmitted thereto from the content server 12.

Further, the distribution server 701 is connected to the reproduction apparatus 703 through the network 702. The distribution server 701 transmits a low resolution texture stream and a low resolution depth stream, a first layer texture stream, a first layer depth stream, a second layer texture stream and a second layer depth stream of one face and metadata stored therein to the reproduction apparatus 703 through the network 702 in response to a request from the reproduction apparatus 703.

It is to be noted that a case is supposed in which transmission of encoded streams from the distribution server 701 to the reproduction apparatus 703 is delayed by such factors as, for example, the processing capacity of the content server 12, the processing capacity of the distribution server 701, the load to or the configuration of the network 702 and so forth. In this case, for example, the distribution server 701 uses such a technology as QoS (Quality of Service) or the like to perform transmission of the encoded streams with priorities added thereto such that the real time system in the reproduction apparatus 703 is secured.

The reproduction apparatus 703 (image processing apparatus) requests the distribution server 701 for a low resolution texture stream, a low resolution depth stream and metadata through the network 702 and accepts a low resolution texture stream, a low resolution depth stream and metadata transmitted thereto in accordance with the request.

Further, the reproduction apparatus 703 has a camera 13A built therein. The reproduction apparatus 703 detects a viewing position in a 3D model coordinate system and determines a sight line direction and a viewing range of the viewer in the 3D model coordinate system similarly to the home server 13a.

Then, the reproduction apparatus 703 determines, on the basis of the viewing position and the sight line direction in the 3D model coordinate system and a table of the first layer included in metadata, one face corresponding to a sight line vector closest the sight line from among the six faces of the first layer as a selection face. The reproduction apparatus 703 requests for a first layer texture stream, a first layer depth stream, a second layer texture stream and a second layer depth stream corresponding to the one selection face through the network 702. The reproduction apparatus 703 receives a first layer texture stream, a first layer depth stream, a second layer texture stream and a second layer depth stream corresponding to the one selection face transmitted thereto in response to the request.

The reproduction apparatus 703 uses the low resolution texture stream and the low resolution depth stream as well as the first layer texture stream, first layer depth stream, second layer texture stream and second layer depth stream corresponding to the one selection face to generate a display image. The process for generating a display image of the reproduction apparatus 703 in this case is similar to the process of the home server 13a except that the number of selection faces is one, and therefore, description of the same is omitted. The reproduction apparatus 703 transmits the display image to the conversion apparatus 14 through an HDMI cable not depicted.

As an alternative, for example, the reproduction apparatus 703 requests the distribution server 701 for a low resolution texture stream and a low resolution depth stream, first layer texture streams, first layer depth streams, second layer texture streams and second layer depth streams of the six faces and metadata through the network 702. The reproduction apparatus 703 receives a low resolution texture stream and a low resolution depth stream, first layer texture streams, first layer depth streams, second layer texture streams and second layer depth streams of the six faces and metadata transmitted thereto in accordance with the request.

The reproduction apparatus 703 generates a display image using the low resolution texture stream and the low resolution depth stream as well as the first layer texture streams, first layer depth streams, second layer texture streams and second layer depth streams of the six faces by a process similar to that of the home server 13b of FIG. 30. Since the process of the reproduction apparatus 703 in this case for generating a display image is similar to the process of the home server 13b, description of it is omitted. The reproduction apparatus 703 transmits the display image to the conversion apparatus 14 through an HDMI cable not depicted.

As another alternative, for example, the reproduction apparatus 703 requests the distribution server 701 for first layer texture streams, first layer depth streams, second layer texture streams and second layer depth streams of the six faces and metadata through the network 702. The reproduction apparatus 703 receives first layer texture streams, first layer depth streams, second layer texture streams and second layer depth streams of the six faces and metadata transmitted thereto in accordance with the request.

The reproduction apparatus 703 generates a display image by a process similar to that of the home server 13c of FIG. 30 using the first layer texture streams, first layer depth streams, second layer texture streams and second layer depth streams of the six faces. Since the process of the reproduction apparatus 703 in this case for generating the display image is similar to the process of the home server 13c, description of it is omitted. The reproduction apparatus 703 transmits the display image to the conversion apparatus 14 through an HDMI cable not depicted.

It is to be noted that, in this case, the generation process of a low resolution encoding stream in the content server 12 can be omitted.

Further, for example, in the case where occurrence of delay in transmission of encoded streams from the distribution server 701 is predicted, the reproduction apparatus 703 may perform decoding and rendering of the encoded streams with priorities applied to them by a process similar to that of the home server 13b or 13c. Then, for example, the reproduction apparatus 703 may request the distribution server 701 for transmission of encoded streams in accordance with the set priorities. Consequently, for example, transmission of an encoded stream set to the priority D is stopped and the transmission amount of encoded streams is suppressed, and consequently, delay of the transmission of the encoded streams is suppressed. As a result, the real time property of the display image is guaranteed and deterioration of the picture quality of the display image can be suppressed.

Fifth Embodiment

Configuration Example of Third Embodiment of Image Displaying System

Figure 40:
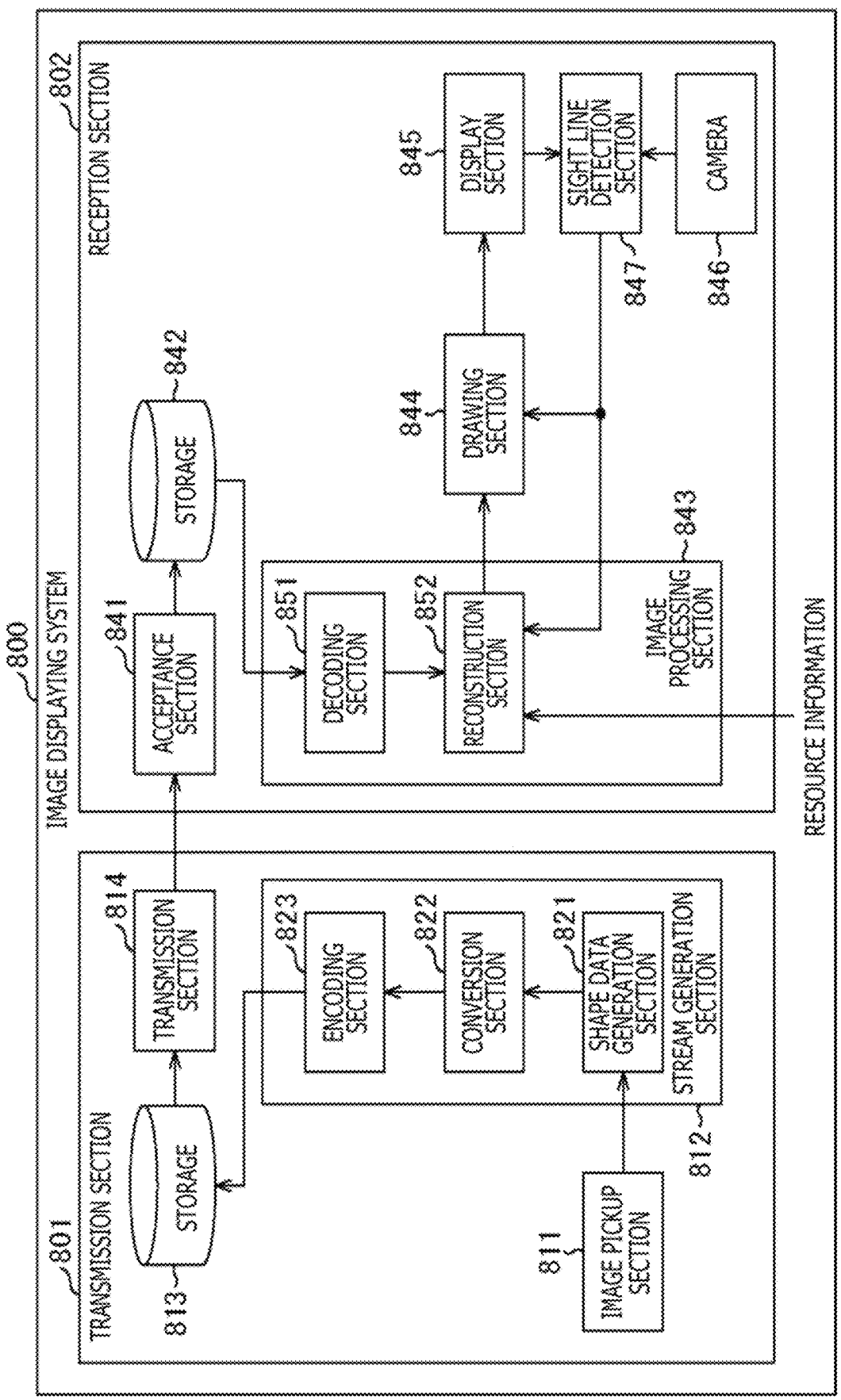
FIG. 40 is a block diagram depicting a configuration example of a third embodiment of the image displaying system.

FIG. 40 is a block diagram depicting a configuration example of a third embodiment of the image displaying system to which the present disclosure is applied.

The image displaying system 800 of FIG. 40 includes a transmission section 801 and a reception section 802. The transmission section 801 includes an image pickup section 811, a stream generation section 812, a storage 813 and a transmission section 814. The stream generation section 812 includes a shape data generation section 821, a conversion section 822 and an encoding section 823. The reception section 802 includes an acceptance section 841, a storage 842, an image processing section 843, a drawing section 844, a display section 845, a camera 846 and a sight line detection section 847. The image processing section 843 includes a decoding section 851 and a reconstruction section 852.

The image pickup section 811 includes a plurality of imaging cameras (not depicted). The imaging cameras are disposed so as to surround the periphery of an object that is a display target in the reception section 802 (hereinafter referred to as display target object), and image the display target object from a plurality of different viewpoints (each hereinafter referred to as imaging viewpoint). The image pickup section 811 generates and supplies a plurality of picked up images that are viewpoint images from a plurality of imaging viewpoints obtained as a result of the imaging and metadata including viewpoint information relating to the imaging viewpoints of the picked up images (hereinafter referred to as imaging viewpoint metadata) to the shape data generation section 821.

Figure 41:
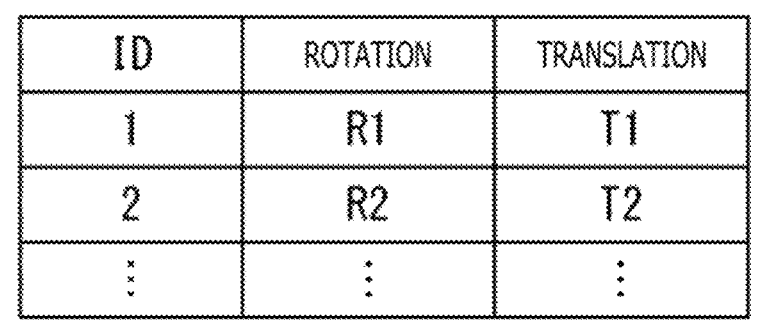

FIG. 41 depicts an example of the imaging viewpoint metadata. The imaging viewpoint metadata includes, for example, an ID for identifying an imaging camera used for imaging of each picked up image and a rotation vector and a translation vector with respect to the world coordinate system of the camera coordinate system of each imaging camera.

The shape data generation section 821 generates high resolution shape data representing a three-dimensional shape of a display target object with a high resolution on the basis of the picked up images at imaging viewpoints. The shape data generation section 821 supplies the picked up images at the imaging viewpoints, high resolution shape data and imaging viewpoint metadata to the conversion section 822.

The conversion section 822 generates a plurality of texture images and a plurality of depth images that are viewpoint images in which the display target object is viewed from a plurality of different viewpoints (hereinafter referred to as transmission viewpoints) on the basis of picked up images at imaging viewpoints, high resolution shape data and imaging viewpoint metadata. It is to be noted that the transmission viewpoints do not necessarily coincide with the imaging viewpoints as hereinafter described.

Further, the conversion section 822 generates metadata including viewpoint information relating to transmission viewpoints of texture images and depth images (hereinafter referred to as transmission viewpoint metadata). Further, the conversion section 822 generates low resolution shape data in which the resolution of high resolution shape data is decreased. The conversion section 822 supplies the texture images at the transmission viewpoints, depth images at the transmission viewpoints, low resolution shape data and transmission viewpoint metadata to the encoding section 823.

It is to be noted that the transmission viewpoint metadata includes, for example, an ID for identifying each texture images and each depth image and a rotation vector and a translation vector with respect to the world coordinate system of the camera coordinate system of virtual cameras corresponding to the transmission viewpoints of the texture images and the depth images.

The encoding section 823 compression encodes texture images for each transmission viewpoint to generates a plurality of texture streams individually corresponding to the transmission viewpoints. Further, the encoding section 823 compression encodes depth images for each transmission viewpoint to generate a plurality of depth streams individually corresponding to the transmission viewpoints. Furthermore, the encoding section 823 performs compression encoding of low resolution shape data to generate a shape stream. The encoding section 823 supplies the texture streams, depth streams, shape stream and transmission viewpoint metadata to the storage 813.

The storage 813 stores texture streams of transmission viewpoints, depth streams of the transmission viewpoints, shape stream and transmission viewpoint metadata supplied from the encoding section 823 therein.

The transmission section 814 reads out and transmits the texture streams of the transmission viewpoints, depth streams of the transmission viewpoints, shape stream and transmission viewpoint metadata from the storage 813 to the reception section 802.

The acceptance section 841 of the reception section 802 receives and supplies texture streams of transmission viewpoints, depth streams of the transmission viewpoint, shape stream and transmission viewpoint metadata transmitted thereto from the transmission section 801 to the storage 842.

The storage 842 stores the texture streams of the transmission viewpoints, depth streams of the transmission viewpoints, shape stream and transmission viewpoint metadata supplied thereto from the acceptance section 841.

The decoding section 851 reads out and decodes texture streams of transmission viewpoints from the storage 842 to generate texture images of the transmission viewpoints. Further, the decoding section 851 reads out and decodes depth streams of the viewpoints from the storage 842 to generate depth images of the transmission viewpoints. Furthermore, the decoding section 851 reads out and decodes the shape stream from the storage 842 to generate low resolution shape data. The decoding section 851 supplies the texture images of the transmission viewpoints, depth images of the transmission viewpoints and low resolution shape data to the reconstruction section 852. Further, the decoding section 851 reads out and supplies the transmission viewpoint metadata from the storage 842 to the reconstruction section 852.

The reconstruction section 852 generates high resolution shape data on the basis of depth images of transmission viewpoints and low resolution shape data. At this time, the reconstruction section 852 generates high resolution shape data while thinning out a depth image as occasion demands on the basis of the transmission viewpoint metadata, virtual viewpoint information supplied from the sight line detection section 847 and resource information supplied from the outside.

Here, the virtual viewpoint is a viewpoint when a display image to be displayed on the display section 845 is generated and is set, for example, on the basis of the viewing position and the sight line direction of the viewer who views the display image using the display section 845. Further, the resource information includes information relating to resources of hardware and software (each hereinafter referred to as reproduction resource) capable of being used for the reproduction process by the image processing section 843 and the drawing section 844. The reconstruction section 852 supplies the high resolution shape data to the drawing section 844.

Further, the reconstruction section 852 thins out a texture image as occasion demands on the basis of the transmission viewpoint metadata, virtual viewpoint information and resource information and supplies remaining (selected) texture images to the drawing section 844. Further, the reconstruction section 852 supplies the transmission viewpoint metadata to the drawing section 844.

The drawing section 844 generates a two-dimensional display image in the case where a display target object is viewed from a virtual viewpoint direction on the basis of the high resolution shape data, texture images of the transmission viewpoints, transmission viewpoint metadata and virtual viewpoint information that is supplied from the sight line detection section 847. The drawing section 844 supplies the display image to the display section 845.

The display section 845 is configured, for example, from a head mounted display unit similar to the head mounted display unit 15 of FIG. 1. The display section 845 performs displaying of a display image supplied from the drawing section 844. Further, the display section 845 detects, for example, a posture of the display section 845 such as an inclination detected by a gyro sensor (not depicted) and supplies posture information indicating the detected posture to the sight line detection section 847.

The camera 846 performs imaging of a marker applied to the display section 845, for example, similarly to the camera 13A of FIG. 1 and supplies the obtained picked up image to the sight line detection section 847.

The sight line detection section 847 sets a virtual viewpoint and a viewing range of the viewer on the basis of posture information from the display section 845 and a picked up image from the camera 846. The sight line detection section 847 generates and supplies virtual viewpoint information including the virtual viewpoint and the viewing range to the reconstruction section 852 and the drawing section 844.

Figure 42:
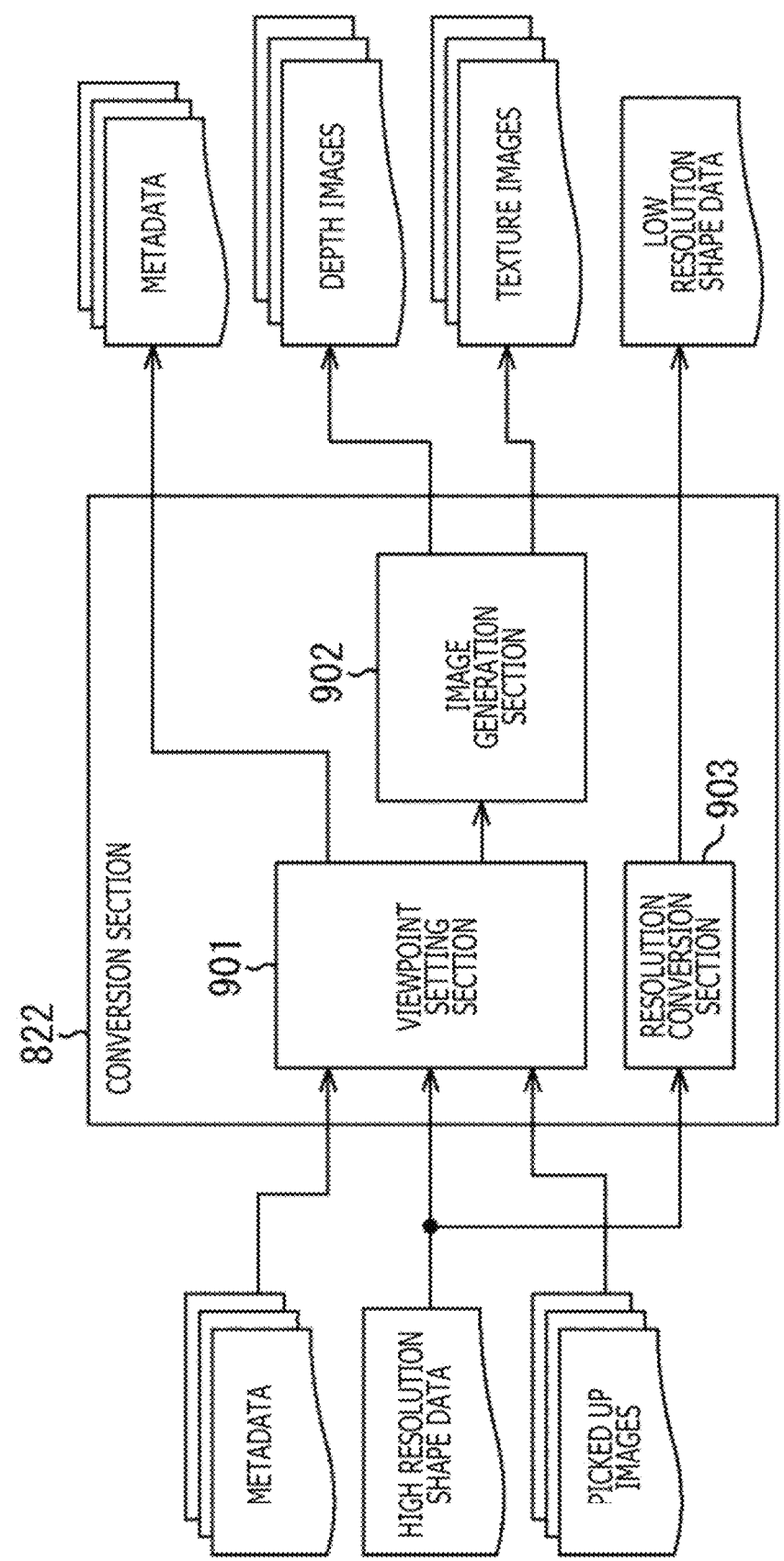
FIG. 42 is a block diagram depicting a configuration example of a conversion section.

FIG. 42 depicts a configuration example of the conversion section 822 of FIG. 40. The conversion section 822 includes a viewpoint setting section 901, an image generation section 902 and a resolution conversion section 903.

The viewpoint setting section 901 acquires picked up images of imaging viewpoints, high resolution shape data and imaging viewpoint metadata from the shape data generation section 821. Further, the viewpoint setting section 901 performs setting of a transmission viewpoint when the texture images and depth images are to be generated and generates transmission viewpoint metadata that includes viewpoint information relating to the set transmission viewpoints. The viewpoint setting section 901 supplies the picked up images at the imaging viewpoints, high resolution shape data, imaging viewpoint metadata and transmission viewpoint metadata to the image generation section 902. Further, the viewpoint setting section 901 supplies the transmission viewpoint metadata to the encoding section 823.

The image generation section 902 generates a plurality of texture images and a plurality of depth images corresponding to transmission viewpoints on the basis of the picked up images at the imaging viewpoints, high resolution shape data and imaging viewpoint metadata. The image generation section 902 supplies the texture images of the transmission viewpoints and the depth images of the transmission viewpoints to the encoding section 823.

The resolution conversion section 903 acquires the high resolution shape data from the shape data generation section 821. The resolution conversion section 903 decreases the resolution of the high resolution shape data to generate low resolution shape data and supplies the low resolution shape data to the encoding section 823.

Figure 43:
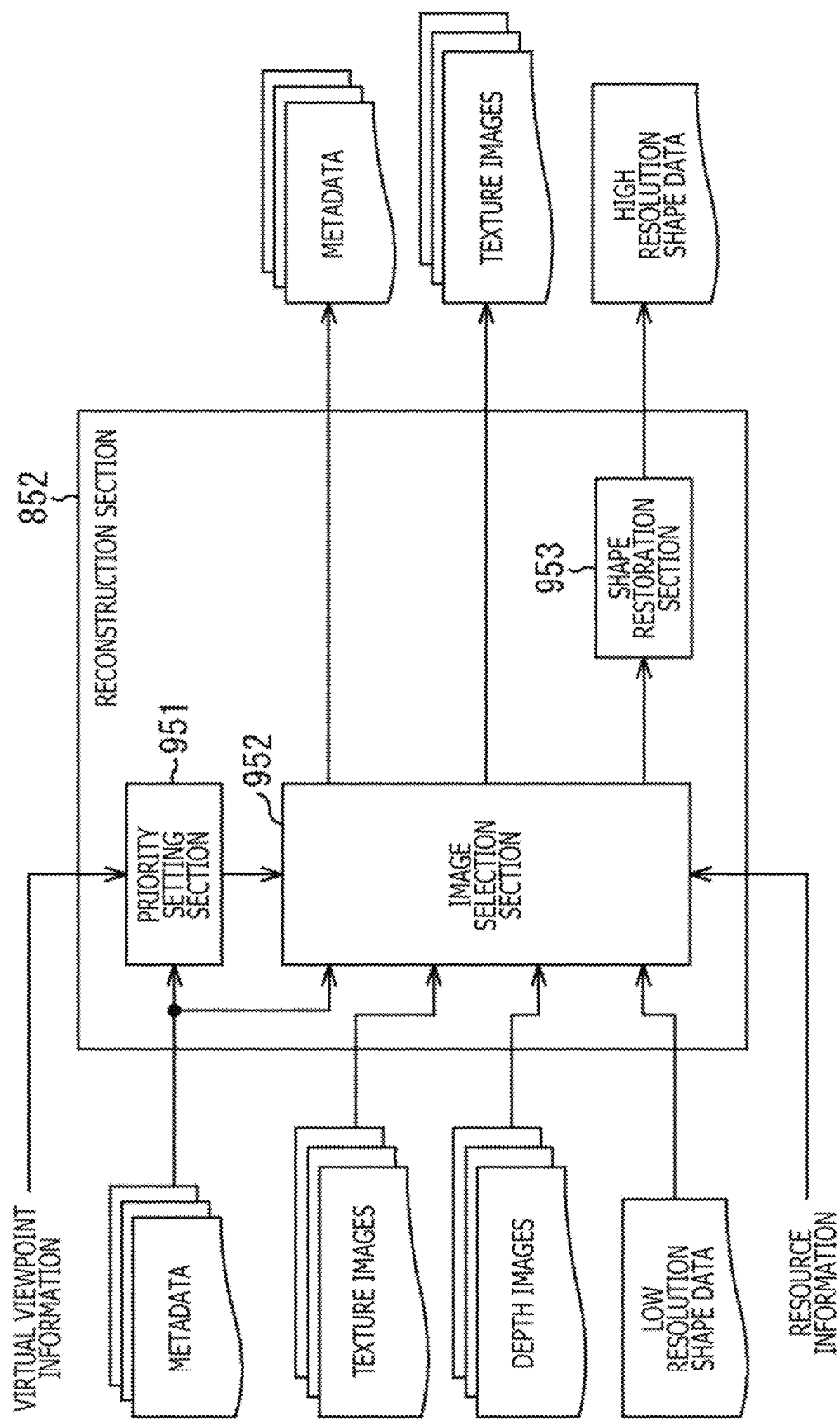
FIG. 43 is a block diagram depicting a configuration example of a reconstruction section.

FIG. 43 depicts a configuration example of the reconstruction section 852 of FIG. 40. The reconstruction section 852 includes a priority setting section 951, an image selection section 952 and a shape restoration section 953.

The priority setting section 951 acquires transmission viewpoint metadata from the decoding section 851 and acquires virtual viewpoint information from the sight line detection section 847. The priority setting section 951 sets priorities between texture streams (texture images) and between depth streams (depth images) on the basis of the transmission viewpoint metadata and the virtual viewpoint information. The priority setting section 951 supplies priority information indicating the set priorities to the image selection section 952.

The image selection section 952 acquires texture images at the transmission viewpoints, depth images at the transmission viewpoints, low resolution shape data and transmission viewpoint metadata from the decoding section 851 and acquires resource information from the outside. The image selection section 952 selects texture images and depth images to be used for generation of a display image on the basis of the priority information and the resource information. The image selection section 952 supplies the selected texture images and the transmission viewpoint metadata to the drawing section 844. Further, the image selection section 952 supplies the selected depth images, low resolution shape data and transmission viewpoint metadata to the shape restoration section 953.

The shape restoration section 953 generates high resolution shape data on the basis of the depth images, low resolution shape data and transmission viewpoint metadata supplied from the image selection section 952. The shape restoration section 953 supplies the high resolution shape data to the drawing section 844.

(Description of Process of Transmission Section 801)

Figure 44:
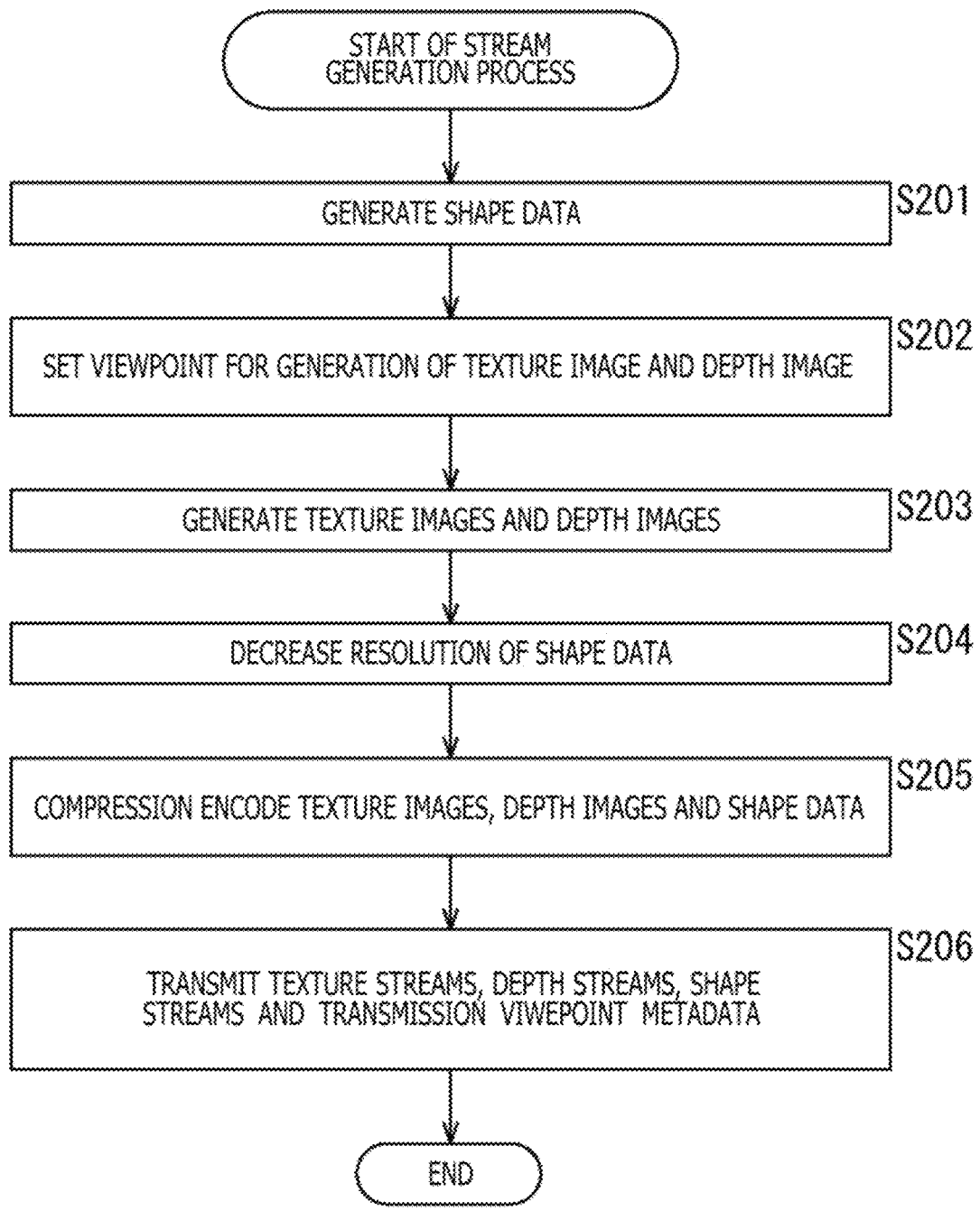
FIG. 44 is a flow chart illustrating a stream generation process.

FIG. 44 is a flow chart illustrating a stream generation process of the transmission section 801 of FIG. 40. The stream generation process is started when the imaging cameras of the image pickup section 811 of FIG. 40 start imaging and outputting of picked up images and imaging viewpoint metadata is started. It is to be noted that picked up images are outputted in a unit of a frame from the imaging cameras.

It is to be noted that, in the following description, a case in which the number of display target objects is one is described to facilitate understandings of the description.

At step S201, the shape data generation section 821 generates shape data. In particular, the shape data generation section 821 generates high resolution shape data representing a three-dimensional shape of a display target object in a high resolution on the basis of picked up images at individual imaging viewpoints and imaging viewpoint metadata supplied from the image pickup section 811. The high resolution shape data is configured, for example, from a three-dimensional polygon mesh or a point cloud. The shape data generation section 821 supplies the picked up images at the imaging viewpoints, high resolution shape data and imaging viewpoint metadata to the viewpoint setting section 901. Further, the shape data generation section 821 supplies the high resolution shape data to the resolution conversion section 903.

At step S202, the viewpoint setting section 901 sets viewpoints (namely, transmission viewpoints) from which texture images and depth images are to be generated. Further, the viewpoint setting section 901 generates transmission viewpoint metadata that includes viewpoint information relating to the set transmission viewpoints.

It is to be noted that, for example, the transmission viewpoints are set on the basis of user setting or the like. Further, the transmission viewpoints may coincide with the imaging viewpoints or may be different from the imaging viewpoints. Furthermore, the number of transmission viewpoints and the number of imaging viewpoints may be equal to each other or may be different from each other. Further, the transmission viewpoints when texture images are generated and the transmission viewpoints when depth images are generated may be equal to each other or may be different from each other. Furthermore, the number of transmission viewpoints when texture images are generated and the number of transmission viewpoints when depth images are generated may be equal to each other or may be different from each other. It is to be noted that normally the transmission viewpoints when texture images are generated and the transmission viewpoints when depth images are generated are common to each other.

The viewpoint setting section 901 supplies the picked up images at the individual imaging viewpoints, high resolution shape data, imaging viewpoint metadata and transmission viewpoint metadata to the image generation section 902. Further, the viewpoint setting section 901 supplies the transmission viewpoint metadata to the encoding section 823.

At step S203, the image generation section 902 generates texture images and depth images. In particular, the image generation section 902 generates, on the basis of the picked up images at the imaging viewpoints and the imaging viewpoint metadata, a plurality of texture images representative of a picture in the case where the display target object is viewed from the transmission viewpoints. It is to be noted that, as the generation method of texture images, an arbitrary method can be adopted. Further, in the case where, for example, the imaging viewpoint of the picked up image and the transmission viewpoint for generating a texture image coincide with each other, also it is possible to use the picked up image as it is as the texture image.

Further, the image generation section 902 generates, for each transmission viewpoint, a plurality of depth images in which the reciprocal of the distance from the transmission viewpoint to a display target object on each pixel is used as a pixel value on the basis of the picked up images at the imaging viewpoints, high resolution shape data and imaging viewpoint metadata. It is to be noted that, as the generation method of a depth image, it is possible to adopt an arbitrary method.

The image generation section 902 supplies the texture images at the transmission viewpoints and the depth images at the transmission viewpoints to the encoding section 823.

At step S204, the resolution conversion section 903 decreases the resolution of the shape data. In particular, the resolution conversion section 903 decreases the resolution of the high resolution shape data to generate low resolution shape data. Consequently, for example, the resolution of the shape data becomes lower than that of the depth images, and the volume of the shape data is reduced. The resolution conversion section 903 supplies the low resolution shape data to the encoding section 823.

At step S205, the encoding section 823 compression encodes the texture images, depth images and shape data. In particular, the encoding section 823 performs compression encoding of the texture images for each transmission viewpoint to generate a plurality of texture streams individually corresponding to the transmission viewpoints. Further, the encoding section 823 performs compression encoding of the depth images for each transmission viewpoint to generate a plurality of depth streams individually corresponding to the transmission viewpoints. Furthermore, the encoding section 823 performs compression encoding of the low resolution shape data to generate a shape stream. The encoding section 823, supplies the texture streams at the transmission viewpoints, depth streams at the transmission viewpoints, shape stream and transmission viewpoint metadata to the storage 813. The storage 813 stores the texture streams at the transmission viewpoints, depth streams at the transmission viewpoints, shape stream and transmission viewpoint metadata therein.

At step S206, the transmission section 814 transmits the texture streams, depth streams, shape stream and transmission viewpoint metadata. In particular, the transmission section 814 reads out the texture streams at the transmission viewpoints, depth streams at the transmission viewpoints, shape stream and transmission viewpoint metadata from the storage 813. Then, the transmission section 814 transmits the texture streams at the transmission viewpoints, depth streams at the transmission viewpoints, shape stream and transmission viewpoint metadata to the reception section 802.

(Description of Process of Reception Section 802)

Figure 45:
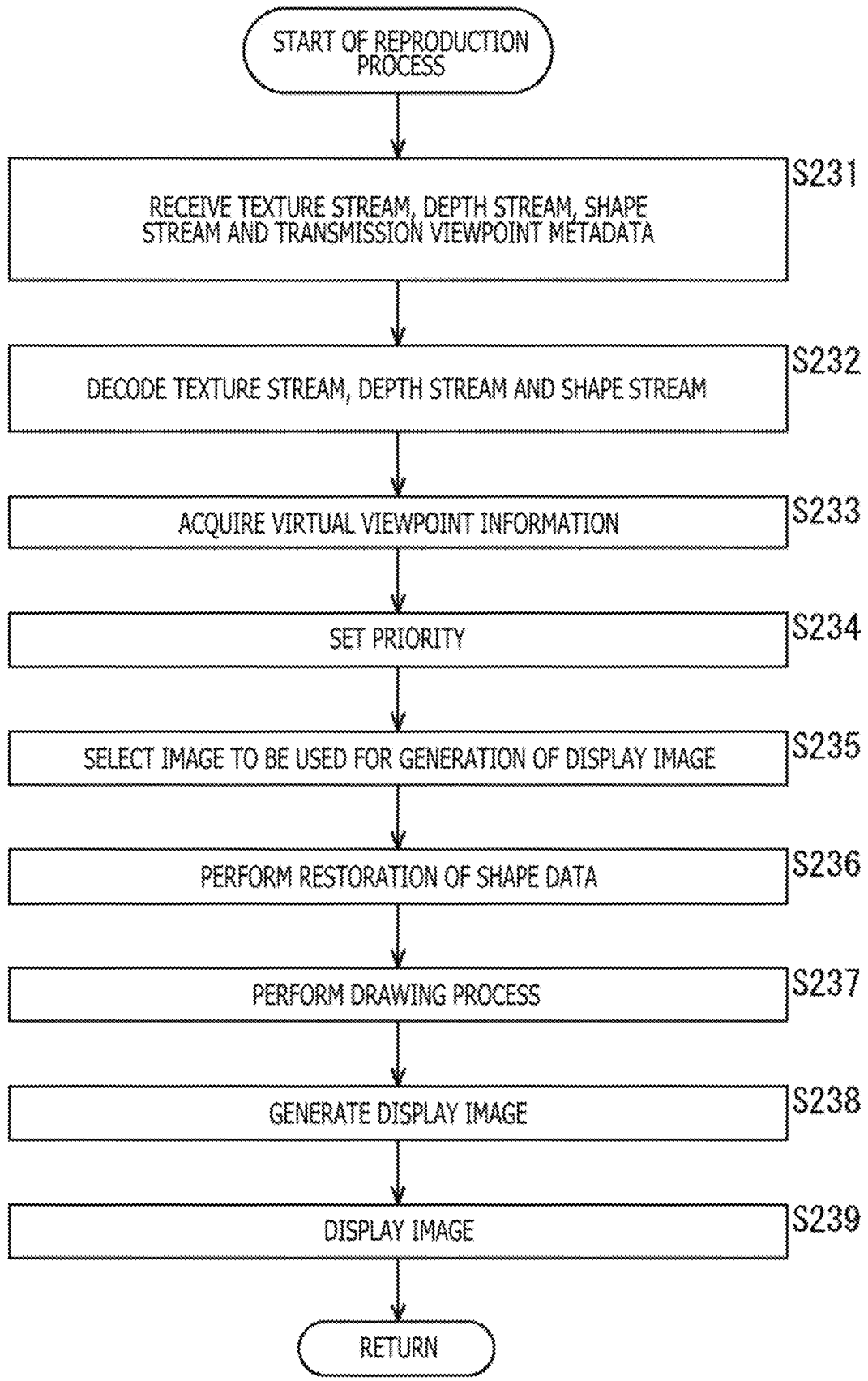
FIG. 45 is a flow chart illustrating a reproduction process.

FIG. 45 is a flow chart illustrating a reproduction process of the reception section 802 of FIG. 40. This reproduction process is started, for example, when texture streams at the transmission viewpoints, depth streams at the transmission viewpoints, shape stream and transmission viewpoint metadata are transmitted thereto from the transmission section 801.

At step S231, the acceptance section 841 accepts the texture streams, depth streams, shape stream and transmission viewpoint metadata. In particular, the acceptance section 841 accepts the texture streams at the transmission viewpoints, depth streams at the transmission viewpoints, shape stream and transmission viewpoint metadata transmitted thereto from the transmission section 801. The acceptance section 841 supplies the texture streams at the transmission viewpoints, depth streams at the transmission viewpoints, shape stream and transmission viewpoint metadata to the storage 842. The storage 842 stores the texture streams at the transmission viewpoints, depth streams at the transmission viewpoints, shape stream and transmission viewpoint metadata therein.

At step S232, the decoding section 851 decodes the texture streams, depth streams and shape stream. In particular, the decoding section 851 reads out the texture streams at the transmission viewpoints, depth streams at the transmission viewpoints, shape stream and transmission viewpoint metadata from the storage 842. The decoding section 851 performs decoding of the texture streams at the transmission viewpoints to generate texture images at the transmission viewpoints. Further, the decoding section 851 performs decoding of the depth streams at the transmission viewpoints to generate depth images at the transmission viewpoints. Furthermore, the decoding section 851 performs decoding of the shape stream to generate low resolution shape data. The decoding section 851 supplies the transmission viewpoint metadata to the priority setting section 951. Further, the decoding section 851 supplies the texture images at the transmission viewpoints, depth images at the transmission viewpoints, low resolution shape data and transmission viewpoint metadata to the image selection section 952.

At step S233, the reception section 802 acquires virtual viewpoint information. In particular, the sight line detection section 847 acquires posture information from the display section 845 and detects a sight line direction of the viewer in the world coordinate system on the basis of the posture information. Further, the sight line detection section 847 acquires a picked up image from the camera 846 and detects a viewing position of the viewer in the world coordinate system on the basis of the picked up image. Then, the sight line detection section 847 sets a virtual viewpoint in the world coordinate system on the basis of the viewing position and the sight line direction of the viewer. The virtual viewpoint almost coincides with the viewpoint of the viewer in the world coordinate system. Further, the sight line detection section 847 sets a viewing range of the viewer on the basis of the viewing position and the sight line direction of the viewer. The sight line detection section 847 generates and supplies virtual viewpoint information including the virtual viewpoint and the viewing range to the priority setting section 951 and the drawing section 844.

At step S234, the priority setting section 951 sets priorities. In particular, the priority setting section 951 sets, on the basis of transmission viewpoint metadata and the virtual viewpoint information, priorities between the texture streams (texture images) and between the depth streams (depth images). For example, the priority setting section 951 sets priorities for texture streams (texture images) in the ascending order of the distance of the transmission viewpoint to the virtual viewpoint. Similarly, the priority setting section 951 sets priorities of depth streams (depth images) in the ascending order of the distance of the transmission viewpoint to the virtual viewpoint.

It is to be noted that, as a reference for measurement of the closeness between a transmission viewpoint and a virtual viewpoint, for example, a Euclidean distance between two viewpoints, an angle in the sight line direction between two viewpoints, a reference that is a composite of the two references or the like is used.

The priority setting section 951 supplies priority information indicative of the set priorities to the image selection section 952.

At step S235, the image selection section 952 selects images to be used for generation of a display image. In particular, the image selection section 952 acquires resource information supplied from the outside. The image selection section 952 sets, on the basis of a reproduction resource indicated by the resource information, a number of texture images (texture streams) to be used for generation of a display image (hereinafter referred to as used image number) and a number of depth images (depth streams) to be used for generation of a display image (used image number).

It is to be noted that, as the reproduction resource becomes great, the used image number increases, and as the reproduction resource becomes small, the used image number decreases. Further, in the case where the reproduction resource is sufficiently great, for example, the used image numbers of texture images and depth images may be set to a value equal to the total number of images such that the texture images and the depth images of all transmission viewpoints are used for a display image.

Then, the image selection section 952 selects the used image number of texture images in the descending order of the priority from among the texture images of the transmission viewpoints. Similarly, the image selection section 952 selects the used image number of depth images in the descending order of the priority from among the depth images of the transmission viewpoints.

Here, a particular example of a selection method of an image is described with reference to FIG. 46.

Figure 46:
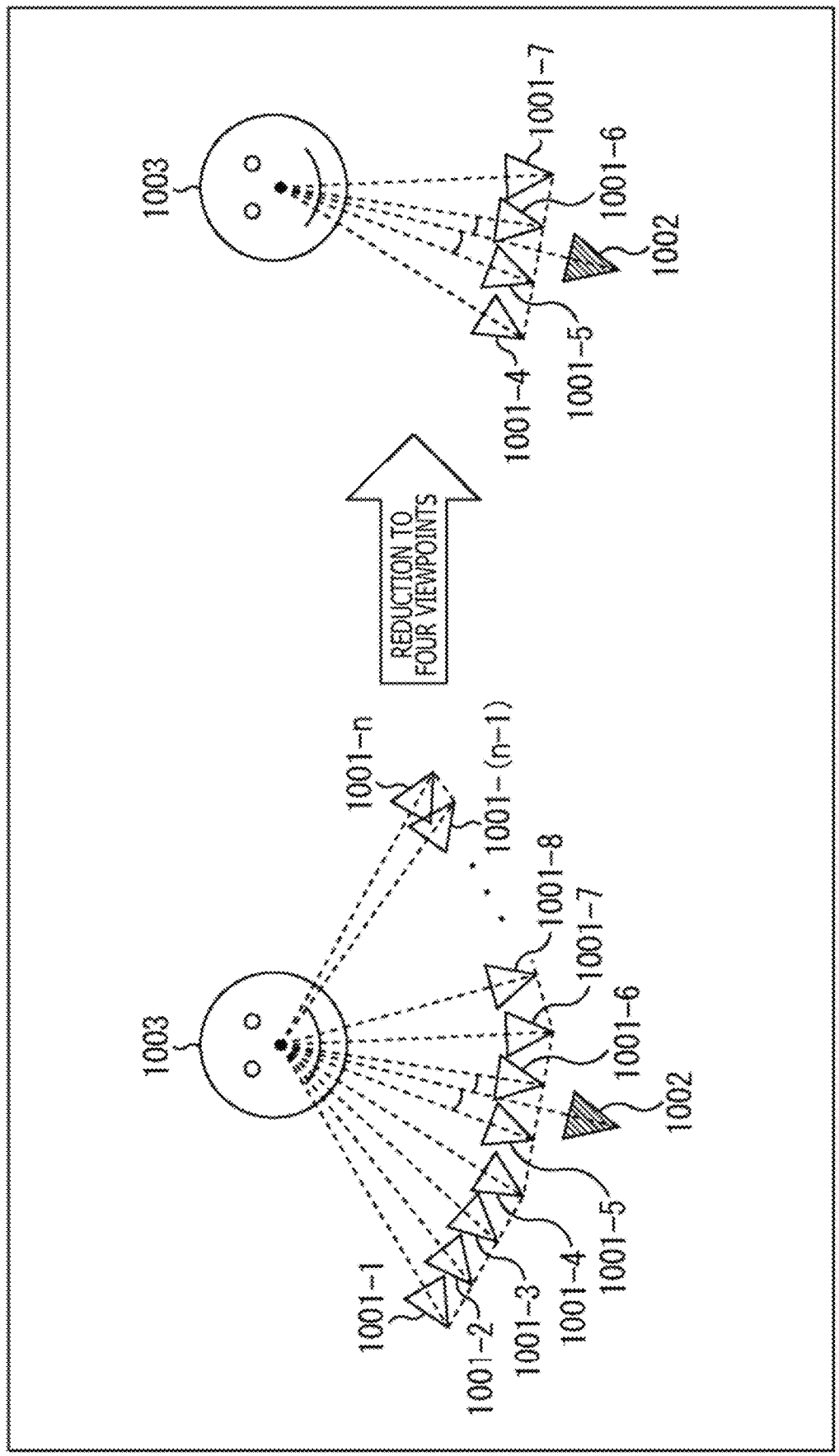
FIG. 46 is a view illustrating a selection method of an image.

Transmission viewpoints 1001-1 to 1001-n of FIG. 46 indicate transmission viewpoints used for generation of depth images of an object 1003 that becomes a display target.

For example, the priority setting section 951 sets priorities between depth streams (depth images) in the ascending order of the distance of the corresponding transmission viewpoints 1001-1 to 1001-n from a virtual viewpoint 1002. Further, for example, in the case where the used image number is set to 4, the image selection section 952 selects depth images generated from depth streams having the first to fourth priorities. For example, as depicted in a view on the right side in FIG. 46, depth images corresponding to four viewpoints of the transmission viewpoint 1001-4, transmission viewpoint 1001-5, transmission viewpoint 1001-6 and transmission viewpoint 1001-7 are selected.

The image selection section 952 supplies the selected texture images and the transmission viewpoint metadata to the drawing section 844. Further, the image selection section 952 supplies the selected depth images, low resolution shape data and transmission viewpoint metadata to the shape restoration section 953.

It is to be noted that the used image number of the texture images and the used image number of the depth images may not necessarily be equal to each other. For example, since generally a person has a discrimination with respect to the color higher than a discrimination with respect to the shape, the used image number of texture images is set greater than the used image number of depth images.

At step S236, the shape restoration section 953 performs restoration of shape data. In particular, the shape restoration section 953 restores high resolution shape data by integrating the low resolution shape data and the depth images selected by the image selection section 952 using the transmission viewpoint metadata.

Here, examples of the integration method of low resolution shape data and a depth image are described with reference to FIGS. 47 to 51. For example, description is given taking a case in which shape data as viewed from the virtual viewpoint 1002 is restored using a depth image in the case where an object 1021 is viewed from a transmission viewpoint 1001 of FIG. 47 as an example.

First, a first integration method is described with reference to FIG. 48.

Figure 47:
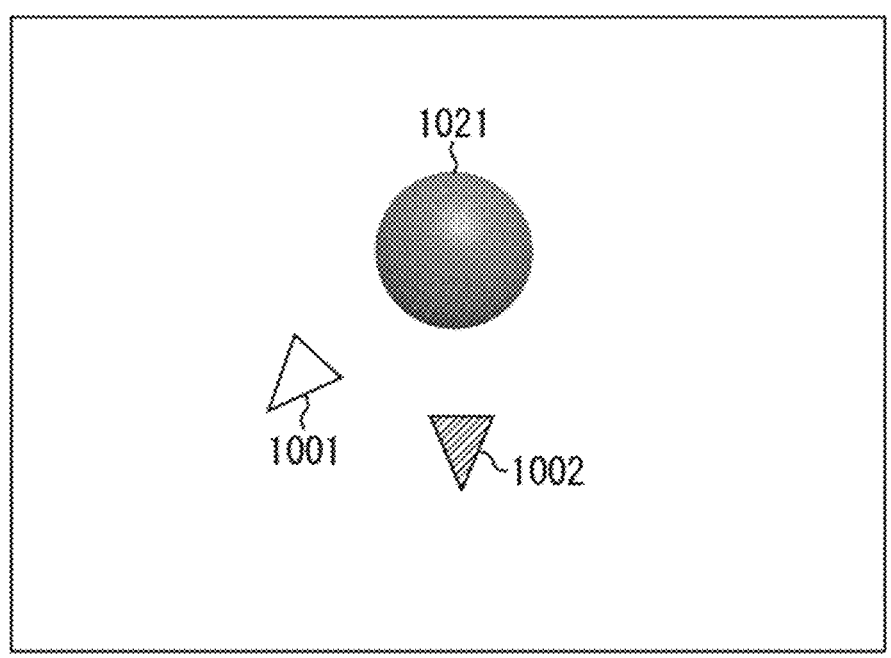
FIG. 47 is a view depicting a relationship between a transmission viewpoint and a virtual viewpoint.
Figure 48:
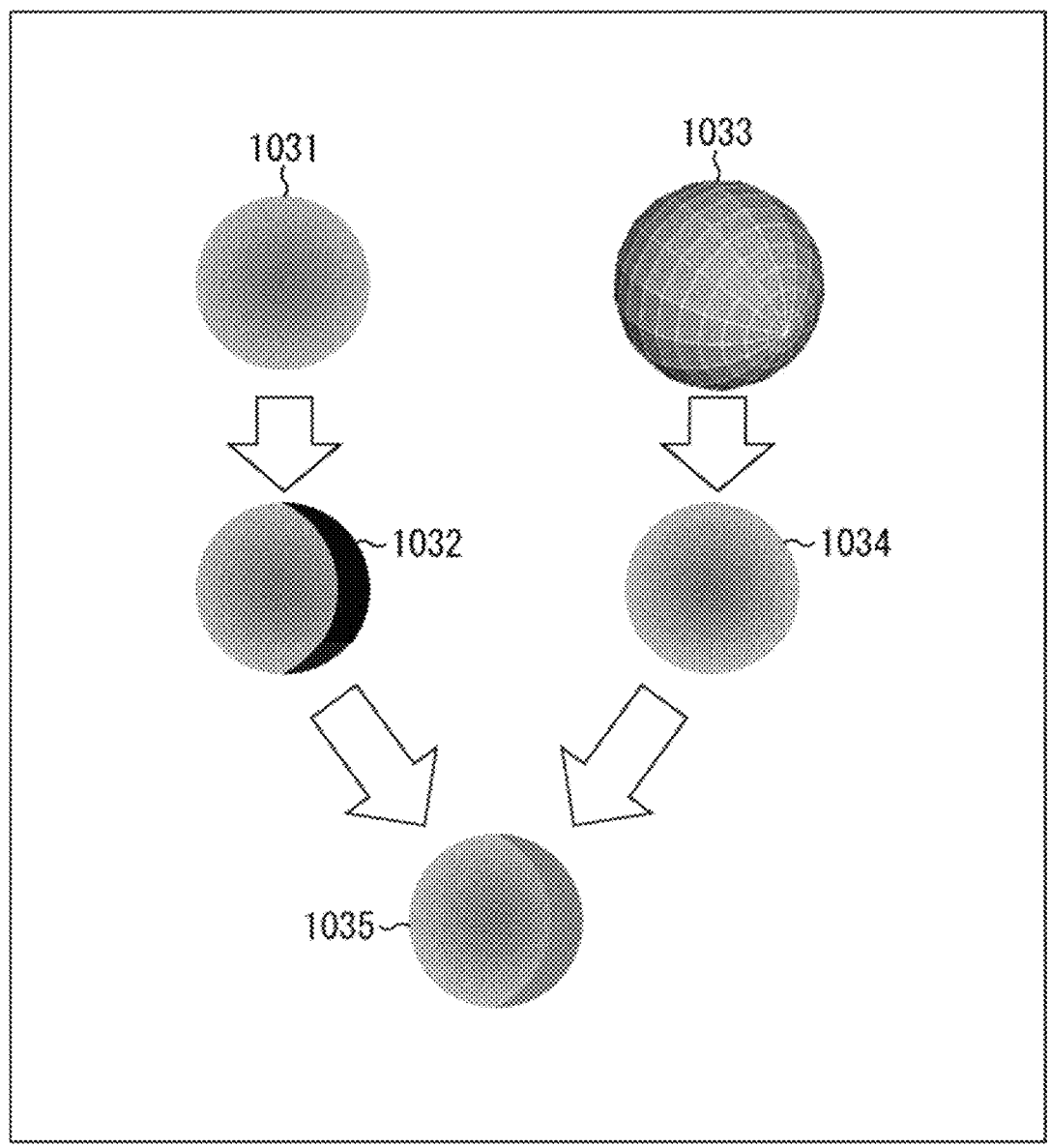
FIG. 48 is a view illustrating a first integration method of low resolution shape data and a depth image.

A depth image 1031 of FIG. 48 is a depth image in the case where the object 1021 is viewed from the transmission viewpoint 1001 of FIG. 47.

Then, by converting the viewpoint for the depth image 1031 from the transmission viewpoint 1001 into the virtual viewpoint 1002, a virtual viewpoint depth image 1032 in the case where the object 1021 is viewed from the virtual viewpoint 1002 is generated. In the virtual viewpoint depth image 1032, for example, a pixel value in a crescent-shaped region on the left side that is a blind spot and cannot be seen (hereinafter referred to as dead region) from the transmission viewpoint 1001 is set to 0.

On the other hand, a virtual viewpoint depth image 1034 in the case where the object 1021 is viewed from the virtual viewpoint 1002 is generated on the basis of low resolution shape data 1033 viewed from the virtual viewpoint 1002. It is to be noted that the virtual viewpoint depth image 1034 is lower in resolution than the depth image 1031 and the virtual viewpoint depth image 1032.

It is to be noted that, in the following, in order to make the difference in resolution clear, the depth image 1031 and the virtual viewpoint depth image 1032 are referred to high resolution depth image 1031 and high resolution virtual viewpoint depth image 1032, respectively, and the virtual viewpoint depth image 1034 is referred to as low resolution virtual viewpoint depth image 1034.

Then, a portion of the high resolution virtual viewpoint depth image 1032 other than the dead region is superimposed on the low resolution virtual viewpoint depth image 1034 to generate a high resolution virtual viewpoint depth image 1035. In the high resolution virtual viewpoint depth image 1035, a region corresponding to the dead region of the high resolution virtual viewpoint depth image 1032 has a low resolution while any other region has a high resolution. Further, a joint between the high resolution region and the low resolution region of the high resolution virtual viewpoint depth image 1035 is a composite of the high resolution virtual viewpoint depth image 1032 and the low resolution virtual viewpoint depth image 1034.

Then, also any other depth image selected by the image selection section 952 is superimposed on the low resolution virtual viewpoint depth image 1034 and high resolution shape data configured from a three-dimensional polygon mesh is generated on the basis of a high resolution virtual viewpoint depth image obtained by the superimposition.

Now, a second integration method is described with reference to FIGS. 49 to 51.

Figure 49:
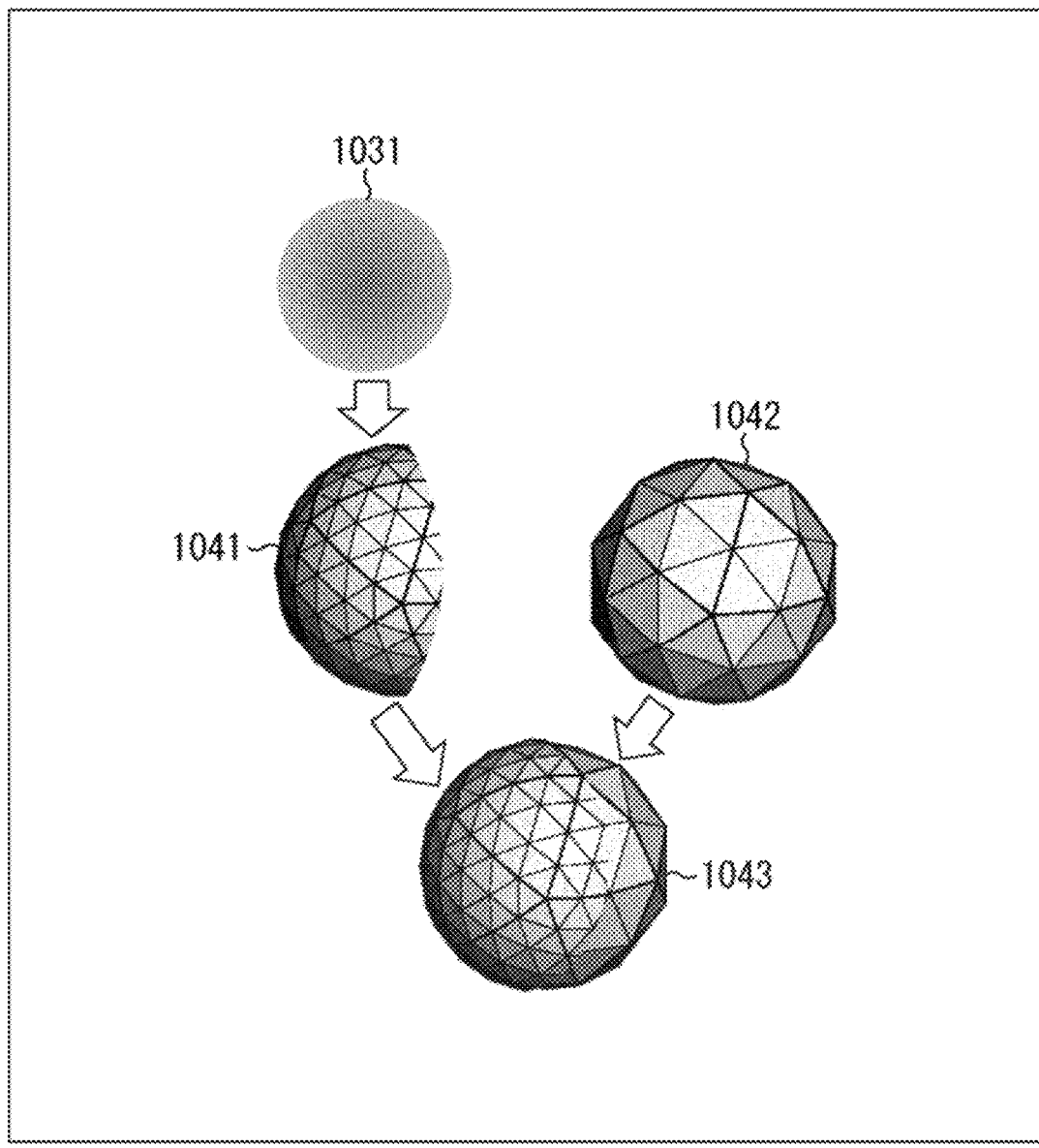
FIG. 49 is a view illustrating a second integration method of low resolution shape data and a depth image.

First, a high resolution polygon mesh 1041 in the case where the object 1021 is viewed from the virtual viewpoint 1002 is generated on the basis of the high resolution depth image 1031 as depicted in FIG. 49.

On the other hand, a low resolution polygon mesh 1042 is low resolution shape data in the case where the object 1021 is viewed from the virtual viewpoint 1002. Then, a high resolution polygon mesh 1043 is generated by synthesizing the high resolution polygon mesh 1041 with the low resolution polygon mesh 1042. Accordingly, in the high resolution polygon mesh 1043, a region corresponding to the high resolution polygon mesh 1041 has a high resolution, and any other region has a low resolution.

Here, an example of a synthesis method of the low resolution polygon mesh 1042 and the high resolution polygon mesh 1041 is described with reference to FIGS. 50 and 51.

Figure 50:
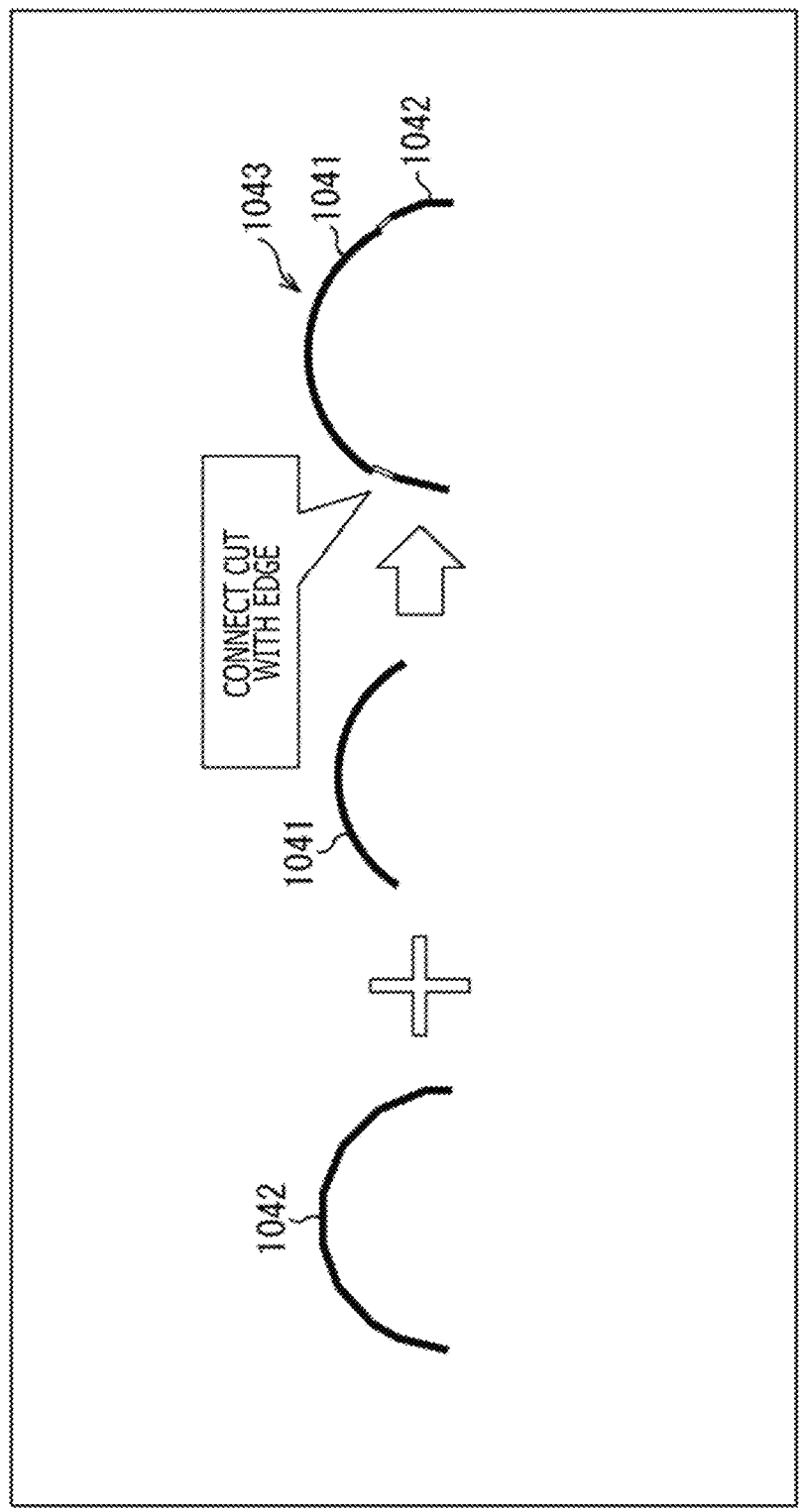
FIG. 50 is a view illustrating a first synthesis method of a low resolution polygon mesh and a high resolution polygon mesh.

In an example of FIG. 50, a region of the low resolution polygon mesh 1042 overlapping with the high resolution polygon mesh 1041 is replaced with the high resolution polygon mesh 1041. At this time, a cut in the proximity of the boundary between the high resolution polygon mesh 1041 and the low resolution polygon mesh 1042 is connected using an edge of a polygon.

Figure 51:
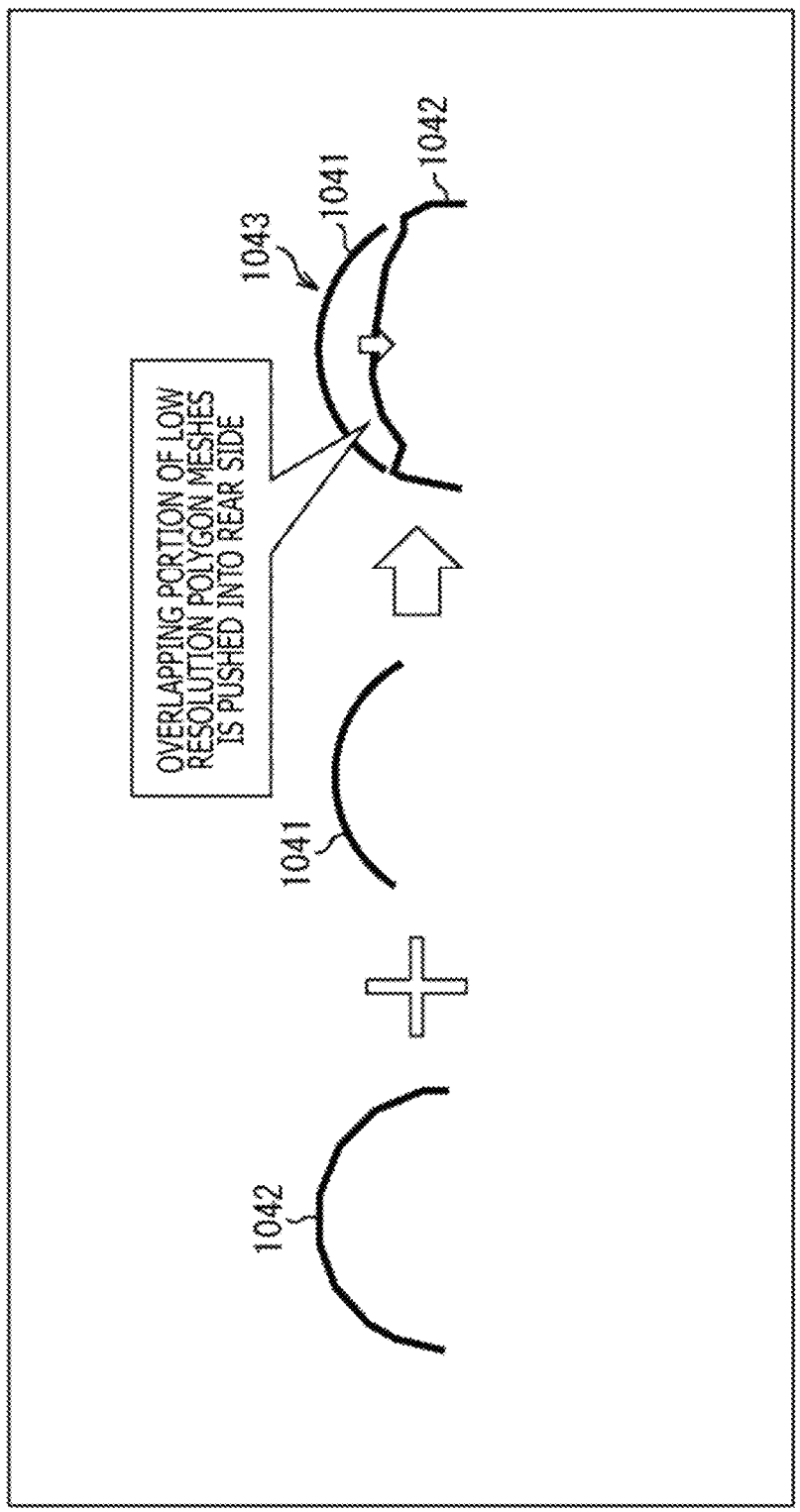
FIG. 51 is a view illustrating a second synthesis method of a low resolution polygon mesh and a high resolution polygon mesh.

In the example of FIG. 51, the high resolution polygon mesh 1041 is superimposed on the low resolution polygon mesh 1042. At this time, a region of the low resolution polygon mesh 1042 overlapping with the high resolution polygon mesh 1041 is inserted to the rear side of the high resolution polygon mesh 1041.

Then, also a high resolution polygon mesh generated on the basis of a different depth image selected by the image selection section 952 is synthesized with the low resolution polygon mesh 1042 to generate high resolution shape data configured from a three-dimensional polygon mesh.

The depth images selected image selection section 952 and the low resolution shape data are integrated to generate high resolution shape data in such a manner as described above.

At this time, as the reproduction resource becomes great and the number of depth images to be used increases, the high resolution region in the high resolution shape data increases. On the other hand, as the reproduction resource becomes small and the depth images to be used decrease, the high resolution region in the high resolution shape data decreases.

Figure 52:
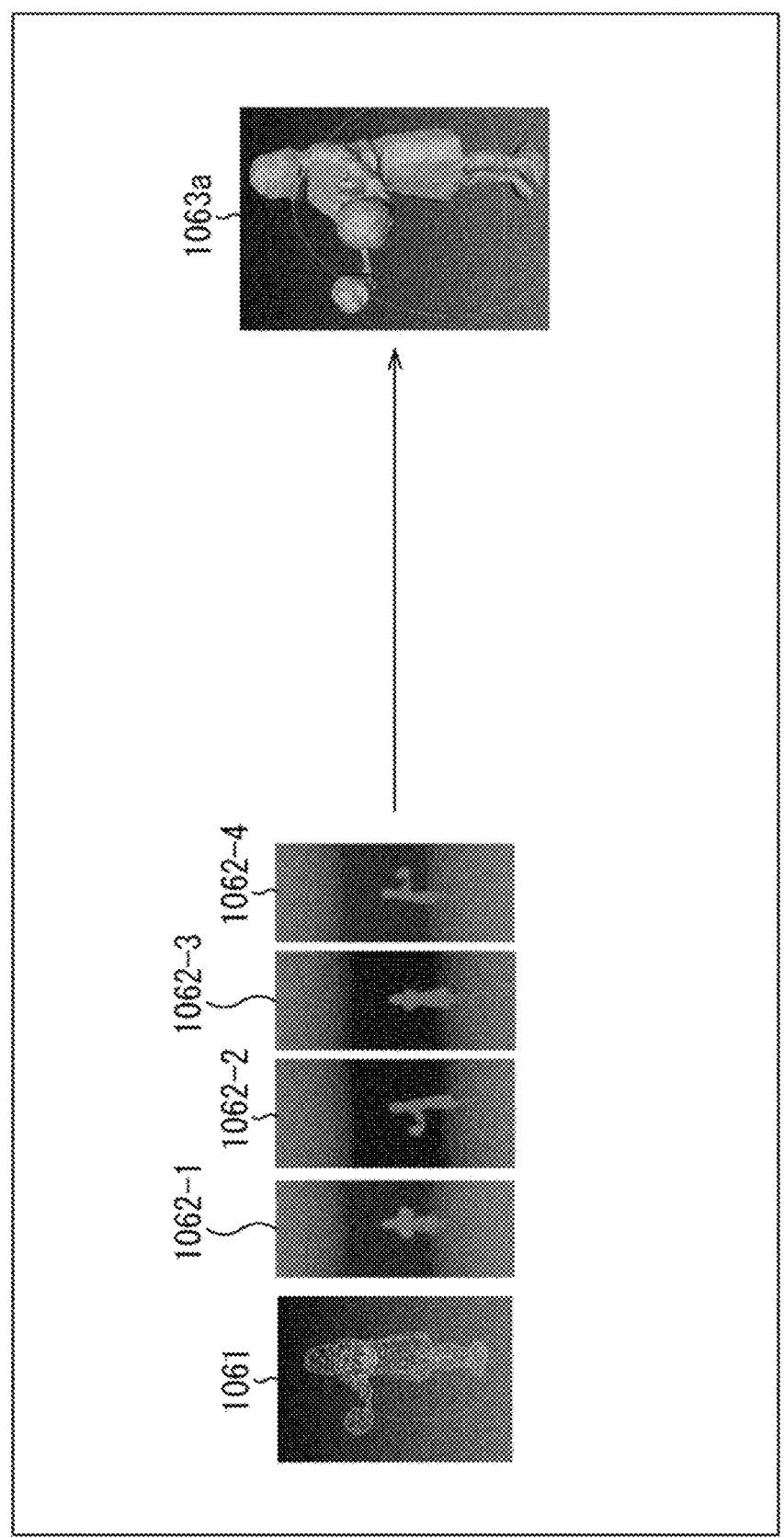
FIG. 52 is a view illustrating an example of a generation method of high resolution shape data in the case where a reproduction resource is great.

For example, FIG. 52 depicts a case in which the reproduction resource is great and high resolution shape data 1063*a* is generated using low resolution shape data 1061 and all depth images 1062-1 to 1062-4 of transmission viewpoints. In this case, the high resolution shape data 1063*a* has a high resolution over a substantially overall periphery thereof, and shape data substantially similar to the high resolution shape data before the resolution is decreased by the resolution conversion section 903 of the reception section 802 is restored.

Figure 53:
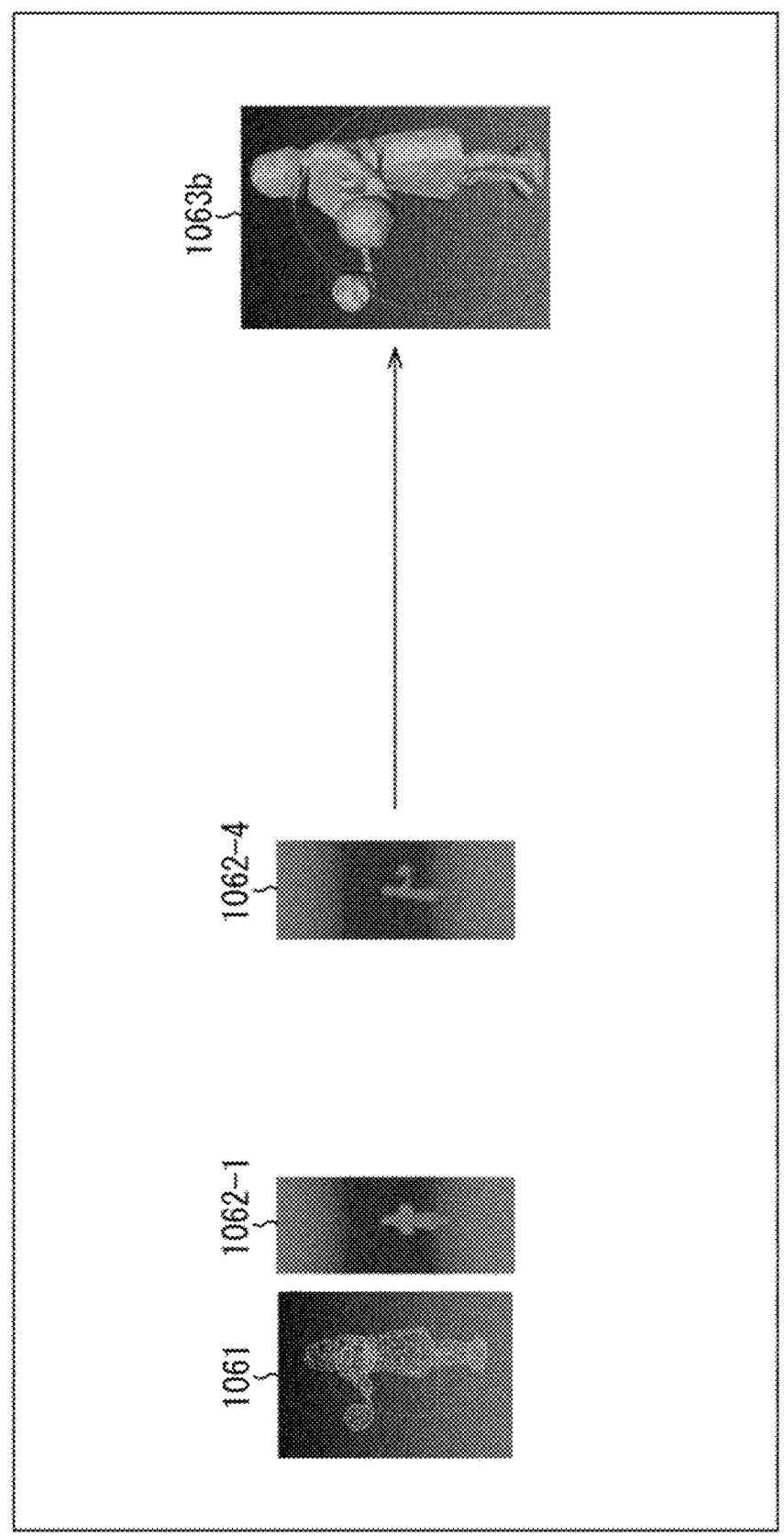
FIG. 53 is a view illustrating an example of a generation method of high resolution shape data in the case where a reproduction resource is small.

On the other hand, FIG. 53 depicts a case in which the reproduction resource is small and high resolution shape data 1063*b* is generated using the low resolution shape data 1061 and only the depth image 1062-1 and the depth image 1062-4 corresponding to transmission viewpoints proximate to the virtual viewpoint. In this case, the high resolution shape data 1063*b* has a high resolution in the proximity to a region that can be seen from the virtual viewpoint and has a low resolution in the other region.

Then, the shape restoration section 953 supplies the generated high resolution shape data to the drawing section 844.

At step S237, the drawing section 844 performs a drawing process. For example, the drawing section 844 adds color information to the high resolution shape data using texture images on the basis of the high resolution shape data and the transmission viewpoint metadata. Then, the drawing section 844 generates a display image by perspectively projecting the high resolution shape data having the color information added thereto from the virtual viewpoint to the viewing range. The drawing section 844 supplies the display image to the display section 845.

At step S238, the display section 845 displays an image based on the display image.

A display image from an arbitrary virtual viewpoint can be generated and displayed on the basis of picked up images imaged by imaging cameras disposed in such a manner as to surround the periphery of a display target object in such a manner as described above.

Further, since texture images and depth images to be used for generation of a display image are suitably thinned on the basis of the virtual viewpoint and the reproduction resource, the load of the reproduction process is reduced. Consequently, even if the amount of the reproduction resource is small, a display image can be displayed smoothly. Further, since a texture image and a depth image in a region that can be seen from the virtual viewpoint are left preferentially, deterioration of the picture quality of an image within a viewing range of the viewer is suppressed.

Furthermore, a depth image is smaller in data amount in comparison with three-dimensional high resolution shape data. Accordingly, by transmitting depth streams at individual transmission viewpoints and a shape stream of the low resolution in place of a shape stream of the high resolution, the transmission amount of data between the transmission section 801 and the reception section 802 can be reduced.

It is to be noted that, while the foregoing description is given of an example of a case in which one display target object is involved, a similar process is performed also in a case in which a plurality of display target objects are involved. In the case where a plurality of display target objects are involved, for example, the transmission section 801 generates texture streams at the transmission viewpoints, depth streams at the transmission viewpoints and a low resolution shape stream for each display target object and transmits the generated streams to the reception section 802.

It is to be noted that one display target object sometimes includes a plurality of real objects from a positional relationship between real objects or the like. For example, in the case where a person sits on a chair, the person and the chair are included in one display target object.

<Modifications>

In the following, modifications to the embodiments of the present disclosure described hereinabove are described.

Figure 54A:
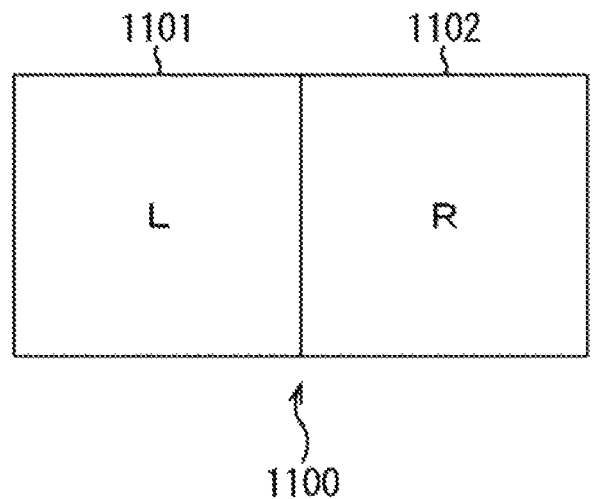
FIGS. 54A and 54B are views depicting a different example of a texture image of a first layer.
Figure 54B:
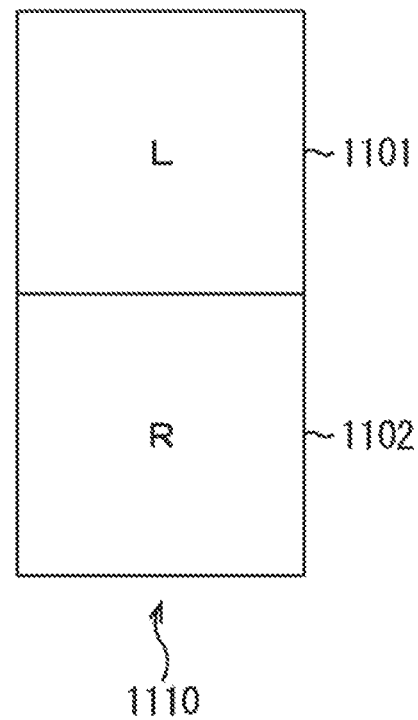

FIGS. 54A and 54B are views depicting a different example of a texture image of the first layer.

While, in the foregoing description, the texture image of each face of the first layer is a texture image of one viewpoint O, it may be a composite image of texture images of a viewpoint for the left eye and a viewpoint for the right eye corresponding to the viewpoint O.

In particular, the texture image of each face of the first layer may be, as depicted in FIG. 54A, for example, a packing image 1100 obtained by packing a texture image 1101 of each face of the first layer of a viewpoint for the left eye corresponding to the viewpoint O and a texture image 1102 of each face of the first layer of the viewpoint for the right eye in the transverse direction (horizontal direction).

Further, as depicted in FIG. 54B, a texture image of each face of the first layer may be, for example, a packing image 1110 obtained by packing a texture image 1101 and a texture image 1102 in a vertical direction (vertical direction).

Similarly, a texture image of each face of the second layer may be, for example, a packing image obtained by packing a texture image of the second layer of a viewpoint for the left eye corresponding to one viewpoint of the second layer on the face and a texture image of the second layer of a viewpoint for the right eye in a transverse direction or a vertical direction.

As described above, in the case where a texture image of each of the faces of the first layer and the second layer is a texture image obtained by packing images of a viewpoint for the left eye and a viewpoint for the right eye, a texture image obtained as a result of decoding is separated into a texture image of a viewpoint for the left eye and a texture image of a viewpoint for the right eye. Then, three-dimensional data for the left eye and three-dimensional data for the right eye are generated in regard to the first layer and the second layer.

Then, a display image for the left eye is generated from the three-dimensional data for the left eye on the basis of the viewing direction and the viewing position of the left eye corresponding to the viewing direction and the viewing position of the viewer. Further, a display image for the right eye is generated from the three-dimensional data for the right eye on the basis of the viewing direction and the viewing position of the right eye corresponding to the viewing direction and the viewing position of the viewer. Then, in the case where the head mounted display 15 can perform 3D display, the head mounted display 15 displays the display image for the left eye as an image for the left eye and displays the display image for the right eye as an image for the right eye to 3D display the display image.

It is to be noted that, while, in the first to fourth embodiments, picked up images are mapped to a regular octahedron to generate an omnidirectional image, the 3D model to which picked up images are to be mapped can be, in addition to a regular octahedron, a sphere, a cube or the like. In the case where picked up images are mapped to a sphere, the omnidirectional image is an image, for example, according to a positive pyramid projection of a sphere to which picked up images are mapped.

Further, although, in the first to the fourth embodiments, a texture image and a depth image are generated by perspectively projecting an omnidirectional image to six faces configuring a cube, a texture image and a depth image may otherwise be generated by perspectively projecting an omnidirectional image to faces of a different shape other than a cube.

Further, a low resolution texture stream and a low resolution depth stream may not be generated. Depth images of the first layer and the second layer may not be generated. Further, a texture image and a depth image of the second layer may be generated only on part of faces to which a picked up image of a significant imaging object is mapped.

Furthermore, also low resolution texture images and low resolution depth images may be generated in a hierarchized state similarly to texture images and depth images of a high resolution.

Further, the layer number of texture images and depth images may be three or more. For example, texture images and depth images of the third layer and succeeding layers may be generated by perspectively projecting an omnidirectional image from viewpoints different from those of the first layer and the second layer.

Further, images of layers may be generated such that there is no dependency relationship between the layers. For example, images corresponding to the six faces configuring a cube centered at the viewpoint of the omnidirectional image may be generated in a hierarchized relationship for each of a plurality of distances from individual viewpoints. For example, in the case where the omnidirectional image is to be mapped to a predetermined face, images of a plurality of layers corresponding to the face may be generated including images in which all imaging objects from a viewpoint are mapped, images in which only imaging objects whose distance from the viewpoint is equal to or greater than a first distance are mapped, images in which only imaging objects whose distance from the viewpoint is equal to or greater than a second distance (>first distance) are mapped, . . . .

Figure 55:
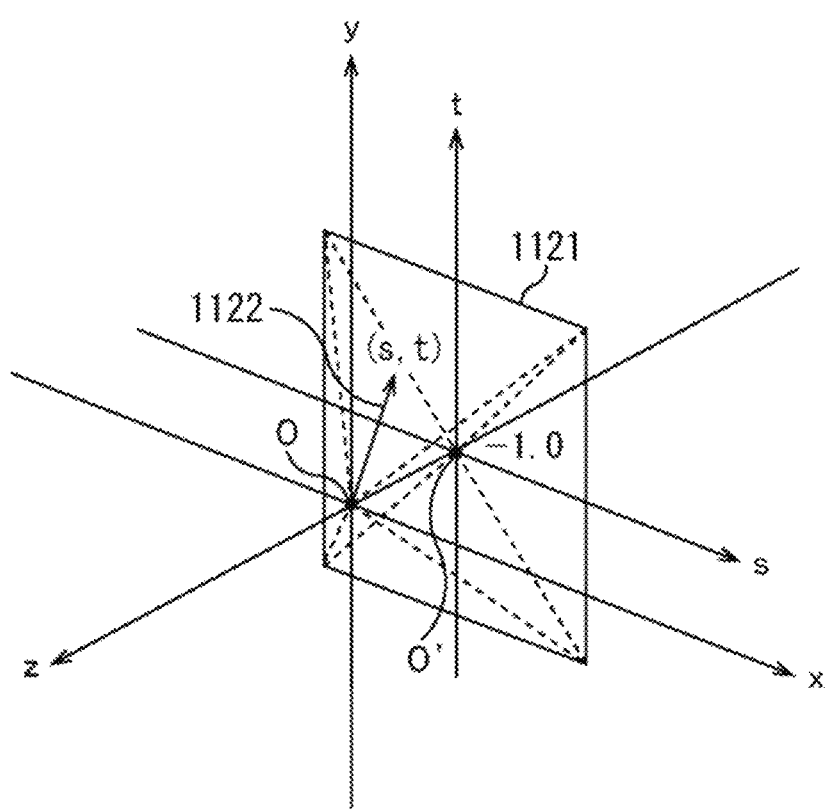
FIG. 55 is a view illustrating a coordinate system of a projection plane.

Further, while the foregoing description indicates an example in which perspective projection is used for generation of a two-dimensional image such as a display image or the like, a projection method other than the perspective projection may be used. For example, tan axis projection depicts in FIGS. 55 and 56 can be used.

In this example, a projection plane 1121 whose z is −1.0 is set in a three-dimensional xyz coordinate system of a 3D model. In this case, a two-dimensional st coordinate system in which the center O' of the projection plane 1121 is the origin and the horizontal direction of the projection plane 1121 is the s direction while the vertical direction is the t direction is the coordinate system of the projection plane 1121.

It is to be noted that a vector 1122 heading from the origin O of the xyz coordinate system to the coordinates (x, t) of the st coordinate system is referred to as vector (s, t, −1.0) using the coordinates (s, t) and −1.0 that is the distance from the origin O to the projection plane 1121.

Figure 56:
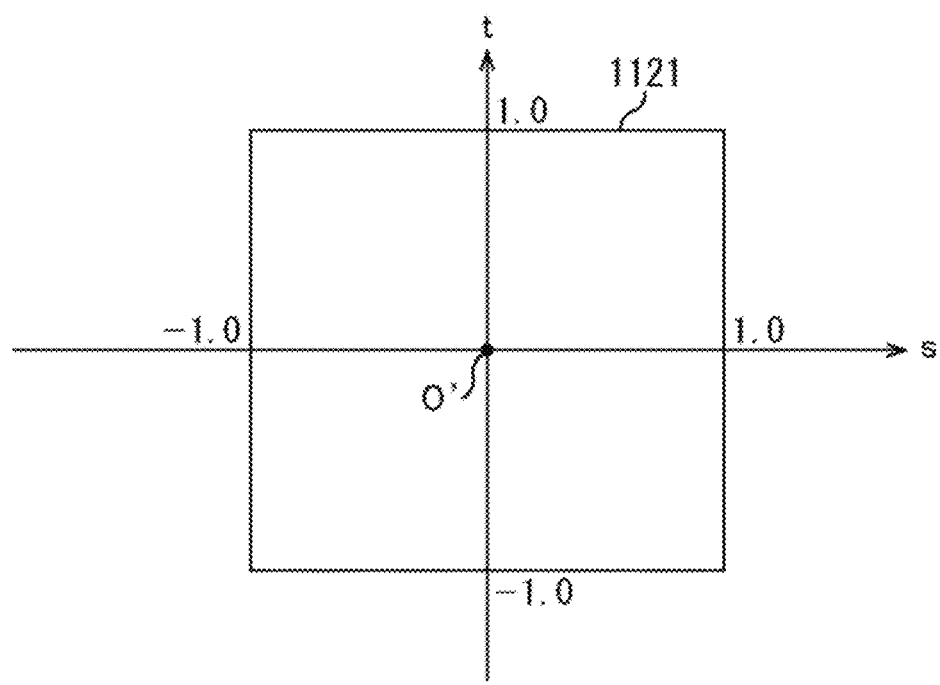
FIG. 56 is a view illustrating tan axis projection.

FIG. 56 is a view illustrating tan axis projection (tangential axis projection).

FIG. 56 is a view of the projection plane 1121 as viewed in the negative direction of z. In the example of FIG. 56, in the st coordinate system, the minimum values of the s value and the t value of the projection plane 1121 are −1.0, and the maximum values are 1.0.

In this case, in perspective projection, a projection point is set on the projection plane 1121 such that the projection vector heading from the origin O to the projection point on the projection plane 1121 becomes a vector (s', t', −1.0). It is to be noted that s' indicates values at predetermined distances provided within a range of the s value from −1.0 to 1.0, and t' indicates values at predetermined distances provided within a range of the t value from −1.0 to 1.0. Accordingly, projection points in perspective projection are uniform on the projection plane 1121.

In contrast, if the angle of view of the projection plane 1121 is θw (in the example of FIG. 56, π/2), then in tan axis projection, a projection point is set on the projection plane 1121 such that the projection vector is a vector (tan(s'*θw/2), tan(t'*θw/2), −1.0).

In particular, if s'*θw/2 is represented by θ and t'*θw/2 is represented by φ, then the vector (tan(s'*θw/2), tan(t'*θw/2), −1.0) becomes a vector (tan θ, tan φ, −1.0). At this time, if the angle θw of view comes close to π, then tan θ and tan φ diverge to infinity. Accordingly, the vector (tan θ, tan φ, −1.0) is corrected to a vector (sin θ*cos φ, cos θ*sin φ, −cos θ*cos φ) such that tan θ and tan φ do not diverge to infinity, and a projection point is set on the projection plane 1121 such that the projection vector becomes the vector (sin θ*cos φ, cos θ*sin φ, −cos θ*cos φ). Accordingly, in tan axis projection, angles defined by every projection vectors corresponding to projection points neighboring with each other become equal.

It is to be noted that, similarly to the logarithmic axis (log scale), tan(s'*θw/2) and tan(t'*θw/2) are grasped as s' and t' of the tan axis. Accordingly, in the present specification, projection where the projection vector is the vector (tan (s'*θw/2), tan(t'*θw/2), −1.0) is referred to as tan axis projection.

Further, for example, in the second and third embodiments, the ratio of the priorities A to D to be allocated to encoded streams may be variable. For example, the priority setting section 511 of the home server 13b or 13c may vary the ratio of priorities in response to the processing capacity of or the load on the home server 13b or 13c, a progress situation of decoding processing of each encoded stream or the like. For example, in the case where the load on the home server 13b or 13c is low, the priority setting section 511 may increase the ratio of encoded streams to be set to the priority A, but in the case where the load on the home server 13b or 13c is high, the priority setting section 511 may increase the ratio of encoded streams to be set to the priority D.

Further, the classification of priorities of FIG. 35 is an example of such method and can be altered arbitrarily. For example, priorities may be classified into two types, three types or five or more types.

Furthermore, for example, the second and third embodiments can be applied also to a case in which decoding and rendering of a plurality of encoded streams corresponding to images in two or more different directions other than an omnidirectional image are performed with priorities applied between the encoded streams. Further, for example, the second and third embodiments can be applied also to a case in which decoding and rendering of a plurality of encoded streams corresponding to images of different layers in the same direction are performed with priorities applied between the layers.

Further, the score calculation table of FIG. 37 can be changed arbitrarily. For example, it is possible to increase or decrease the number of types of addition factors or to change the reference value or the weight coefficient.

Furthermore, the thinning method of a picture for each priority can be changed arbitrarily. Further, thinning of a picture may be performed in a low resolution encoded stream.

Further, while, in the fifth embodiment described hereinabove, an example in which the image selection section 952 thins out texture images and depth images is described, the decoding section 851 may perform a thinning process. For example, the decoding section 851 may select a texture stream and a depth stream to be decoded in accordance with the priority and decode only the selected texture stream and depth stream.

Further, for example, not the reception section 802 side but the transmission section 801 side may perform a thinning process.

In this case, for example, at least one of virtual viewpoint information and priority information and resource information are transmitted from the reception section 802 to the transmission section 801. Then, for example, the viewpoint setting section 901 of the transmission section 801 selects a transmission viewpoint for generating a texture image and a depth image on the basis of the virtual viewpoint or the priority and the reproduction resource. For example, the viewpoint setting section 901 sets a number of transmission viewpoints to be used on the basis of the reproduction resource and selects the set number of transmission viewpoints from among a plurality of transmission viewpoints on the basis of the received priority or a priority set on the basis of the virtual viewpoint.

Then, for example, only texture images and depth images of the selected transmission viewpoints are generated to perform thinning out of texture images and depth images. Further, the number of texture streams and depth streams to be transmitted from the transmission section 801 to the reception section 802 is reduced to reduce the transmission amount of data between the transmission section 801 and the reception section 802.

As an alternative, for example, the encoding section 823 may select transmission viewpoints on the basis of virtual viewpoints or priorities and reproduction resources such that texture images and depth images of all transmission viewpoints, and compression encode only texture images and depth images corresponding to the selected transmission viewpoints to generate texture streams and depth streams.

As another alternative, for example, the transmission section 814 may select transmission viewpoints on the basis of virtual viewpoints or priorities and reproduction resources such that texture streams and depth streams of all transmission viewpoints are generated, and transmit only texture streams and depth streams corresponding to the selected transmission viewpoints to the reception section 802.

It is to be noted that, in the case where the transmission section 801 side performs a thinning process, the thinning process may be performed on the basis of a situation of the transmission path between the transmission section 801 and the reception section 802 in addition to or in place of the reproduction resource. For example, the transmission section 801 may perform the thinning process described above such that, as the capacity of a usable transmission path increases, the number of encoded streams to be transmitted is increased, but as the capacity of the usable transmission path decreases, the number encoded streams to be transmitted is decreased.

Further, the thinning process on the transmission side can be applied, for example, also to the second embodiment or the third embodiment described hereinabove. For example, while, in the second embodiment or the third embodiment, an example is indicated in which a picture to be decoded or rendered is thinned by performing decoding and rendering of encoded streams with priorities applied thereto, for example, the content server 12 may thin an encoded stream to be generated or transmitted. For example, the content server 12 may stop generation or transmission of an encoded stream of the priority D or thin a picture to be included into an encoded stream of the priority B or the priority C.

It is to be noted that a priority set by the transmission side (for example, the transmission section 801) or a selection result of an image or an encoded stream may be transmitted to the reproduction side (for example, the reception section 802) such that a thinning process is performed on the transmission side on the basis of information acquired from the transmission side.

Further, for example, in the fifth embodiment, the stream generation section 812 of the transmission section 801 may generate a display image corresponding to a virtual viewpoint, generate a display image stream in which the display image is compression encoded and transmit the display image stream to the reception section 802.

Further, in the fifth embodiment, there is no necessity to generate three-dimensional shape data surrounding the full periphery of a display target object. For example, in the case where a range in which a virtual viewpoint is to be set is restricted, the three-dimensional shape data is sufficient if it includes at least a region that can be seen from a viewpoint within the range.

Furthermore, while the foregoing description indicates an example in the fifth embodiment in which a depth image is generated from high resolution shape data, a depth image may be acquired using a camera that can detect a depth such as, for example, a ToF camera or the like.

Further, in the fifth embodiment, a virtual viewpoint may be set, for example, without being based on a sight line or a viewing position of a viewer. For example, a virtual viewpoint may be set, for example, at a position set in advance.

APPLICATION EXAMPLES (Description of Computer to which Present Disclosure is Applied)

While the series of processes described above can be executed by hardware, it may otherwise be executed by software. Where the series of processes is executed by software, a program that constructs the software is installed into a computer. Here, the computer includes a computer incorporated in hardware for exclusive use, for example, a personal computer for universal use that can execute various functions by installing various programs, and so forth.

Figure 57:
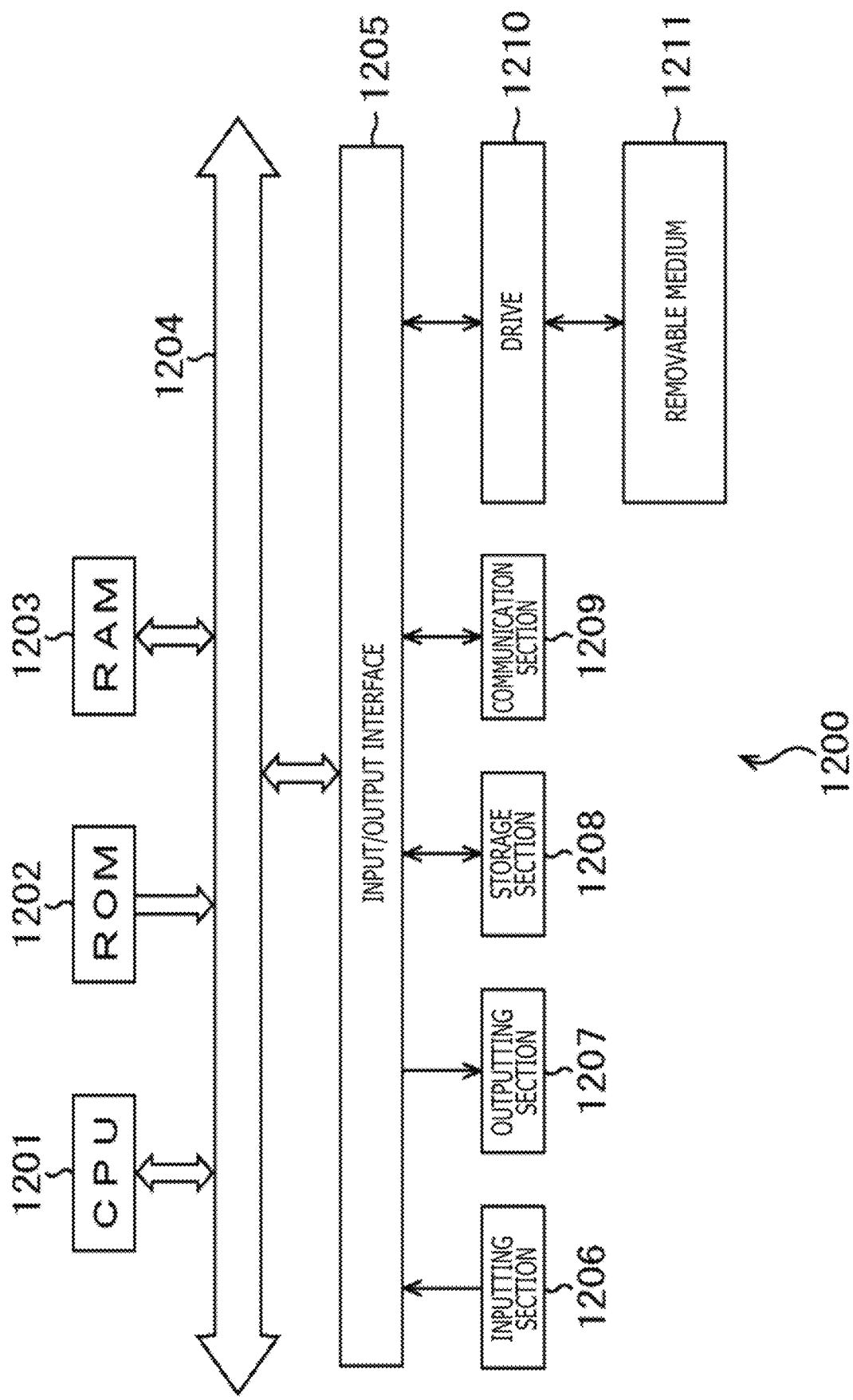
FIG. 57 is a block diagram depicting a configuration example of hardware of a computer.

FIG. 57 is a block diagram depicting a configuration example hardware of a computer that executes the series of processes described hereinabove in accordance with a program.

In the computer 1200, a CPU (Central Processing Unit) 1201, a ROM (Read Only Memory) 1202 and a RAM (Random Access Memory) 1203 are connected to each other by a bus 1204.

To the bus 1204, an input/output interface 1205 is connected further. To the input/output interface 1205, an inputting section 1206, an outputting section 1207, a storage section 1208, a communication section 1209 and a drive 1210 are connected.

The inputting section 1206 is configured from a keyboard, a mouse, a microphone and so forth. The outputting section 1207 is configured from a display, a speaker and so forth. The storage section 1208 is configured from a hard disk, a nonvolatile memory and so forth. The communication section 1209 is configured from a network interface or the like. The drive 1210 drives a removable medium 1211 such as a magnetic disk, an optical disk, a magneto-optical disk, a semiconductor memory or the like.

In the computer 1200 configured in such a manner as described above, the CPU 1201 loads a program stored, for example, in the storage section 1208 into the RAM 1203 through the input/output interface 1205 and the bus 1204 to perform the series of processes described above.

The program that is executed by the computer 1200 (CPU 1201) can be recorded into and provided as the removable medium 1211, for example, as a package medium or the like. Further, the program can be provided through a wired or wireless transmission medium such as a local area network, the Internet, a digital satellite broadcast or the like.

In the computer 1200, a program can be installed into the storage section 1208 through the input/output interface 1205 by mounting a removable medium 1211 on the drive 1210. Further, the program can be received by the communication section 1209 through a wired or wireless transmission medium and installed into the storage section 1208. Further, the program can be installed in advance into the ROM 1202 or the storage section 1208.

It is to be noted that the program executed by the computer 1200 may be a program in which processes are performed in time series in accordance with the order described herein or may be a program in which processes are executed in parallel or at a necessary timing such as, for example, when the program is called or the like.

(Application Example to Mobile Control System)

The technology according to the present disclosure can be applied to various products. For example, the technology according to the present disclosure may be implemented as an apparatus that is incorporated in various types of mobile bodies such as automobiles, hybrid electric cars, motorcycles, bicycles, personal mobility, airplanes, drones, ships, robots, construction machines, agricultural machines (tractors) and so forth.

Figure 58:
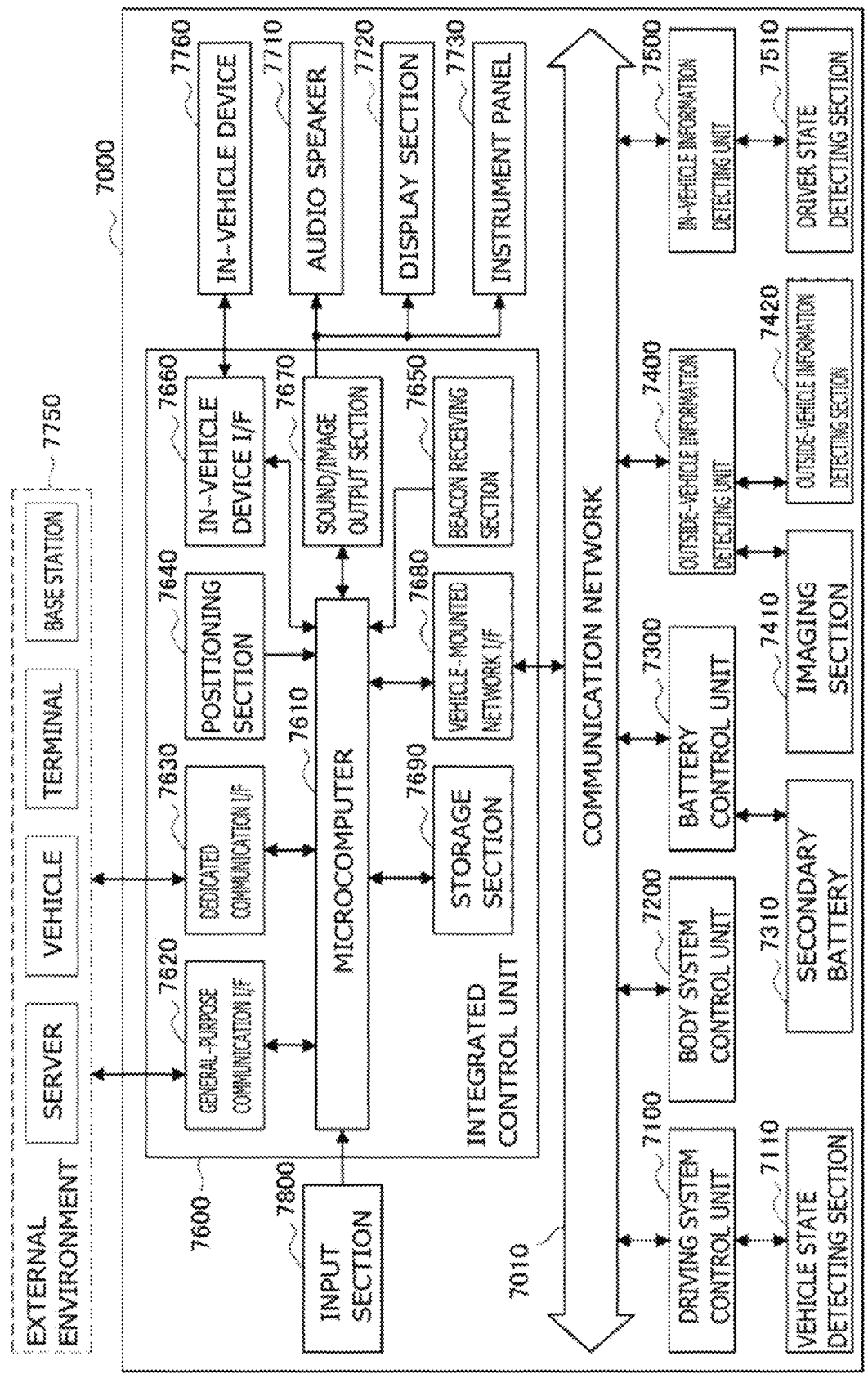
FIG. 58 is a block diagram depicting an example of schematic configuration of a vehicle control system.

FIG. 58 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 58, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 58 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 59:
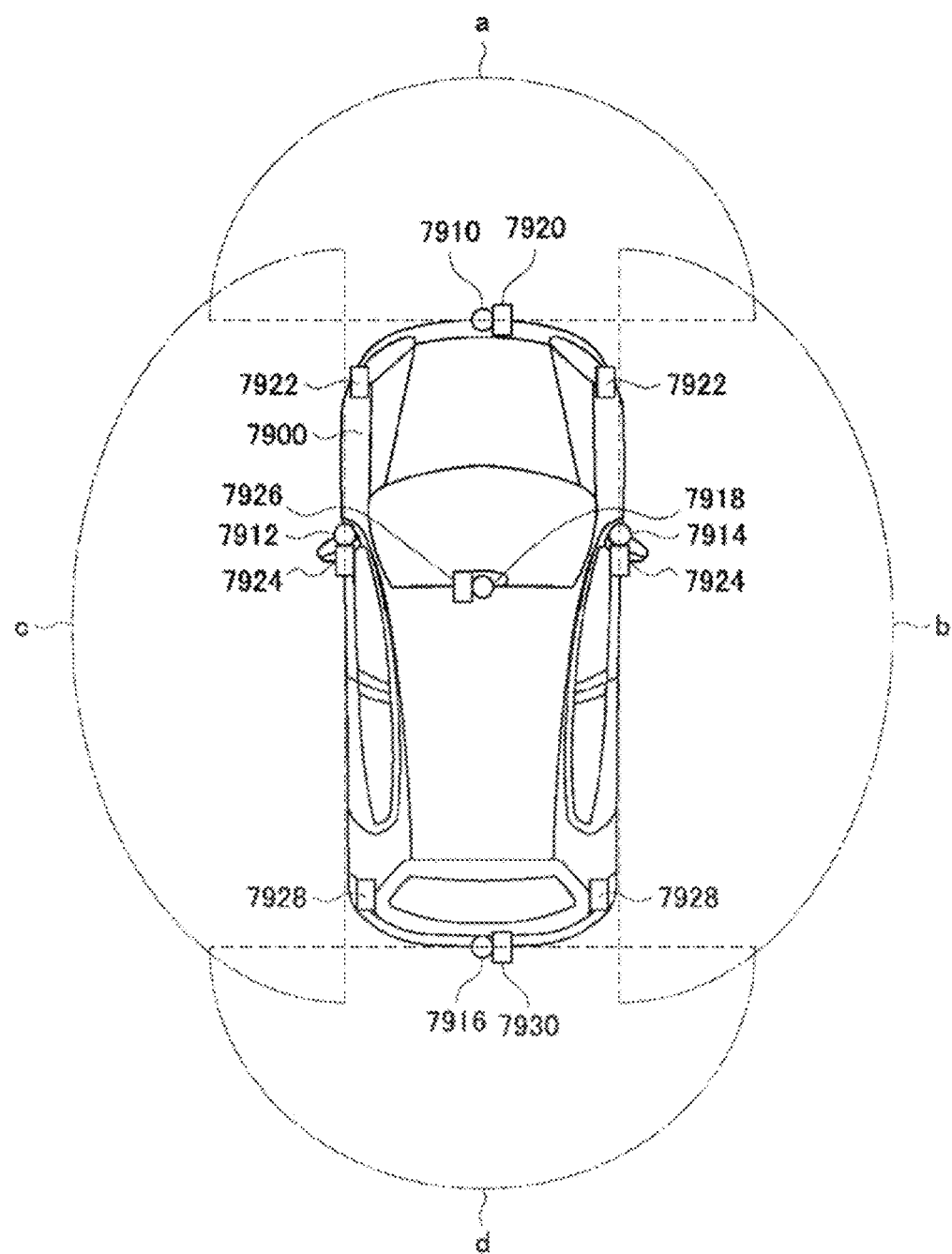
FIG. 59 is a diagram of assistance in explaining an example of installation positions of an outside-vehicle information detecting section and an imaging section.

FIG. 59 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 59 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 58, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 58, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 58 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It is to be noted that a computer program for implementing the functions of the image displaying system 10, 700 or 800 according to the present embodiments described hereinabove with reference to FIGS. 1, 2, 3, 4A, 4B, 5, 6A, 6B, 7, 8A, 8B, 9, 10, 11, 12A, 12B, 120, 13A, 13B, 130, 14A, 14B, 15, 16A, 16B, 17, 18, 19, 20, 21, 22A, 22B, 23, 24A, 24B, 25A, 25B, 26A, 26B, 27, 28, 29, 30, 31, 32, 33, 34, 35, 36, 37, 38, 39, 40, 41, 42, 43, 44, 45, 46, 47, 48, 49, 50, 51, 52, 53, 54A, and 54B can be incorporated into some control unit or the like. Further, also it is possible to provide a computer-readable recording medium in which such a computer program as just described is placed. The recording medium may be, for example, a magnetic disk, an optical disk, a magneto-optical disk, a flash memory or the like. Further, the computer program described above may be distributed, for example, through a network without using a recording medium.

In the vehicle control system 7000 described above, the image displaying system 10, 700 or 800 can be applied to the vehicle control system 7000 of the application example depicted in FIG. 58. For example, the multi camera 11 of the image displaying system 10 or 700 or the image pickup section 811 of the image displaying system 800 corresponds at least to part of the imaging section 7410. Further, the content server 12, home server 13 (one of the home server 13a to 13c) and all or part of the conversion apparatus 14, the distribution server 701, network 702, reproduction apparatus 703 and all or part of the conversion apparatus 14 or all or part of the transmission section 801 (except the image pickup section 811) and the reception section 802 (except the display section 845) are integrated and correspond to the microcomputer 7610 and the storage section 7690 of the integrated control unit 7600. The head mounted display 15 or the display section 845 corresponds to the display section 7720.

It is to be noted that, in the case where the image displaying system 10 or 700 is applied to the vehicle control system 7000, the camera 13A, marker 15A and gyro sensor 15B are not provided, and a sight line direction and a viewing position of a viewer are inputted by an operation of the input section 7800 by a passenger who is a viewer. Further, in the case where the image displaying system 800 is applied to the vehicle control system 7000, the camera 846 is not provided, and a sight line direction and a viewing position of a viewer are inputted by an operation of the input section 7800 by a passenger who is a viewer.

By applying the image displaying system 10, 700 or 800 to the vehicle control system 7000 of the application example depicted in FIG. 58 in such a manner as described, a display image of high picture quality can be generated using an omnidirectional image or images from a plurality of viewpoints surrounding an object.

Further, at least part of the components of the image displaying system 10, 700 or 800 may be implemented by a module for the integrated control unit 7600 depicted in FIG. 58 (for example, by an integrated circuit module configured by one die). As an alternative, the image displaying system 10, 700 or 800 may be implemented by a plurality of control units of the vehicle control system 7000 depicted in FIG. 58.

In the present specification, the term system is used to signify an aggregation of a plurality of constituent elements (devices, modules (parts) and so forth) and it does not matter whether or not all of the constituent elements are accommodated in the same housing. Accordingly, a plurality of apparatus accommodated in separate housings and connected to each other through a network configure a system, and also one apparatus that includes a plurality of modules accommodated in a single housing configures a system.

It is to be noted that the advantageous effects described herein are illustrative to the last and are not restrictive, and other advantages may be available.

Further, the embodiment of the present disclosure is not limited to the embodiments described hereinabove, and various alterations are possible without departing from the subject matter of the present disclosure.

For example, the present disclosure can assume a configuration for crowd computing in which one function is shared by a plurality of devices through a network and processed in collaboration.

Further, the steps described hereinabove in connection with the flow charts can be executed by a single apparatus or can be executed by sharing by a plurality of apparatus.

Further, in the case where one step includes a plurality of processes, the plurality of processes included in the one step can be executed by a single device and also can be executed by sharing by a plurality of apparatus.

It is to be noted that the present disclosure can assume such a configuration as described below.

(1)
An image processing apparatus, including:
an image processing section configured to perform, based on priorities between a plurality of encoded streams obtained by encoding a plurality of projection images that are obtained by projecting an omnidirectional image to a plurality of faces or a plurality of viewpoint images from different viewpoints, decoding of the encoded streams and generation or selection of an image to be used for generation of a display image; and
a drawing section configured to generate the display image based on the generated or selected image.

(2)
The image processing apparatus according to (1) above, in which
the image processing section performs decoding and rendering of the encoded streams based on the priorities, and
the drawing section generates a display image based on a plurality of generation images generated by performing decoding and rendering of the encoded streams.

(3)
The image processing apparatus according to (2) above, in which
the plurality of projection images include images of a plurality of layers, and
the image processing section performs decoding and rendering of the encoded streams further based on priorities between the layers.

(4)
The image processing apparatus according to (3) above, in which
the images of the plurality of layers are obtained by projecting the omnidirectional image from different viewpoints.

(5)
The image processing apparatus according to (2) or (4) above, in which
the image processing section increases a quantity by which a picture to be decoded is to be thinned or a quantity by which a picture to be rendered is to be thinned as the priority of the encoded stream decreases.

(6)
The image processing apparatus according to (5) above, in which
the image processing section adds a picture to be thinned as the priority decreases in an order of a first picture that includes a picture decoded using inter-frame prediction and is not referred to by a different picture, a second picture that includes a picture decoded using inter-frame prediction and is referred to by a different picture and a third picture that is decoded independently.

(7)
The image processing apparatus according to any one of (2) to (6) above, in which
the image processing section performs, in a case where occurrence of delay in rendering of any of the encoded streams is predicted, decoding and rendering of the encoded streams based on the priorities.

(8)
The image processing apparatus according to any one of (2) to (7) above, in which
the image processing section further performs decoding and rendering of a sub encoded stream obtained by encoding a low resolution image formed by reducing a resolution of the omnidirectional image from that of the projection images, and
the drawing section generates the display image based on a low resolution generation image generated by performing decoding and rendering of the sub encoded stream.

(9)
The image processing apparatus according to (8) above, in which
the sub encoded stream has a priority higher than that of the encoded streams.

(10)
The image processing apparatus according to (8) or (9) above, in which,
in a case where occurrence of delay in rendering of the encoded streams is not predicted, the image processing section does not perform decoding and rendering of the sub encoded stream and the drawing section generates the display image based on a plurality of the generation images, and
in a case where occurrence of delay in rendering of any of the encoded streams is predicted, the image processing section performs decoding and rendering of the sub encoded stream and performs decoding and rendering of the encoded streams based on the priorities, and the drawing section generates the display image based on a plurality of the generation images and the low resolution generation image.

(11)
The image processing apparatus according to (1) above, in which
the image processing section performs at least one of selection of the encoded stream to be decoded or selection of the viewpoint image obtained by decoding of the encoded streams based on the pluralities.

(12)
The image processing apparatus according to (11) above, in which
the plurality of viewpoint images include a plurality of texture images of an object viewed from different viewpoints and a plurality of depth images of the object viewed from different viewpoints,
the image processing section performs decoding of an encoded shape stream representative of a three-dimensional shape of the object and obtained by encoding first shape data having a resolution lower than that of the depth images and generates, based on the selected depth image and the first shape data, second shape data having a resolution higher than that of the first shape data, and
the drawing section generates the display image based on the selected texture image and the second shape data.

(13)
An image processing method by an image processing apparatus, the image processing method including:
an image processing step of performing, based on priorities between a plurality of encoded streams obtained by encoding a plurality of projection images that are obtained by projecting an omnidirectional image to a plurality of faces or a plurality of viewpoint images from different viewpoints, decoding of the encoded streams and generation or selection of an image to be used for generation of a display image; and
a drawing step of generating the display image based on the generated or selected image.

(14)
An image processing apparatus, including:
an image acquisition section configured to acquire a plurality of projection images obtained by projecting an omnidirectional image to a plurality of faces or a plurality of viewpoint images from different viewpoints; and a transmission section configured to transmit part or all of the plurality of projection images or the plurality of viewpoint images based on priorities between the plurality of projection images or between the plurality of viewpoint images.

(15)

The image processing apparatus according to (14) above, further including:

an encoding section configured to perform encoding of the plurality of projection images or the plurality of viewpoint images to generate a plurality of encoded streams, in which at least one of a process for selecting the projection image or the viewpoint image to be encoded by the encoding section based on the priorities or a process for selecting the encoded stream to be transmitted by the transmission section based on the priorities is performed.

(16)

The image processing apparatus according to (15) above, in which the encoding section selects the projection image or the viewpoint image to be encoded further based on at least one of a situation of a transmission path along which the encoded stream is to be transmitted or a resource of an apparatus that performs reproduction of the encoded stream, and the transmission section selects the encoded stream to be transmitted further based on at least one of the situation of the transmission path along which the encoded stream is to be transmitted or the resource of the apparatus that performs reproduction of the encoded stream.

(17)

The image processing apparatus according to any one of (14) to (16) above, in which the encoding section further performs encoding of a low resolution image formed by reducing a resolution of the omnidirectional image from that of the projection images and generates a sub encoded stream, and the transmission section further performs transmission of the sub encoded stream.

(18)

The image processing apparatus according to (17) above, in which the sub encoded stream has a priority higher than that of the encoded streams.

(19)

The image processing apparatus according to any one of (14) to (16) above, in which the plurality of projection images include a plurality of texture images and a plurality of depth images obtained by projecting a texture image and a depth image of the omnidirectional image to the plurality of faces.

(20)

An image processing method by an image processing apparatus, the image processing method including:

an image acquisition step of acquiring a plurality of projection images obtained by projecting an omnidirectional image to a plurality of faces or a plurality of viewpoint images from different viewpoints; and a transmission step of transmitting part or all of the plurality of projection images or the plurality of viewpoint images based on priorities between the plurality of projection images or between the plurality of viewpoint images.

REFERENCE SIGNS LIST

10 Image displaying system, 12 Content server, 13, 13a to 13c Home server, 236 Drawing section, 264, 268, 324 Rendering section, 502 3D model generation section, 511 Priority setting section, 512-1 to 512-6 ML3D model generation section, 513 Low resolution 3D model generation section, 531, 532, 571 Decoding section, 601 3D Model generation section, 700 Image displaying system, 701 Distribution server, 703 Reproduction apparatus, 800 Image displaying system, 801 Transmission section, 802 Reception section, 812 Stream generation section, 821 Shape data generation section, 822 Conversion section, 823 Encoding section, 843 Image processing section, 844 Drawing section, 851 Decoding section, 852 Reconstruction section

The invention claimed is:

1. An image processing apparatus, comprising:
a central processing unit (CPU), wherein
based on prediction of occurrence of delay in render of at least one of a plurality of encoded streams, the CPU is configured to:
perform decode and render of a sub encoded stream to generate a low resolution generation image;
perform decode and render of the plurality of encoded streams based on priorities between the plurality of encoded streams, wherein
the plurality of encoded streams is obtained by encode of plurality of projection images;
the plurality of projection images is obtained by projection of an omnidirectional image to one of a plurality of faces or a plurality of viewpoint images from a plurality of different viewpoints, and
the sub encoded stream is obtained by encode of the low resolution generation image formed by reduction of a resolution of the omnidirectional image;
generate a plurality of generation images based on the decode and the render of the plurality of encoded streams; and
generate a first display image based on the plurality of generation images and the low resolution generation image, and
based on no prediction of the occurrence of the delay in the render of the plurality of encoded streams, the CPU is further configured to:
skip the decode and the render of the sub encoded stream; and
generate a second display image based on the plurality of generation images.

2. The image processing apparatus according to claim 1, wherein
the plurality of projection images includes images of a plurality of layers, and
the CPU is further configured to perform the decode and the render of the plurality of encoded streams based on priorities between the plurality of layers.

3. The image processing apparatus according to claim 2, wherein the images of the plurality of layers are obtained by the projection of the omnidirectional image from the plurality of different viewpoints.

4. The image processing apparatus according to claim 1, wherein, as a priority of a specific encoded stream of the plurality of encoded streams decreases, the CPU is further configured to increase one of a first quantity by which a picture to be decoded is to be thinned or a second quantity by which the picture to be rendered is to be thinned.

5. The image processing apparatus according to claim 4, wherein;
as the priority of the specific encoded stream decreases, the CPU is further configured to add, in an order, a first picture, a second picture and a third picture in the specific encoded stream, wherein
the first picture corresponds to a picture decoded using based on inter-frame prediction and is not referred to by a different picture,
the second picture corresponds to a picture decoded based on the inter-frame prediction and is referred to by the different picture, and
the third picture is decoded independently.

6. The image processing apparatus according to claim 1, wherein a priority of the sub encoded stream is higher than the priorities between the plurality of encoded streams.

7. The image processing apparatus according to claim 1, wherein based on the priorities between the plurality of encoded streams, the CPU is further configured to:
select a specific texture image of a plurality of texture images of an object viewable from the plurality of different viewpoints, wherein the specific texture image corresponds to an encoded stream of the plurality of encoded streams; and
select a specific depth image of a plurality of depth images of the object, wherein the specific depth image corresponds to the encoded stream of the plurality of encoded streams.

8. The image processing apparatus according to claim 7, wherein the CPU is further configured to:
perform decode of an encoded shape stream representative of a three-dimensional shape of the object, wherein
the encoded shape stream is obtained by encode of first shape data, and
a resolution of the first shape data is lower than a resolution of the specific depth image of the plurality of depth images;
generate, based on the selected specific depth image and the first shape data, second shape data having a resolution higher than the resolution of the first shape data; and
generate one of the first display image or the second display image based on the selected specific texture image and the second shape data.

9. An image processing method, comprising:
in an image processing apparatus:
based on prediction of occurrence of delay in render of at least one of a plurality of encoded streams,
performing, by a central processing unit (CPU) of the image processing apparatus, decode and render of a sub encoded stream to generate a low resolution generation image;
performing, by the CPU, decode and render of the plurality of encoded streams based on priorities between the plurality of encoded streams, wherein
the plurality of encoded streams is obtained by encode of a plurality of projection images;
the plurality of projection images is obtained by projection of an omnidirectional image to one of a plurality of faces or a plurality of viewpoint images from a plurality of different viewpoints, and
the sub encoded stream is obtained by encode of the low resolution generation image formed by reduction of a resolution of the omnidirectional image;
generating, by the CPU, a plurality of generation images based on the decode and the render of the plurality of encoded streams; and
generating, by the CPU, a first display image based on the plurality of generation images and the low resolution generation image, and
based on no prediction of the occurrence of the delay in the render of the plurality of encoded streams,
skipping, by the CPU, the decode and the render of the sub encoded stream; and
generating, by the CPU, a second display image based on the plurality of generation images.

10. An image processing apparatus, comprising:
a central processing unit (CPU) configured to:
based on priorities between a plurality of encoded streams,
select a specific texture image of a plurality of texture images of an object viewable from a plurality of different viewpoints, wherein the specific texture image corresponds to an encoded stream of the plurality of encoded streams, wherein,
the plurality of encoded streams is obtained by encode of a plurality of projection images, and
the plurality of projection images is obtained by projection of an omnidirectional image to a plurality of faces or a plurality of viewpoint images from the plurality of different viewpoints;
select a specific depth image of a plurality of depth images of the object, wherein the specific depth image corresponds to the encoded stream of the plurality of encoded streams;
perform decode of an encoded shape stream representative of a three-dimensional shape of the object, wherein
the encoded shape stream is obtained by encode of first shape data, and
a resolution of the first shape data is lower than a resolution of the selected specific depth image of the plurality of depth images;
generate based on the selected specific depth image and the first shape data, second shape data having a resolution higher than the resolution of the first shape data; and
generate a display image based on the selected specific texture image and the second shape data.

* * * * *